(12) United States Patent
Negoro et al.

(10) Patent No.: US 6,531,195 B2
(45) Date of Patent: Mar. 11, 2003

(54) PROCESS FOR ORIENTING ROD-LIKE LIQUID CRYSTAL MOLECULES

(75) Inventors: Masayuki Negoro, Minami-ashigara (JP); Ken Kawata, Minami-ashigara (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 126 days.

(21) Appl. No.: 09/819,804

(22) Filed: Mar. 29, 2001

(65) Prior Publication Data

US 2002/0048639 A1 Apr. 25, 2002

(30) Foreign Application Priority Data

| Mar. 29, 2000 | (JP) | ................................. | 2000-091708 |
| Jun. 12, 2000 | (JP) | ................................. | 2000-174829 |
| Jul. 19, 2000 | (JP) | ................................. | 2000-219572 |

(51) Int. Cl.$^7$ .......................... C09K 19/00; C09K 19/52
(52) U.S. Cl. .................. 428/1.2; 428/1.55; 252/299.01; 525/69
(58) Field of Search .................. 428/1.1, 1.3, 1.21, 428/1.25, 1.26, 1.28, 1.55, 1.6; 252/299.01; 525/69

(56) References Cited

U.S. PATENT DOCUMENTS

| 4,618,514 A | * | 10/1986 | McClelland et al. | ......... 428/1.1 |
| 5,583,679 A | * | 12/1996 | Ito et al. | ..................... 349/118 |
| 5,670,084 A | * | 9/1997 | Harada et al. | ......... 252/299.01 |

FOREIGN PATENT DOCUMENTS

| JP | 11-212078 | * | 8/1999 | ......... G02F/1/1335 |

OTHER PUBLICATIONS

Computer generated translation of Watabe Japanese Patent.*

* cited by examiner

Primary Examiner—Mark F. Huff
Assistant Examiner—Jennifer R. Sadula
(74) Attorney, Agent, or Firm—Burns, Doane, Swecker & Mathis, LLP

(57) ABSTRACT

An orientation layer of an acrylic copolymer is used to orient rod-like liquid crystal molecules perpendicularly to rubbing direction. The copolymer comprises repeating units represented by the formula (I) and repeating units represented by the formula (II) or (III)

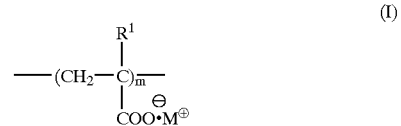

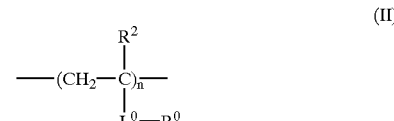

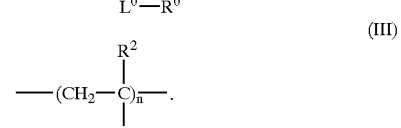

15 Claims, 2 Drawing Sheets

PROCESS FOR ORIENTING ROD-LIKE LIQUID CRYSTAL MOLECULES

FIELD OF THE INVENTION

The present invention relates to a process for orienting rod-like liquid crystal molecules. The invention also relates to an optical compensatory sheet comprising a transparent support, an orientation layer and an optically anisotropic layer formed from rod-like liquid crystal molecules in this order. The invention further relates to a polarizing plate using the oriented rod-like liquid crystal molecules.

BACKGROUND OF THE INVENTION

A liquid crystal display comprises a liquid crystal cell, a polarizing element and an optical compensatory sheet (phase retarder). In a liquid crystal display of transmission type, two polarizing elements are arranged on both sides of the liquid crystal cell and one or two optical compensatory sheets (phase retarders) are arranged between the liquid crystal cell and the polarizing elements. On the other hand, a liquid crystal display of reflection type comprises a reflection plate, a liquid crystal cell, an optical compensatory sheet and a polarizing element in this order.

The liquid crystal cell comprises a pair of substrates, rod-like liquid crystal molecules and an electrode layer. The rod-like liquid crystal molecules are provided between the substrates. The electrode layer has a function of applying a voltage to the rod-like liquid crystal molecules. Each of the substrates has an orientation layer, which has a function of aligning the rod-like liquid crystal molecules. The alignment of the rod-like liquid crystal molecules is determined according to a display mode of the liquid crystal cell. Various display modes of the liquid crystal cell have been proposed. Examples of the mode for transmission type include TN (Twisted Nematic) mode, IPS (In-Plane Switching) mode. FLC (Ferroelectric Liquid Crystal) mode, OCB (optically Compensatory Bend) mode, STN (Super Twisted Nematic) mode, VA (Vertically Aligned) mode and ECB (Electrically Controlled Birefringence) mode. Examples of the mode for reflection type include TN mode, HAN (Hybrid Aligned Nematic) mode and GH (Guest-Host) mode.

The optical compensatory sheet has functions of removing undesired color from a displayed image and enlarging a viewing angle. As the optical compensatory sheet, a stretched birefringent film has been conventionally used.

Recently, an optical compensatory sheet comprising an optically anisotropic layer on a transparent support has been proposed in place of the stretched birefringent film. The optically anisotropic layer is formed from liquid crystal molecules. Since the liquid crystal molecules have various alignment forms, an optical compensatory sheet obtained by using the liquid crystal molecules has specific optical characteristics that cannot be obtained by the conventional stretched birefringent film.

The optical characteristics of the optical compensatory sheet are determined according to optical characteristics (i.e., displaying mode) of the liquid crystal cell. Various optical compensatory sheets properly applied for various display modes can be produced by using liquid crystal molecules. As the liquid crystal molecules for optical compensatory sheet, rod-like or discotic liquid crystal molecules are generally used.

Various optical compensatory sheets using liquid crystal molecules according to various display modes have been disclosed. For example, an optical compensatory sheet for TN mode is disclosed in Japanese Patent Provisional Publication No. 6(1994)-214116, U.S. Pat. Nos. 5,583,679, 5,646,703 and German Patent Publication No. 3,911,620A1. An optical compensatory sheet for IPS or FLC mode is disclosed in Japanese Patent Provisional Publication No. 10(1998)-54982, and a sheet for OCB or HAN mode is disclosed in U.S. Pat. No. 5,805,253 and International Patent No. WO96/37804. Further, a compensatory sheet for STN mode is disclosed in Japanese Patent Provisional Publication No. 9(1997)-26572, and one for VA mode is disclosed in Japanese Patent No. 2,866,372.

SUMMERY OF THE INVENTION

In an optical compensatory sheet having an optically anisotropic layer formed from rod-like liquid crystal molecules, an average direction of lines obtained by projecting long axes of the rod-like liquid crystal molecules on the support corresponds to a slow axis of the compensatory sheet. The average direction generally further corresponds to a rubbing direction of an orientation layer. The optical compensatory sheet is practically produced in the form of a roll. It is the easiest way to conduct a rubbing treatment along a longitudinal direction of the rolled sheet. Accordingly, the most easily produced optical compensatory sheet having an optically anisotropic layer formed from rod-like liquid crystal molecules has a slow axis along the longitudinal direction.

In a polarizing element of stretched polymer film, the transparent axis is perpendicular to the stretching direction. The polarizing element is also practically produced in the form of a roll. It is the easiest way to stretch the film along the longitudinal direction of the roll. Accordingly, the most easily produced polarizing element has a transparent axis perpendicular to the longitudinal direction (i.e., the transparent axis of that polarizing element is parallel to the lateral direction).

Where the rolled compensatory sheet is laminated with the rolled polarizing element, it is the easiest way to arrange the slow axis of the sheet essentially perpendicularly to the transparent axis of the element.

However, the slow axis of the compensatory sheet is preferably arranged essentially parallel to the transparent axis of the polarizing element in some display modes of liquid crystal cell.

The rod-like liquid crystal molecules must be aligned so that their long axes may be perpendicular to the rubbing direction of the orientation layer to arrange the slow axis of the rolled sheet along the latitudinal direction. In the present specification, the words "the long axes of the rod-like liquid crystal molecules are perpendicular to the rubbing direction of the orientation layer" means that an average direction of lines obtained by projecting the long axes of the rod-like liquid crystal molecules on the support is perpendicular to the rubbing direction. A new orientation layer having such function is required to align the rod-like liquid crystal molecules perpendicularly to the rubbing direction. A conventional orientation layer aligns the liquid crystal molecules parallel to the rubbing direction.

An object of the present invention is to align rod-like liquid crystal molecules perpendicularly to the rubbing direction.

Another object of the invention is to provide a rolled optical compensatory sheet having a lateral slow axis.

A further object of the invention is to provide a polarizing plate in which the slow axis of the optical compensatory sheet is easily placed essentially parallel to the transparent axis of the polarizing element.

The present invention provides a process for orienting rod-like liquid crystal molecules, comprising the steps of: coating a solution of a copolymer comprising repeating units represented by the formula (I) and repeating units represented by the formula (II) or (III) on a support to form a coated layer; rubbing a surface of the coated layer to form an orientation layer; coating a solution containing rod-like liquid crystal molecules on the orientation layer; and then drying the solution to orient the rod-like liquid crystal molecules so that an average direction of lines obtained by projecting long axes of the liquid crystal molecules on the support is essentially perpendicular to a rubbing direction of the orientation layer:

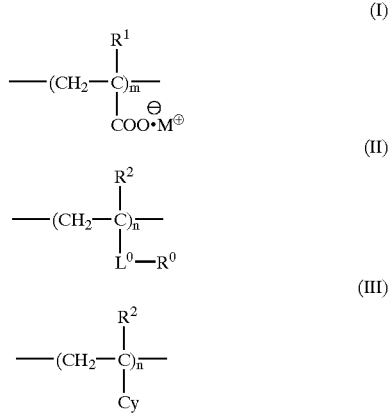

in which each of $R^1$ and $R^2$ independently is hydrogen, a halogen atom or an alkyl group having 1 to 6 carbon atoms; M is proton, an alkali metal ion or an ammonium ion; $L^0$ is a divalent linking group selected from the group consisting of —O—, —CO—, —NH—, —SO$_2$—, an alkylene group, an alkenylene group, an arylene group and a combination thereof; $R^0$ is a hydrocarbon group having 10 to 100 carbon atoms or a fluorine atom-substituted hydrocarbon group having 1 to 100 carbon atoms; Cy is an alicyclic group, an aromatic group or a heterocyclic group; m is 10 to 99 mole %; and n is 1 to 90 mole %.

The invention also provides a rolled optical compensatory sheet comprising a transparent support, an orientation layer and an optically anisotropic layer formed from rod-like liquid crystal molecules in this order, wherein the orientation layer is made of a copolymer having repeating units represented by the formula (I) and repeating units represented by the formula (II) or (III), and the rod-like liquid crystal molecules are so aligned that an average direction of lines obtained by projecting long axes of the liquid crystal molecules on the support is essentially perpendicular to a rubbing direction of the orientation layer.

The invention further provides a rolled polarizing plate comprising an optically anisotropic layer formed from rod-like liquid crystal molecules, an orientation layer, a transparent support, a polarizing film and a transparent protective film in this order, said orientation layer being made of a copolymer comprising repeating units represented by the formula (I) and repeating units represented by the formula (II) or (III), said rod-like liquid crystal molecules being so aligned that an average inclined angle between long axes of the liquid crystal molecules and a surface of the support is less than 5° and that an average direction of lines obtained by projecting long axes of the liquid crystal molecules on the support is essentially perpendicular to a rubbing direction of the orientation layer, and said average direction being essentially parallel to a transparent axis of the polarizing film:

In the present specification, the term "essentially perpendicular" and "essentially parallel" means that the angle between the noticed directions is within the range of 90°±5° and 0°±5°, respectively. The allowance of the angle is preferably less than ±4°, more preferably less than ±3°, further preferably less than ±2°, and most preferably less than ±1°.

The applicants have succeeded in aligning rod-like liquid crystal molecules uniformly and essentially perpendicularly to the rubbing direction by using an orientation layer containing a specific (meth)acrylic copolymer. The copolymer has a side chain containing a hydrocarbon group of 10 to 100 carbon atoms, a side chain containing a fluorine atom-substituted hydrocarbon group or a cyclic structure directly attached to a main chain. In an optical compensatory sheet having the orientation layer made of that copolymer, the rod-like liquid crystal molecules are aligned essentially perpendicularly to the rubbing direction. Accordingly, a rolled optical compensatory sheet having a slow axis perpendicular to the longitudinal direction (i.e., along the lateral direction) can be easily produced.

Further, a rolled polarizing element having a transparent axis perpendicular to the longitudinal direction (i.e., along the lateral direction) can be also easily produced. Therefore, a polarizing plate in which the slow axis of the compensatory sheet is essentially parallel to the transparent axis of the polarizing film can be easily produced by laminating the rolled compensatory sheet and the rolled polarizing element of the invention with their rolled forms maintained.

According to the invention, it is easy to arrange the slow axis of the compensatory sheet essentially parallel to the transparent axis of the polarizing film.

DETAILED DESCRIPTION OF THE INVENTION

Figure 1:
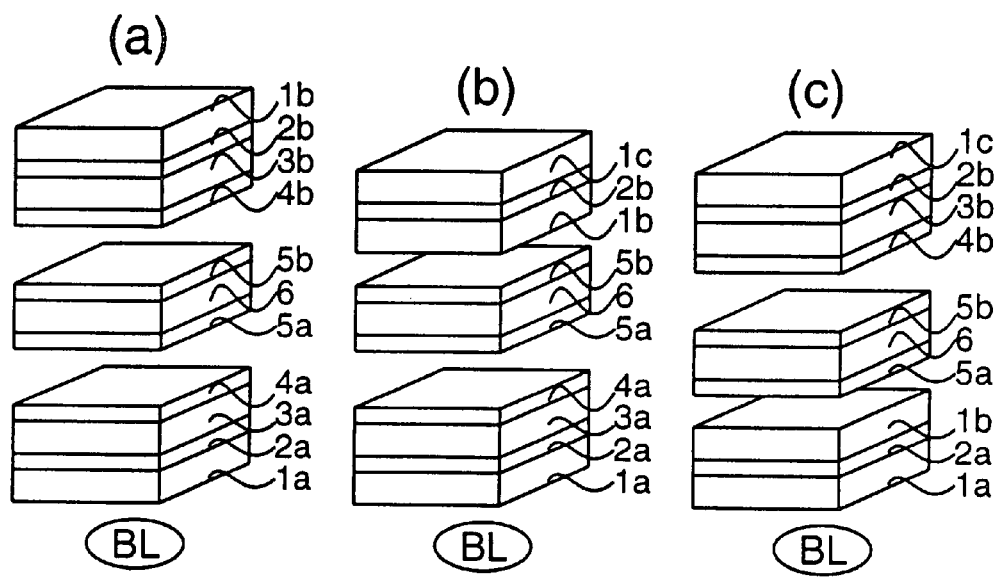
FIG. 1 schematically illustrates basic structures of liquid crystal displays of transmission type.

FIG. 1 schematically illustrates basic structures of liquid crystal displays of transmission type.

The liquid crystal display shown in FIG. 1(a) comprises a backlight (BL), a transparent protective film (1a), a polarizing film (2a), a transparent support (3a), an optically anisotropic layer (4a), a lower substrate of liquid crystal cell (5a), a layer of rod-like liquid crystal molecules (6), an upper substrate of liquid crystal cell (5b), an optically anisotropic layer (4b), a transparent support (3b), a polarizing film (2b) and a transparent protective film (1b) in this order.

Each combination of the transparent support and the optically anisotropic layer (each of 3a-4a and 4b-3b) constitutes an optical compensatory sheet. Each combination of the transparent protective film, the polarizing film, the transparent support and the optically anisotropic layer (each of 1a to 4a and 4b to 1b) constitutes a polarizing plate.

The transparent supports (3a, 3b) have orientation layers on the side facing the optically anisotropic layers (4a, 4b), and the lower and upper substrates of liquid crystal cell (5a, 5b) also have orientation layers on the side facing the layer of rod-like liquid crystal molecules (6).

The liquid crystal display shown in FIG. 1(b) comprises a backlight (BL), a transparent protective film (1a), a polarizing film (2a), a transparent support (3a), an optically anisotropic layer (4a), a lower substrate of liquid crystal cell (5a), a layer of rod-like liquid crystal molecules (6), an upper substrate of liquid crystal cell (5b), a transparent protective film (1b), a polarizing film (2b) and a transparent protective film (1c) in this order.

The combination of the transparent support and the optically anisotropic layer (3a-4a) constitutes an optical compensatory sheet. The combination of the transparent protective film, the polarizing film, the transparent support and the optically anisotropic layer (1a to 4a) constitutes a polarizing plate.

The transparent support (3a) has an orientation layer on the side facing the optically anisotropic layer (4a), and the lower and upper substrates of liquid crystal cell (5a, 5b) also have orientation layers on the side facing the layer of rod-like liquid crystal molecules (6).

The liquid crystal display shown in FIG. 1(c) comprises a backlight (BL), a transparent protective film (1a), a polarizing film (2a), a transparent protective film (1b), a lower substrate of liquid crystal cell (5a), a layer of rod-like liquid crystal molecules (6), an upper substrate of liquid crystal cell (5b), an optically anisotropic layer (4b), a transparent support (3b), a polarizing film (2b) and a transparent protective film (1c) in this order.

The combination of the transparent support and the optically anisotropic layer (4b-3b) constitutes an optical compensatory sheet. The combination of the transparent protective film, the polarizing film, the transparent support and the optically anisotropic layer (4b to 1c) constitutes a polarizing plate.

The transparent support (3b) has an orientation layer on the side facing the optically anisotropic layer (4b), and the lower and upper substrates of liquid crystal cell (5a, 5b) also have orientation layers on the side facing the layer of rod-like liquid crystal molecules (6).

Figure 2:
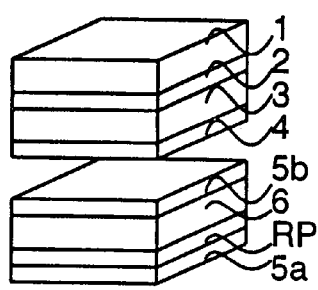
FIG. 2 schematically illustrates a basic structure of a liquid crystal display of reflection type.

FIG. 2 schematically illustrates a basic structure of a liquid crystal display of reflection type.

The liquid crystal display shown in FIG. 2 comprises a lower substrate of liquid crystal cell (5a), a reflection plate (RP), a layer of rod-like liquid crystal molecules (6), an upper substrate of liquid crystal cell (5b), an optically anisotropic layer (4), a transparent support (3), a polarizing film (2) and a transparent protective film (1) in this order.

The combination of the transparent support and the optically anisotropic layer (4-3) constitutes an optical compensatory sheet. The combination of the transparent protective film, the polarizing film, the transparent support and the optically anisotropic layer (4 to 1) constitutes a polarizing plate.

The transparent support (3) has an orientation layer on the side facing the optically anisotropic layer (4). The reflection plate (RP) and the upper substrate of liquid crystal cell (5b) also have orientation layers on the side facing the layer of rod-like liquid crystal molecules (6).

Figure 3:
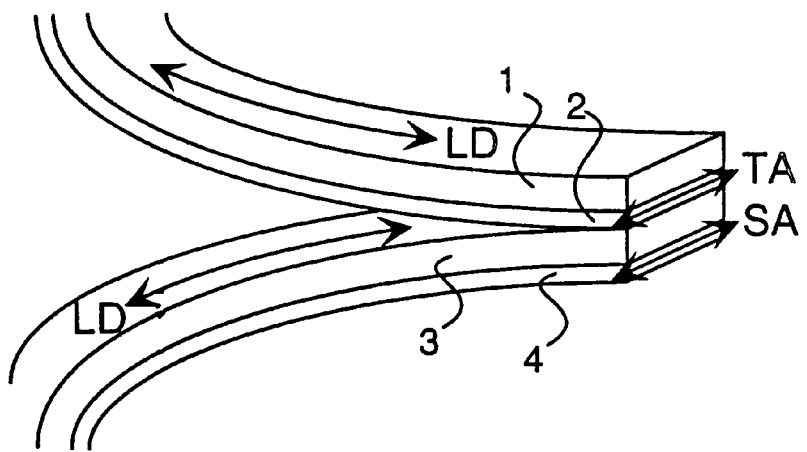
FIG. 3 schematically illustrates the step for laminating a rolled optical compensatory sheet and a rolled polarizing element.

FIG. 3 schematically illustrates the step for laminating a rolled optical compensatory sheet and a rolled polarizing element.

As shown in FIG. 3, the rolled polarizing element comprises a transparent protective film (1) and a polarizing film (2). The rolled optical compensatory sheet comprises a transparent support (3) and an optically anisotropic layer (4), and the transparent support (3) has an orientation layer on the side facing the optically anisotropic layer (4).

The transparent axis (TA) of the polarizing film (2) is essentially perpendicular to the longitudinal direction (LD) of the rolled polarizing element. An average direction of lines obtained by projecting the long axes of the rod-like liquid crystal molecules on the transparent support (namely, the slow axis (SA)) in the optically anisotropic layer (4) is also essentially perpendicular to the longitudinal direction (LD) of the rolled optical compensatory sheet. Consequently, the transparent axis (TA) of the polarizing film (2) is easily arranged essentially parallel to the slow axis (SA) of the optically anisotropic layer (4) by simply laminating the rolled compensatory sheet and the rolled polarizing element as shown in FIG. 3.

In FIGS. 1 to 3, the transparent support (3) and the optically anisotropic layer (4) may be placed in reverse order.

[Orientation layer]

The orientation layer contains a copolymer comprising repeating units represented by the formula (I) and repeating units represented by the formula (II) or (III).

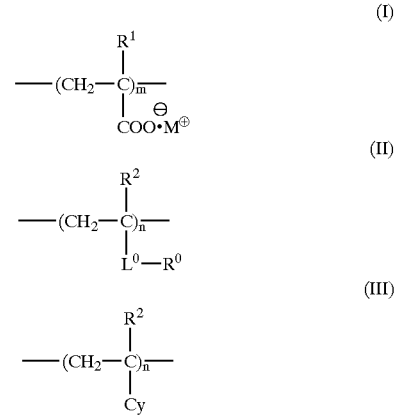

In the formula (I), $R^1$ is hydrogen, a halogen atom or an alkyl group having 1 to 6 carbon atoms. $R^1$ is preferably hydrogen or an alkyl group having 1 to 6 carbon atoms, more preferably is hydrogen, methyl or ethyl, and most preferably is hydrogen or methyl. In the case that $R^1$ is hydrogen, the copolymer is acrylic copolymer. In the case that $R^1$ is methyl, the copolymer is methacrylic copolymer.

In the formula (I), M is proton, an alkali metal ion (e.g., Na, K) or an ammonium ion. The ammonium group can be (primary to quaternary) substituted with an organic group (e.g., methyl). Examples of the ammonium groups include $NH_4$, $NH_3(CH_3)_2$, $NH_2(CH_3)_2$, $NH(CH_3)_3$ and $N(CH_3)_4$.

Since the group of COOM is hydrophilic, the copolymer is soluble in water. Accordingly, the orientation layer can be formed by using an aqueous medium.

In the formula (I), m is 10 to 99 mole %, preferably 10 to 95 mole %, and most preferably 25 to 90 mole %.

In the formula (II), $R^2$ is hydrogen, a halogen atom or an alkyl group having 1 to 6 carbon atoms. $R^2$ preferably is hydrogen or an alkyl group having 1 to 6 carbon atoms, more preferably is hydrogen, methyl or ethyl, and most preferably is hydrogen or methyl.

In the formula (II), $L^0$ is a divalent linking group selected from the group consisting of —O—, —CO—, —NH—, —SO$_2$—, an alkylene group, an alkenylene group, an arylene group and a combination thereof. L⁰ preferably is —CO—L⁰⁰— (wherein —CO— is attached to the main chain, and L⁰⁰ is a divalent linking group selected from the group consisting of —O—, —CO—, —NH—, —SO₂—, an alkylene group, an alkenylene group, an arylene group and a combination thereof).

L⁰ more preferably is —CO—O—, —CO—O-alkylene-, —CO—O-alkylene-alkenylene-, —CO—O-alkylene-arylene-, —CO—O-alkylene-O—, —CO—O-alkylene-O—CO—, —CO—O-alkylene-NH—SO₂-arylene-O—, —CO—O-alkylene-O—CO-alkylene-O—, —CO—O-alkylene-CO—NH—, —CO—O-alkylene-NH—SO₂—, —CO—O-alkylene-O—CO-arylene-, —CO—NH, —CO—NH-arylene-, —CO-NH-arylene-CO—O—, —CO—O-arylene-O—CO-alkylene-O-arylene-, —CO—O-arylene-, —CO—NH-arylene-NH—arylene-NH—CO—, —CO—NH-arylene-O—, —CO—O-alkylene-CO—O—, —CO—O-alkylene-CO—, —CO—O-arylene-CO—O— or —CO—NH-alkylene-NH—CO—O—. L⁰ further preferably is —CO—O—, —CO—O-alkylene-NH—SO₂-arylene-O—, —CO—NH—, —CO—NH-arylene-O—, —CO—O-alkylene-, —CO—O-alkylene-arylene- or —CO—O-alkylene-O—CO-arylene-. L⁰ most preferably is —CO—O— or —CO—NH—. In the above-described linking groups, the left side is attached to the main chain, and the right side is attached to R⁰.

The alkylene group can have a branched or cyclic structure. The alkylene group contains preferably 1 to 30 carbon atoms, more preferably 1 to 15 carbon atoms, and most preferably 1 to 12 carbon atoms.

The alkenylene group can have a branched or cyclic structure. The alkenylene group contains preferably 2 to 30 carbon atoms, more preferably 2 to 16 carbon atoms, and most preferably 2 to 4 carbon atoms.

The arylene group preferably is phenylene or naphthylene, more preferably is phenylene, and most preferably is p-phenylene. The arylene group can have a substituent group. Examples of the substituent groups include a halogen atom, carboxyl, cyano, nitro, carbamoyl, sulfamoyl, an alkyl group, a cycloalkyl group, an alkoxy group, an alkylthio group, an acyl group, an acyloxy group, an alkylcarbamoyl group, an alkylsulfamoyl group, an amido group, a sulfonamido group and an alkylsulfonyl group.

In the formula (II), R⁰ is a hydrocarbon group having 10 to 100 carbon atoms or a fluorine atom-substituted hydrocarbon group having 1 to 100 carbon atoms.

The hydrocarbon group is an aliphatic group, an aromatic group or a combination thereof. The aliphatic group can have a branched or cyclic structure. The aliphatic group preferably is an alkyl group (including a cycloalkyl group) or an alkenyl group (including a cycloalkenyl group). The hydrocarbon group can have a substituent group that is not strongly hydrophilic, such as a halogen atom. The hydrocarbon group contains preferably 10 to 80 carbon atoms, more preferably 10 to 60 carbon atoms, and most preferably 10 to 40 carbon atoms.

The hydrocarbon group preferably has a steroid structure. In the present specification, the steroid structure means a cyclopentanohydrophenanthrene ring or a ring obtained by replacing a single bond of the cyclopentanohydrophenanthrene ring with a double bond. The hydrocarbon group having the steroid structure preferably contains 18 to 100 carbon atoms, more preferably contains 19 to 60 carbon atoms, and most preferably contains 20 to 40 carbon atoms.

The hydrocarbon group also preferably contains at least two aromatic (heterocyclic) rings. A hydrocarbon group having at least two aromatic (heterocyclic) rings and a repeating unit having the hydrocarbon at the side chain are described after.

The hydrocarbon moiety of the fluorine atom-substituted hydrocarbon group is an aliphatic group, an aromatic group or a combination thereof. The aliphatic group can have a branched or cyclic structure. The aliphatic group preferably is an alkyl group (including a cycloalkyl group) or an alkenyl group (including a cycloalkenyl group). Besides fluorine atom, the hydrocarbon group can have a substituent group that is not strongly hydrophilic, such as a halogen atom.

The fluorine atom-substituted hydrocarbon group contains preferably 5 to 80 carbon atoms, more preferably 10 to 60 carbon atoms, and most preferably 10 to 40 carbon atoms. The substitution ratio of hydrogen atoms in the hydrocarbon group substituted with fluorine atoms is preferably in the range of 50 to 100 mol %, more preferably in the range of 70 to 100 mol %, further preferably in the range of 80 to 100 mol %, and most preferably in the range of 90 to 100 mol %.

In the formula (II), n is 1 to 90 mole %, preferably is 5 to 80 mole %, and most preferably is 10 to 70 mole %.

Examples of the repeating units (HyC) represented by the formula (II) wherein R⁰ is a hydrocarbon group having 10 to 100 carbon atoms (except hydrocarbon groups having two or more aromatic rings) are shown below.

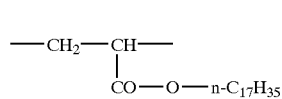
(HyC1)

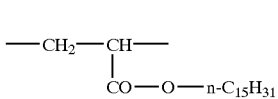
(HyC2)

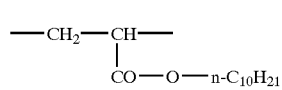
(HyC3)

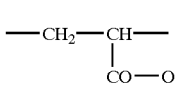
(HyC4)

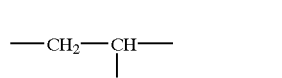
(HyC5)

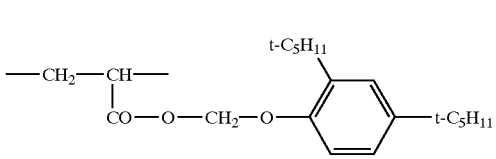
(HyC6)

-continued
(HyC7)
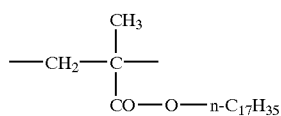
(HyC8)
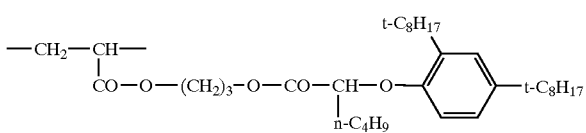
(HyC9)
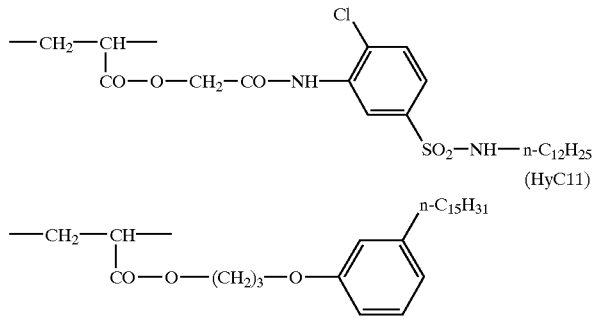
(HyC10)
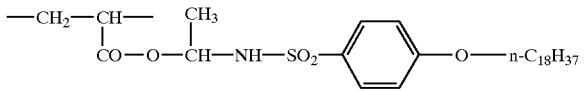
(HyC11)
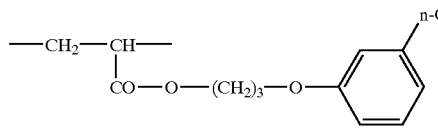
(HyC12)
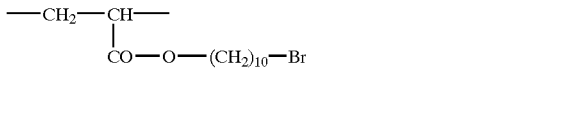
(HyC13)
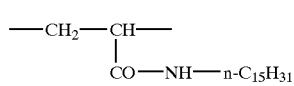
(HyC14)
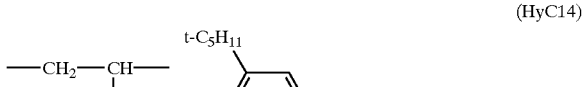
(HyC15)
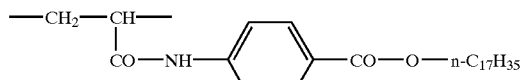
(HyC16)
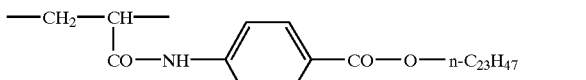
(HyC17)
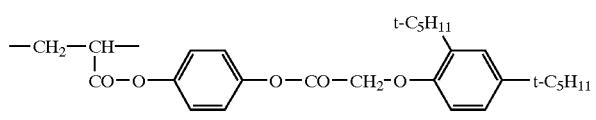
(HyC18)
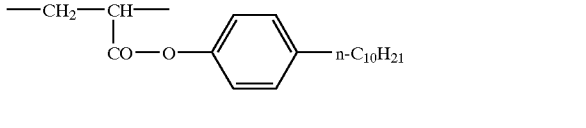
(HyC19)
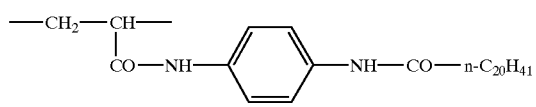
(HyC20)
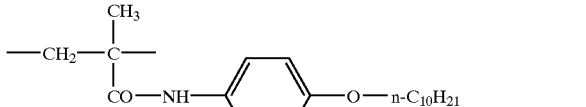
(HyC21)
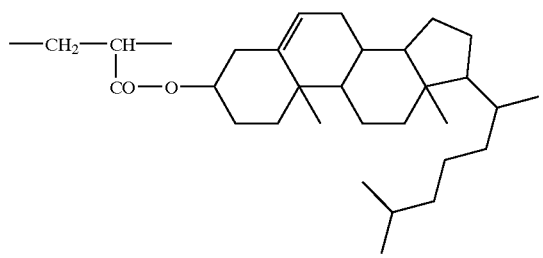
(HyC22)
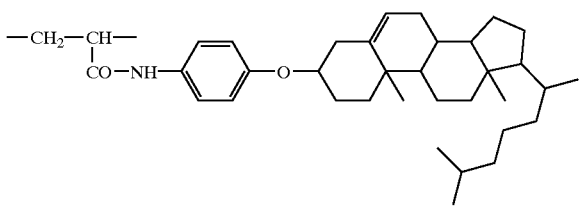
(HyC23)
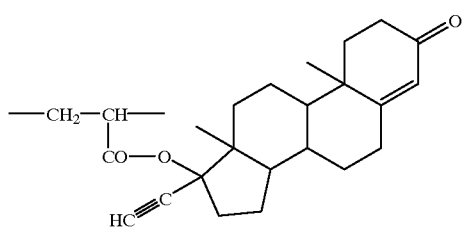
(HyC24)

-continued
(HyC25) 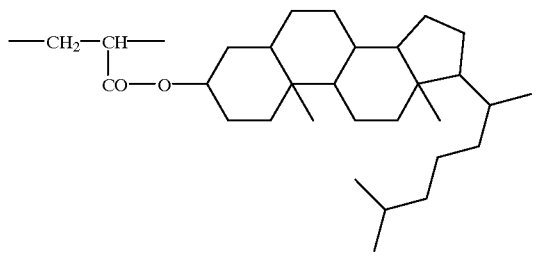 (HyC26) 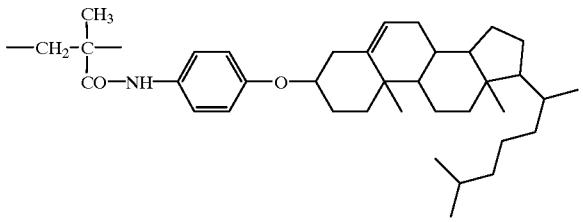
(HyC27) 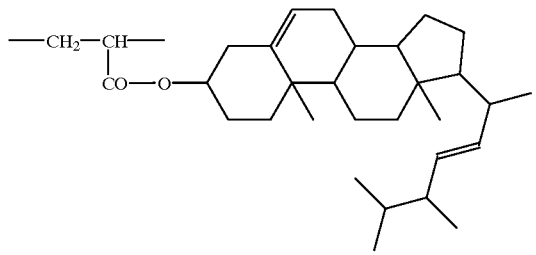 (HyC28) 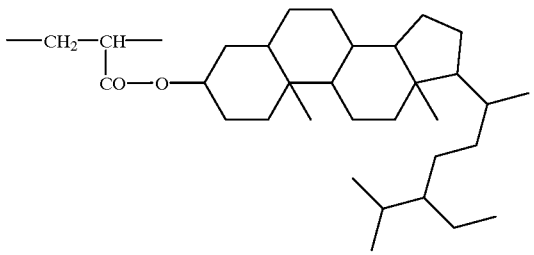
(HyC29) 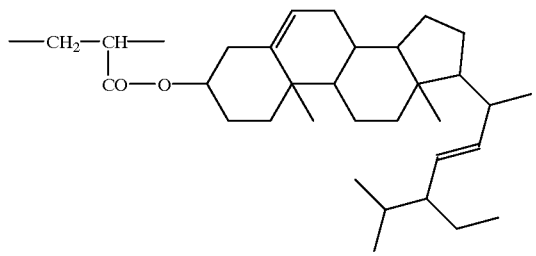 (HyC30) 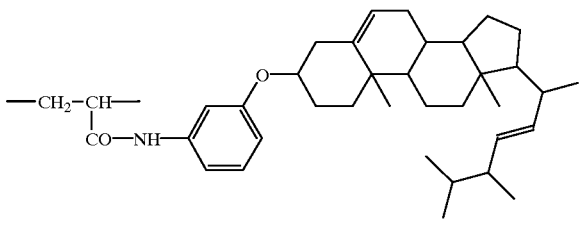
(HyC31) 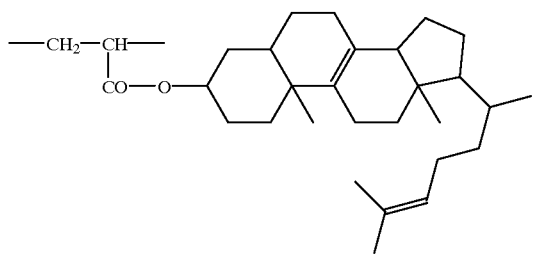 (HyC32) 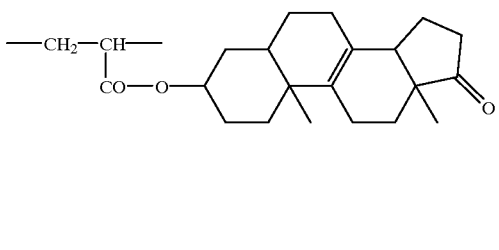
(HyC33) 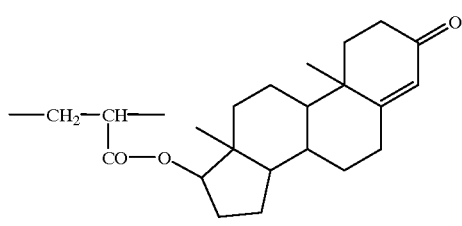 (HyC34) 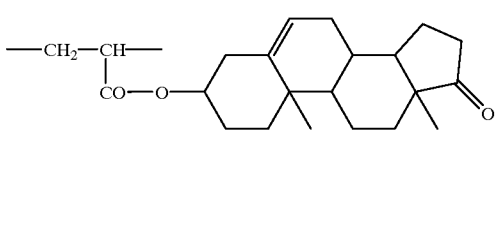
(HyC35) (HyC36)
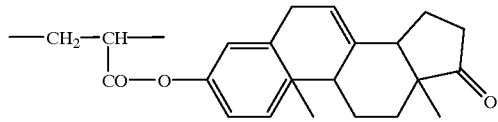

-continued
(HyC37)
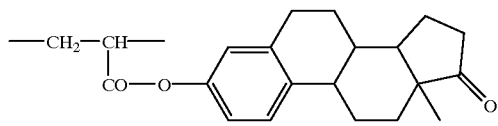
(HyC38)
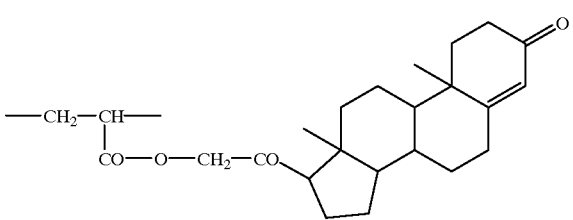
(HyC39)
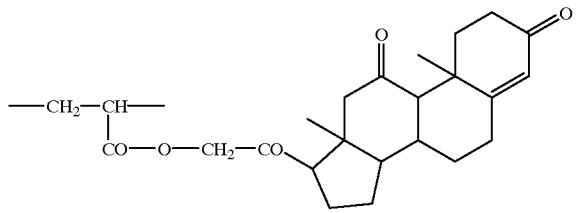
(HyC40)
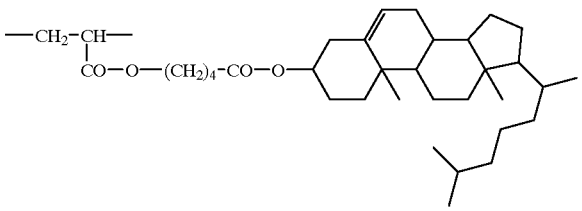
(HyC41)
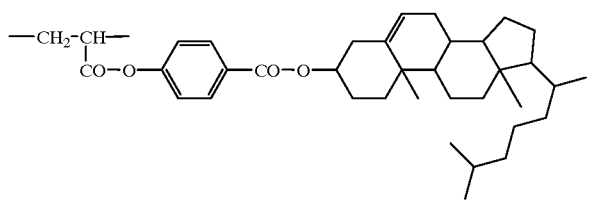
(HyC42)
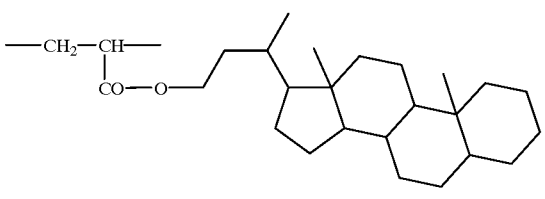
(HyC43)
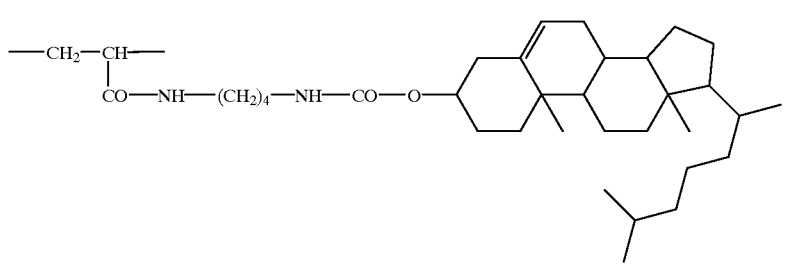
(HyC44)
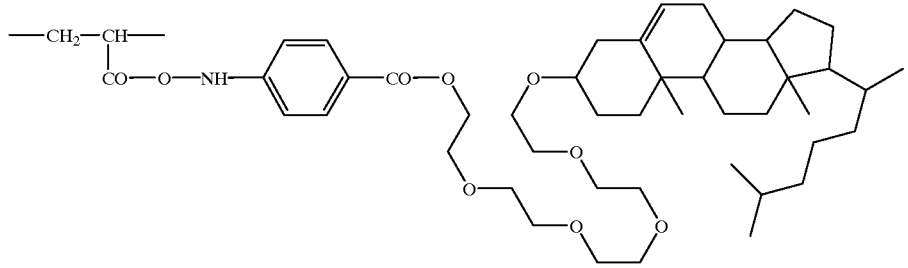
(HyC45)
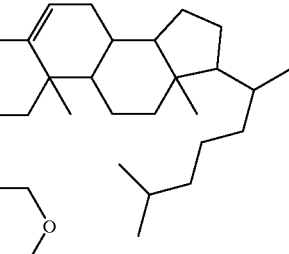
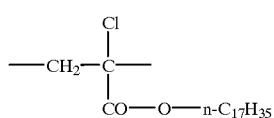

Examples of the (meth)acrylic copolymers having the repeating units (HyC) represented by the formula (II) wherein $R^0$ is a hydrocarbon group having 10 to 100 carbon atoms (except hydrocarbon groups having two or more aromatic rings) are shown below. AA means a repeating unit derived from acrylic acid, and MA means a repeating unit derived from methacrylic acid. The ratio of the repeating unit means mol %.

| | |
|---|---|
| PA1: | -(AA)60-(HyC1)40- |
| PA2: | -(AA)70-(HyC1)30- |
| PA3: | -(AA)60-(HyC2)40- |
| PA4: | -(AA)75-(HyC2)25- |
| PA5: | -(AA)65-(HyC3)35- |
| PA6: | -(AA)80-(HyC3)30- |
| PA7: | -(AA)60-(HyC4)40- |
| PA8: | -(AA)70-(HyC4)30- |
| PA9: | -(AA)70-(HyC5)30- |
| PA10: | -(AA)80-(HyC5)20- |
| PA11: | -(AA)60-(HyC6)40- |
| PA12: | -(AA)70-(HyC6)30- |
| PA13: | -(AA)60-(HyC7)40- |
| PA14: | -(AA)70-(HyC7)30- |
| PA15: | -(AA)60-(HyC8)40- |
| PA16: | -(AA)85-(HyC8)15- |
| PA17: | -(AA)60-(HyC9)40- |
| PA18: | -(AA)70-(HyC9)30- |
| PA19: | -(AA)60-(HyC10)40- |
| PA20: | -(AA)70-(HyC10)30- |
| PA21: | -(AA)60-(HyC11)40- |
| PA22: | -(AA)85-(HyC11)15- |
| PA23: | -(AA)60-(HyC12)40- |
| PA24: | -(AA)50-(HyC12)50- |
| PA25: | -(AA)60-(HyC13)40- |
| PA26: | -(AA)50-(HyC13)50- |
| PA27: | -(AA)60-(HyC14)40- |
| PA28: | -(AA)70-(HyC14)30- |
| PA29: | -(AA)50-(HyC15)50- |
| PA30: | -(AA)60-(HyC15)40- |
| PA31: | -(AA)80-(HyC16)20- |
| PA32: | -(AA)70-(HyC16)30- |
| PA33: | -(AA)85-(HyC17)15- |
| PA34: | -(AA)70-(HyC17)30- |
| PA35: | -(AA)60-(HyC18)40- |
| PA36: | -(AA)70-(HyC18)30- |
| PA37: | -(AA)80-(HyC19)20- |
| PA38: | -(AA)70-(HyC19)30- |
| PA39: | -(AA)60-(HyC20)40- |
| PA40: | -(AA)70-(HyC20)30- |
| PA41: | -(AA)60-(HyC21)40- |
| PA42: | -(AA)70-(HyC21)30- |
| PA43: | -(AA)60-(HyC22)40- |
| PA44: | -(AA)70-(HyC22)30- |
| PA45: | -(AA)90-(HyC23)10- |
| PA46: | -(AA)80-(HyC23)20- |
| PA47: | -(AA)90-(HyC24)10- |
| PA48: | -(AA)80-(HyC24)20- |
| PA49: | -(AA)85-(HyC25)15- |
| PA50: | -(AA)70-(HyC25)30- |
| PA51: | -(AA)60-(HyC26)40- |
| PA52: | -(AA)70-(HyC26)30- |
| PA53: | -(AA)65-(HyC27)35- |
| PA54: | -(AA)60-(HyC27)40- |
| PA55: | -(AA)75-(HyC28)25- |
| PA56: | -(AA)60-(HyC28)40- |
| PA57: | -(AA)60-(HyC29)40- |
| PA58: | -(AA)70-(HyC29)30- |
| PA59: | -(AA)60-(HyC30)40- |
| PA60: | -(AA)70-(HyC30)30- |
| PA61: | -(AA)60-(HyC31)40- |
| PA62: | -(AA)70-(HyC31)30- |
| PA63: | -(AA)80-(HyC32)20- |
| PA64: | -(AA)70-(HyC32)30- |
| PA65: | -(AA)80-(HyC33)20- |
| PA66: | -(AA)70-(HyC33)30- |
| PA67: | -(AA)60-(HyC34)40- |
| PA68: | -(AA)70-(HyC34)30- |
| PA69: | -(AA)90-(HyC35)10- |
| PA70: | -(AA)80-(HyC35)20- |
| PA71: | -(AA)60-(HyC36)40- |
| PA72: | -(AA)50-(HyC36)50- |
| PA73: | -(AA)60-(HyC37)40- |
| PA74: | -(AA)70-(HyC37)30- |
| PA75: | -(AA)90-(HyC38)10- |
| PA76: | -(AA)80-(HyC38)20- |
| PA77: | -(AA)60-(HyC39)40- |
| PA78: | -(AA)70-(HyC39)30- |
| PA79: | -(AA)80-(HyC40)20- |
| PA80: | -(AA)70-(HyC40)30- |
| PA81: | -(AA)60-(HyC41)40- |
| PA82: | -(AA)70-(HyC41)30- |
| PA83: | -(AA)60-(HyC42)40- |
| PA84: | -(AA)70-(HyC42)30- |
| PA85: | -(MA)70-(HyC1)30- |
| PA86: | -(MA)60-(HyC2)40- |
| PA87: | -(MA)70-(HyC3)30- |
| PA88: | -(MA)60-(HyC4)40- |
| PA89: | -(MA)70-(HyC5)30- |
| PA90: | -(MA)60-(HyC6)40- |
| PA91: | -(MA)70-(HyC7)30- |
| PA92: | -(NA)60-(HyC8)40- |
| PA93: | -(MA)70-(HyC9)30- |
| PA94: | -(MA)60-(HyC10)40- |
| PA95: | -(MA)70-(HyC11)30- |
| PA96: | -(MA)60-(HyC12)40- |
| PA97: | -(MA)70-(HyC13)30- |
| PA98: | -(MA)60-(HyC14)40- |
| PA99: | -(MA)70-(HyC15)30- |
| PA100: | -(MA)60-(HyC16)40- |
| PA101: | -(MA)70-(HyC17)30- |
| PA102: | -(MA)60-(HyC18)40- |
| PA103: | -(MA)70-(HyC19)30- |
| PA104: | -(MA)60-(HyC20)40- |
| PA105: | -(MA)60-(HyC21)40- |
| PA106: | -(MA)60-(HyC22)40- |
| PA107: | -(MA)60-(HyC23)40- |
| PA108: | -(MA)60-(HyC24)40- |
| PA109: | -(MA)60-(HyC25)40- |
| PA110: | -(MA)60-(HyC26)40- |
| PA111: | -(MA)60-(HyC27)40- |
| PA112: | -(MA)60-(HyC28)40- |
| PA113: | -(MA)60-(HyC29)40- |
| PA114: | -(MA)60-(HyC30)40- |
| PA115: | -(MA)60-(HyC31)40- |
| PA116: | -(MA)60-(HyC32)40- |
| PA117: | -(MA)60-(HyC33)40- |
| PA118: | -(MA)60-(HyC34)40- |
| PA119: | -(MA)60-(HyC35)40- |
| PA120: | -(MA)60-(HyC36)40- |
| PA121: | -(MA)60-(HyC37)40- |
| PA122: | -(MA)60-(HyC38)40- |
| PA123: | -(MA)60-(HyC39)40- |
| PA124: | -(MA)60-(HyC40)40- |
| PA125: | -(MA)60-(HyC41)40- |
| PA126: | -(MA)60-(HyC42)40- |

Examples of the repeating units (FRU) represented by the formula (II) wherein $R^0$ is a fluorine atom-substituted hydrocarbon group having 1 to 100 carbon atoms are shown below.

(FRU1)

(FRU2)

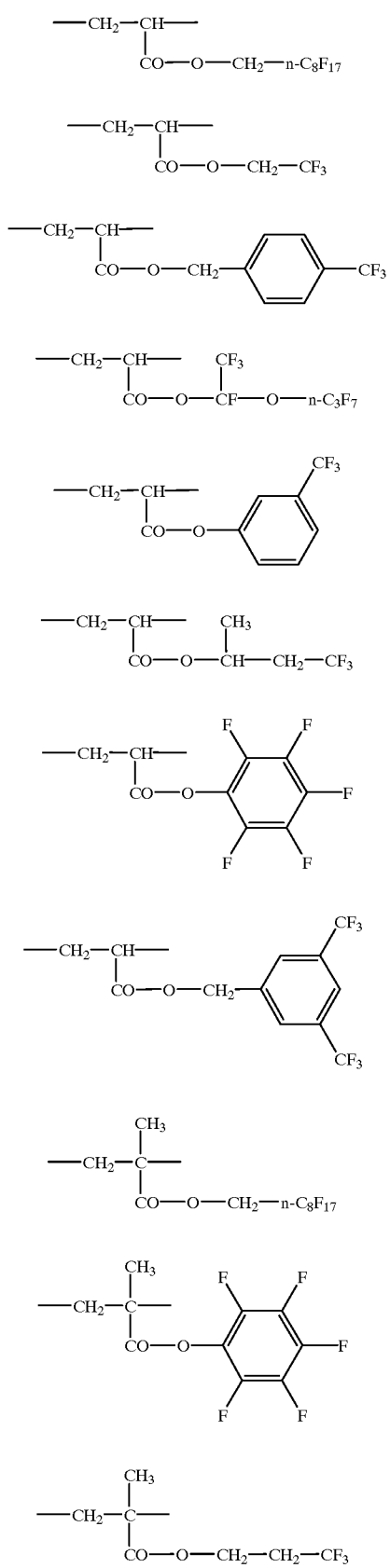

Examples of the (meth)acrylic copolymers having the repeating units (FRU) represented by the formula (II) wherein $R^0$ is a fluorine atom-substituted hydrocarbon group having 1 to 100 carbon atoms are shown below. AA means a repeating unit derived from acrylic acid, and MA means a repeating unit derived from methacrylic acid. The ratio of the repeating unit means mol %.

| | |
|---|---|
| PA201: | -(AA)60-(FRU1)40- |
| PA202: | -(AA)70-(FRU1)30- |
| PA203: | -(AA)60-(FRU2)40- |
| PA204: | -(AA)70-(FRU2)30- |
| PA205: | -(AA)70-(FRU3)30- |
| PA206: | -(AA)80-(FRU3)20- |
| PA207: | -(AA)70-(FRU4)30- |
| PA208: | -(AA)80-(FRU4)20- |

| | |
|---|---|
| PA209: | -(AA)60-(FRU5)40- |
| PA210: | -(AA)70-(FRU5)30- |
| PA211: | -(AA)60-(FRU6)40- |
| PA212: | -(AA)70-(FRU6)30- |
| PA213: | -(AA)60-(FRU7)40- |
| PA214: | -(AA)70-(FRU7)30- |
| PA215: | -(AA)60-(FRU8)40- |
| PA216: | -(AA)50-(FRU8)50- |
| PA217: | -(AA)60-(FRU9)40- |
| PA218: | -(AA)70-(FRU9)30- |
| PA219: | -(AA)60-(FRU10)40- |
| PA220: | -(AA)70-(FRU10)30- |
| PA221: | -(AA)60-(FRU11)40- |
| PA222: | -(AA)50-(FRU11)50- |
| PA223: | -(AA)60-(FRU12)40- |
| PA224: | -(AA)70-(FRU12)30- |
| PA225: | -(AA)80-(FRU13)20- |
| PA226: | -(AA)75-(FRU13)25- |
| PA227: | -(AA)60-(FRU14)40- |
| PA228: | -(AA)70-(FRU14)30- |
| PA229: | -(AA)85-(FRU15)15- |
| PA230: | -(AA)75-(FRU15)25- |
| PA231: | -(AA)60-(FRU16)40- |
| PA232: | -(AA)70-(FRU16)30- |
| PA233: | -(AA)60-(FRU17)40- |
| PA234: | -(AA)70-(FRU17)30- |
| PA235: | -(AA)60-(FRU18)40- |
| PA236: | -(AA)50-(FRU18)50- |
| PA237: | -(AA)60-(FRU19)40- |
| PA238: | -(AA)70-(FRU19)30- |
| PA239: | -(AA)60-(FRU20)40- |
| PA240: | -(AA)70-(FRU20)30- |
| PA241: | -(MA)60-(FRU1)40- |
| PA242: | -(MA)60-(FRU2)40- |
| PA243: | -(MA)60-(FRU3)40- |
| PA244: | -(MA)60-(FRU4)40- |
| PA245: | -(MA)60-(FRU5)40- |
| PA246: | -(MA)60-(FRU6)40- |
| PA247: | -(MA)60-(FRU7)40- |
| PA248: | -(MA)60-(FRU8)40- |
| PA249: | -(MA)60-(FRU9)40- |
| PA250: | -(MA)60-(FRU10)40- |
| PA251: | -(MA)60-(FRU11)40- |
| PA252: | -(MA)60-(FRU12)40- |
| PA253: | -(MA)60-(FRU13)40- |
| PA254: | -(MA)60-(FRU14)40- |
| PA255: | -(MA)60-(FRU15)40- |
| PA256: | -(MA)60-(FRU16)40- |
| PA257: | -(MA)60-(FRU17)40- |
| PA258: | -(MA)60-(FRU18)40- |
| PA259: | -(MA)60-(FRU19)40- |
| PA260: | -(MA)60-(FRU20)40- |

The (meth)acrylic copolymer can have a polymerizable group. A copolymer having a polymerizable group is used in combination with a rod-like liquid crystal molecule having a polymerizable group to chemically bind the copolymer and the liquid crystal molecule along an interface between a liquid crystal layer and an orientation layer. The mechanical strength of a liquid crystal element (such as an optical compensatory sheet) can be improved by the chemical bond.

The polymerizable group of the (meth)acrylic copolymer is determined depending on the polymerizable group (Q) of the rod-like liquid crystal molecule (described below). The polymerizable group (Q) of the liquid crystal molecule preferably is an unsaturated polymerizable group (Q1 to Q7 in the examples described about liquid crystal molecule), an epoxy group (Q8) or an aziridinyl group (Q9), more preferably is an unsaturated polymerizable group, and most preferably is an ethylenically unsaturated group (Q1 to Q6). The polymerizable group of the (meth)acrylic copolymer is also preferably is an unsaturated polymerizable group, an aziridinyl group or an epoxy group, more preferably is an unsaturated polymerizable group, and most preferably is an ethylenically unsaturated group.

The polymerizable group is preferably not directly attached to the main chain of the (meth)acrylic copolymer. In other words, a linking group preferably intervenes between the main chain and the polymerizable group. Examples of the linking groups include —CO—, —CO—O—, —CO—NH—, —CO—NH-alkylene-, —CO—NH-alkylene-O—, —CO—NH-alkylene-CO—O—, —CO—NH-alkylene-O—CO—, —CO—NH-alkylene-CO—NH—, —CO-alkylene-O—CO—, —CO-arylene-O-alkylene-O—CO—, —CO-arylene-O—alkylene-O—, —CO-arylene-O-alkylene- and —CO-alkylene-O—CO. In each linking group, the left side is attached to the main chain, and the right side is attached to the polymerizable group.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The arylene group preferably is phenylene or naphthylene, more preferably is phenylene, and most preferably is p-phenylene. The arylene group can have a substituent group. Examples of the substituent groups include a halogen atom (F, Cl, Br), carboxyl, cyano, nitro, carbamoyl, sulfamoyl, an alkyl group, a cycloalkyl group, an alkoxy group, an alkylthio group, an acyl group, an acyloxy group, an alkylcarbamoyl group, an alkylsulfamoyl group, an amido group, a sulfonamido group and an alkylsulfonyl group.

The alkyl group can have a branched structure. The alkyl group preferably contains 1 to 20 carbon atoms, more preferably contains 1 to 15 carbon atoms, further preferably contains 1 to 10 carbon atoms, and most preferably contains 1 to 6 carbon atoms.

The cycloalkyl group preferably is cyclohexyl.

The alkoxy group can have a branched structure. The alkoxy group preferably contains 1 to 20 carbon atoms, more preferably contains 1 to 15 carbon atoms, further preferably contains 1 to 10 carbon atoms, and most preferably contains 1 to 6 carbon atoms.

The alkylthio group can have a branched structure. The alkylthio group preferably contains 1 to 20 carbon atoms, more preferably contains 1 to 15 carbon atoms, further preferably contains 1 to 10 carbon atoms, and most preferably contains 1 to 6 carbon atoms.

The acyl group preferably contains 2 to 20 carbon atoms, more preferably contains 2 to 15 carbon atoms, further preferably contains 2 to 10 carbon atoms, and most preferably contains 2 to 6 carbon atoms.

The acyloxy group preferably contains 2 to 20 carbon atoms, more preferably contains 2 to 15 carbon atoms, further preferably contains 2 to 10 carbon atoms, and most preferably contains 2 to 6 carbon atoms.

The alkylcarbamoyl group preferably contains 2 to 20 carbon atoms, more preferably contains 2 to 15 carbon atoms, further preferably contains 2 to 10 carbon atoms, and most preferably contains 2 to 6 carbon atoms. The alkyl moiety of the alkylcarbamoyl group can further have a substituent group (e.g., an alkoxy group).

The alkylsulfamoyl group preferably contains 2 to 20 carbon atoms, more preferably contains 2 to 15 carbon atoms, further preferably contains 2 to 10 carbon atoms, and most preferably contains 2 to 6 carbon atoms. The alkyl moiety of the alkylsulfamoyl group can further have a substituent group (e.g., an alkoxy group).

The amido group preferably contains 2 to 20 carbon atoms, more preferably contains 2 to 15 carbon atoms, further preferably contains 2 to 10 carbon atoms, and most preferably contains 2 to 6 carbon atoms.

The sulfonamido group preferably contains 1 to 20 carbon atoms, more preferably contains 1 to 15 carbon atoms, further preferably contains 1 to 10 carbon atoms, and most preferably contains 1 to 6 carbon atoms.

The alkylsulfonyl group preferably contains 1 to 20 carbon atoms, more preferably contains 1 to 15 carbon atoms, further preferably contains 1 to 10 carbon atoms, and most preferably contains 1 to 6 carbon atoms. The alkyl moiety of the alkylsulfonyl group can further have a substituent group (e.g., an alkoxy group).

The side chain of the copolymer can have two or more polymerizable groups.

The polymerizable groups are introduced into the side chains of repeating units, or otherwise they are introduced into repeating units having the aforementioned hydrocarbon or fluorine atom-substituted hydrocarbon groups. The repeating unit having the polymerizable group at the side chain and the repeating unit having both the polymerizable group and the hydrocarbon or fluorine atom-substituted hydrocarbon group are described below in order.

The repeating unit having the polymerizable group at the side chain is preferably represented by the formula (IV).

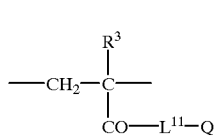

(IV)

In the formula (IV), $R^3$ is hydrogen or methyl.

In the formula (IV), $L^{11}$ is a divalent linking group selected from the group consisting of —NH-alkylene-O—CO—, -alkylene-O—CO—, —O-alkylene-O—CO—, —O-arylene-O-alkylene-O—CO—, —O-arylene-O-alkylene-, —O-arylene-O— —NH-alkylene-O—CO—, —NH-alkylene-O— and —NH-alkylene. $L^{11}$ preferably is —NH-alkylene-O—CO—, -alkylene-O—CO—, —O-alkylene-O—CO—, —O-arylene-O-alkylene-O—CO—, —O-arylene-O— or —NH-alkylene-O—CO—, and more preferably is —NH-alkylene-O—CO—.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The arylene group preferably is phenylene or naphthylene, more preferably is phenylene, and most preferably is p-phenylene. The arylene group can have a substituent group. Examples of the substituent groups are the same as the above-described substituent groups.

In the formula (IV), Q is a polymerizable group. The polymerizable group of the copolymer is preferably analogous to the polymerizable group (Q) of the liquid crystal molecule, as is described above.

Examples of the repeating units having a polymerizable group at the side chain are shown below.

(IV-1)

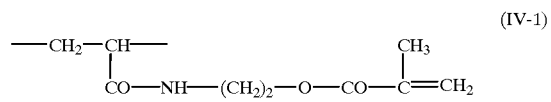

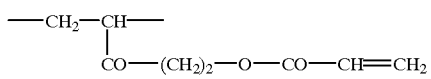

(IV-2)

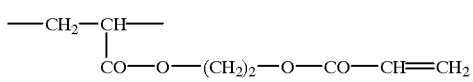

(IV-3)

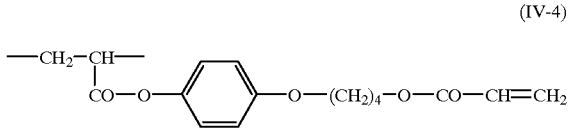

(IV-4)

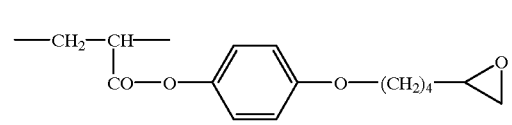

(IV-5)

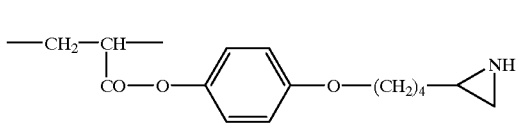

(IV-6)

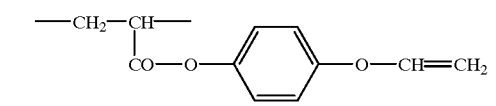

(IV-7)

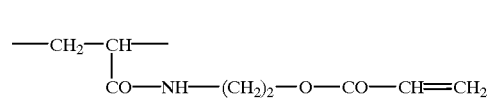

(IV-8)

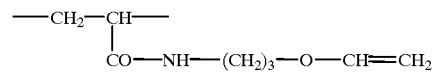

(IV-9)

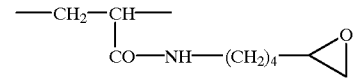

(IV-10)

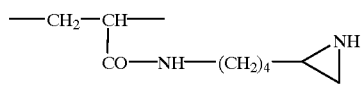

(IV-11)

(IV-12)

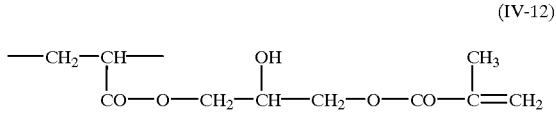

In the case that a repeating unit having a polymerizable group at the side chain is introduced into the copolymer, the copolymer preferably contains the polymerizable repeating units in an amount of 0.1 to 10 mol %, and more preferably in an amount of 3 to 5 mol %.

The polymerizable group can be introduced into the repeating unit having a hydrocarbon group or the repeating unit containing fluorine atoms. The polymerizable group preferably is a substituent group of a hydrocarbon group or a hydrocarbon group substituted with fluorine atom, and more preferably is a substituent group of the hydrocarbon group (or the hydrocarbon group substituted with fluorine atom) positioned at the end of the side chain.

The polymerizable group is preferably not directly attached to the hydrocarbon group (or the hydrocarbon group substituted with fluorine atom). In other words, a linking group preferably intervenes between the hydrocarbon group and the polymerizable group. Examples of the linking groups include —O—, —CO—, —O—CO—, —CO—O—, —O—CO—O—, —CO—NH, —SO$_2$—NH—, —NH—CO—, —NH—CO—O—, —NH-SO$_2$—, -alkylene-, -alkenylene-, -alkynylene-, —O-alkylene- and -alkylene-O—, in which the left side is attached to the hydrocarbon group, and the right side is attached to the polymerizable group.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The alkenylene group can have a branched or cyclic structure. The alkenylene group contains preferably 2 to 30 carbon atoms, more preferably 2 to 20 carbon atoms, further preferably 2 to 15 carbon atoms, and most preferably 2 to 12 carbon atoms.

The alkynylene group can have a branched or cyclic structure. The alkynylene group contains preferably 2 to 30 carbon atoms, more preferably 2 to 20 carbon atoms, further preferably 2 to 15 carbon atoms, and most preferably 2 to 12 carbon atoms.

The hydrocarbon group (or the hydrocarbon group substituted with fluorine atom) can have two or more polymerizable groups.

The repeating unit having both the polymerizable group and the (fluorine-substituted) hydrocarbon group at the side chain is preferably represented by the formula (V).

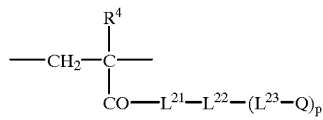

(V)

In the formula (V), R$^4$ is hydrogen or methyl.

In the formula (V), L$^{21}$ is a divalent linking group selected from the group consisting of —CO—, —SO$_2$—, —NH—, -alkylene-, -alkenylene-, -arylene- and a combination thereof. L$^{21}$ is the same as L$^0$ in the formula (II).

In the formula (V), L$^{22}$ is a divalent hydrocarbon group containing 10 to 100 carbon atoms or a fluorine atom-substituted divalent hydrocarbon group containing 1 to 100 carbon atoms. L$^{22}$ is the same as R$^0$ in the formula (II), except that the groups of —L$^{23}$—Q are attached to the L$^{22}$.

In the formula (V), L$^{23}$ is a single bond or a divalent linking group selected from the group consisting of —O—, —CO—, —O—CO—, —CO—O—, —O—CO—O—, —CO—NH, —SO$_2$—NH—, —NH—CO—, —NH—CO—O—, —NH—SO$_2$—, -alkylene-, -alkenylene-, -alkynylene, —O-alkylene- and -alkylene-O—.

The alkylene group, the alkenylene group and the alkylene group are the same as those described above.

In the formula (V), Q is a polymerizable group. The polymerizable group of the copolymer is preferably analogous to the polymerizable group (Q) of the liquid crystal molecule, as is described above.

In the formula (V), p is 1, 2 or 3, preferably is 1 or 2, and more preferably is 1.

In the case that a repeating unit having both a hydrocarbon group containing 10 to 100 carbon atoms (or a fluorine-substituted hydrocarbon group containing 10 to 100 carbon atoms) and a polymerizable group is introduced into the copolymer, the copolymer preferably contains the polymerizable hydrocarbon repeating units in an amount of 1 to 90 mol %, and more preferably in an amount of 3 to 50 mol %.

The copolymer can have (1) a repeating unit having a hydrocarbon group (or a hydrocarbon group substituted with fluorine atom) and (2) a repeating unit having a polymerizable group.

The copolymer can also have (3) a repeating unit having both a hydrocarbon group (or a hydrocarbon group substituted with fluorine atom) and a polymerizable group.

The copolymer can further have a combination of the above-described repeating units. Accordingly, the present invention can use a (meth)acrylic copolymer having the repeating units (1) and (3), a (meth)acrylic copolymer having the repeating units (2) and (3), or a (meth)acrylic copolymer having the repeating units (1), (2) and (3).

The copolymer having a hydrocarbon group containing 10 to 100 carbon atoms (or a fluorine-substituted hydrocarbon group containing 10 to 100 carbon atoms) at the side chain can be prepared according to a conventional method. For example, the copolymer can be obtained by reacting carboxyl of poly(meth)acrylic acid with a terminal hydroxyl group of an alcohol corresponding to a side chain to form an ester bond. The copolymer can also be obtained by reacting carboxyl of poly(meth)acrylic acid with a terminal amino group of an amine corresponding to a side chain to form an amido bond.

The hydrocarbon group preferably contains two or more aromatic rings. The aromatic rings include an aromatic heterocyclic ring. The hydrocarbon group more preferably contains two, three or four aromatic rings. The repeating unit having a hydrocarbon group containing two, three or four aromatic rings at the side chain is preferably represented by the formula (VI).

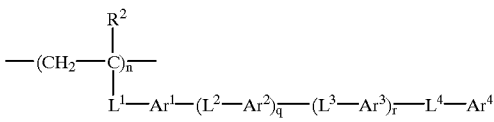

(VI)

In the formula (VI), R$^2$ is hydrogen, a halogen atom or an alkyl group having 1 to 6 carbon atoms. R$^2$ preferably is hydrogen or an alkyl group having 1 to 6 carbon atoms, more preferably is hydrogen, methyl or ethyl, and most preferably is hydrogen or methyl.

In the formula (VI), L$^1$ is a divalent linking group selected from the group consisting of —O—, —CO—, —NH—, an alkylene group and a combination thereof. L$^1$ preferably is —CO—L$^{10}$— (wherein —CO— is attached to the main chain, and L$^{10}$ is a divalent linking group selected from the group consisting of —O—, —CO—, —NH—, an alkylene group and a combination thereof).

L$^1$ more preferably is —CO—O—, —CO—NH—, —CO—O-alkylene-CO—O-alkylene-O— or —CO—O-alkylene-CO—O—, more preferably is —CO—O— or —CO—NH—.

In the formula (VI), each of L$^2$, L$^3$ and L$^4$ independently is a single bond, -ethynylene-(—C≡C—), —CO—, —O—CO—, —CO—O—, -alkylene-O—, —CO—NH—, —O—CO—O—, —NH—SO$_2$— or —NH—CO—O—. At least one of L$^2$, L$^3$ and L$^4$ preferably is a single bond or -ethynylene-(—C≡C—).

The alkylene group can have a branched or cyclic structure. The alkylene group contains preferably 1 to 30 carbon atoms, more preferably 1 to 15 carbon atoms, and most preferably 1 to 12 carbon atoms.

In the formula (VI), each of $Ar^1$, $Ar^2$, $Ar^3$ and $Ar^4$ independently is an aromatic ring (including an aromatic heterocyclic ring) which can have a substituent group.

The aromatic ring preferably is a hydrocarbon ring, more preferably is a hydrocarbon aromatic ring having 6 to 18 carbon atoms. Examples of the hydrocarbon aromatic rings include benzene ring, naphthalene ring, anthracene ring, phenanthrene ring, pyrene ring and naphthacene ring. Examples of the aromatic heterocyclic rings include pyridine ring and pyrimidine ring. Each of $Ar^1$, $Ar^2$, $Ar^3$ and $Ar^4$ more preferably is benzene ring or naphthalene ring, and most preferably is benzene ring.

Examples of the substituent groups of the aromatic rings include a halogen atom, carboxyl, cyano, nitro, carbamoyl, sulfamoyl, an alkyl group, a cycloalkyl group, an alkoxy group, an alkylthio group, an acyl group, an acyloxy group, an alkylcarbamoyl group, an alkylsulfamoyl group, an amido group, a sulfonamido group and an alkylsulfonyl group.

In the formula (VI), each of q and r is 0 or 1. It is preferred that q be 0 or 1 and r be 0 (two or three aromatic rings). It is more preferred that each of q and r be 0 (two aromatic rings).

In the formula (VI), n is 1 to 90 mole %, preferably is 5 to 80 mole %, and more preferably is 10 to 70 mole %.

Examples of the repeating units represented by the formula (VI) (except that $L^2$, $L^3$ or $L^4$ is —C≡C—) are shown below.

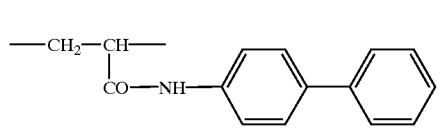
(VI-1)

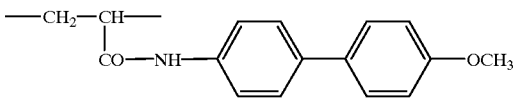
(VI-2)

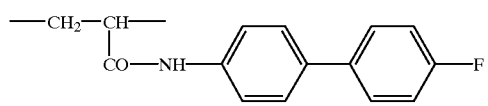
(VI-3)

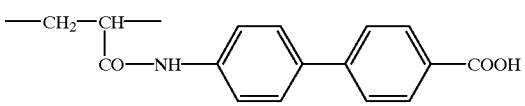
(VI-4)

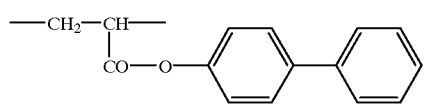
(VI-5)

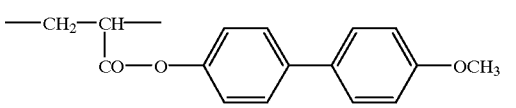
(VI-6)

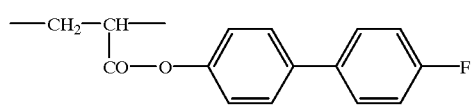
(VI-7)

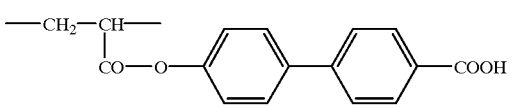
(VI-8)

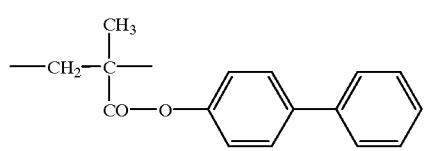
(VI-9)

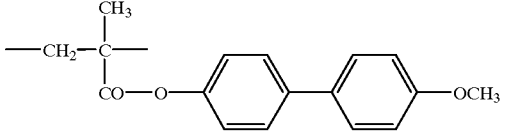
(VI-10)

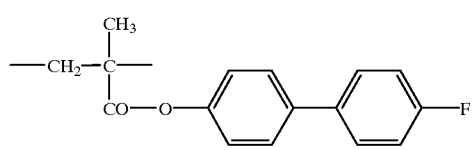
(VI-11)

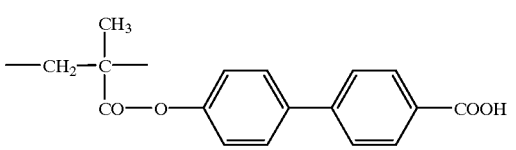
(VI-12)

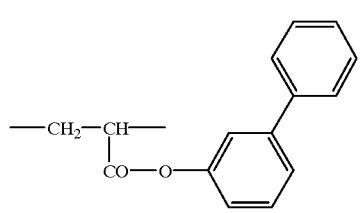
(VI-13)

(VI-14)

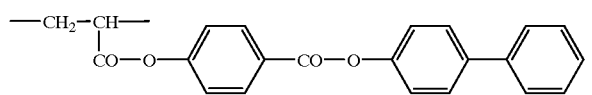
(VI-15)

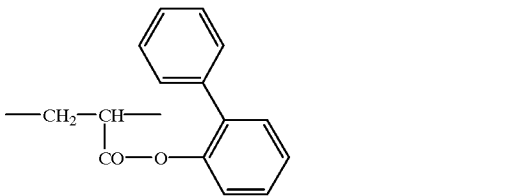
(VI-16)

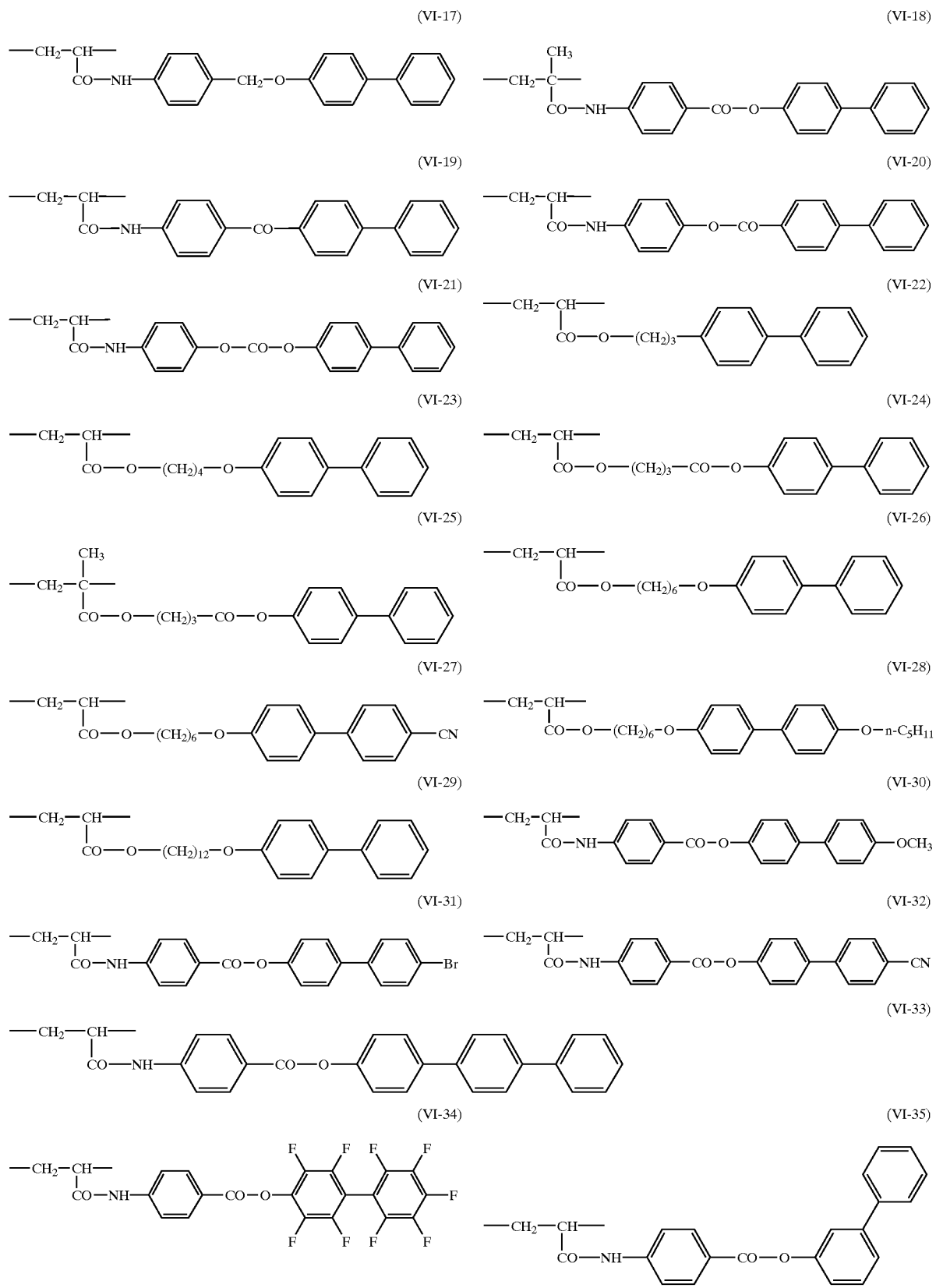

-continued
(VI-36)
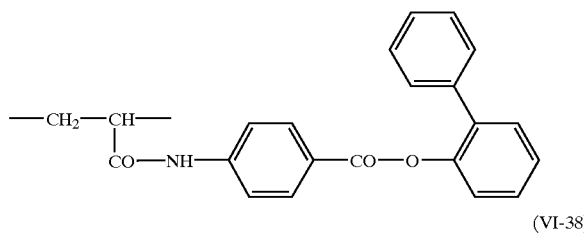
(VI-37)
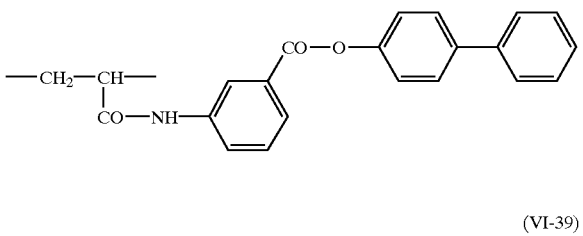
(VI-38)
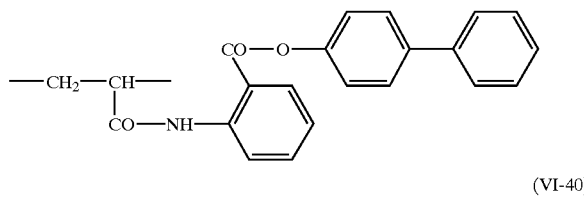
(VI-39)
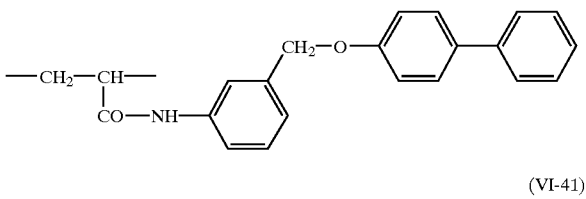
(VI-40)
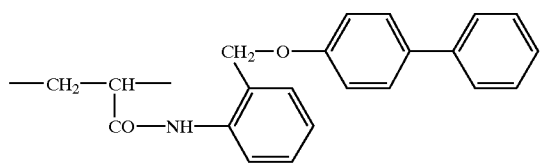
(VI-41)
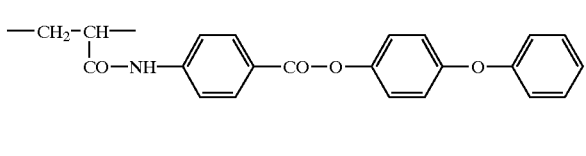
(VI-42)
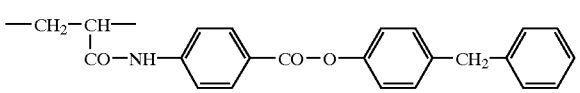
(VI-43)
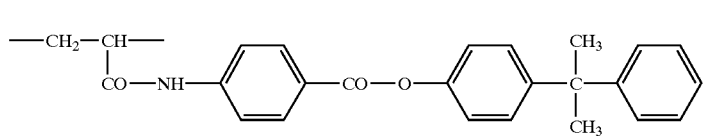
(VI-44)
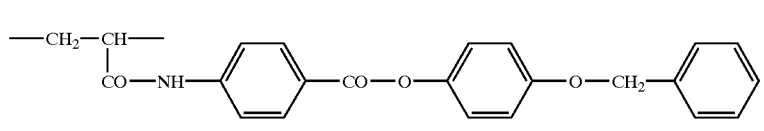
(VI-45)
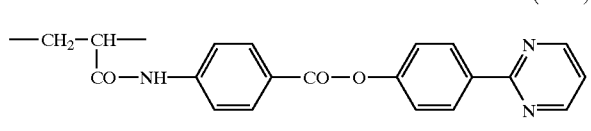
(VI-46)
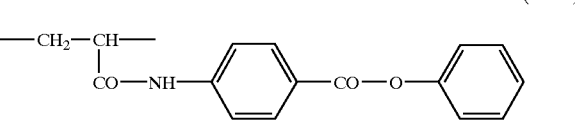
(VI-47)
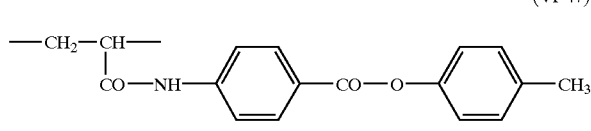
(VI-48)
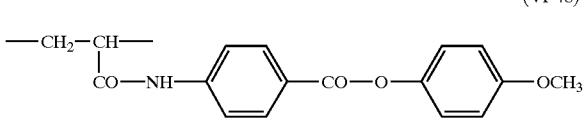
(VI-49)
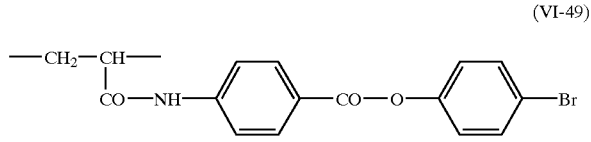
(VI-50)
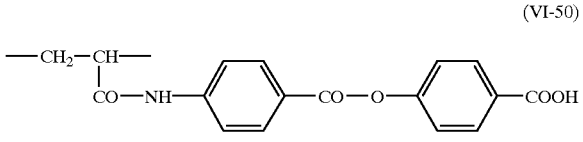
(VI-51)
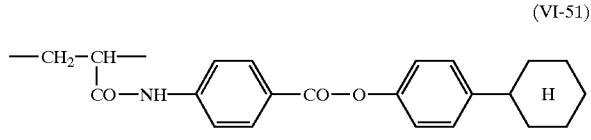
(VI-52)
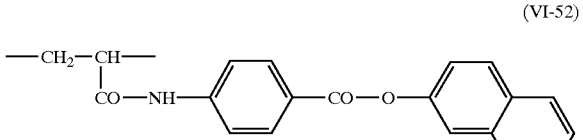

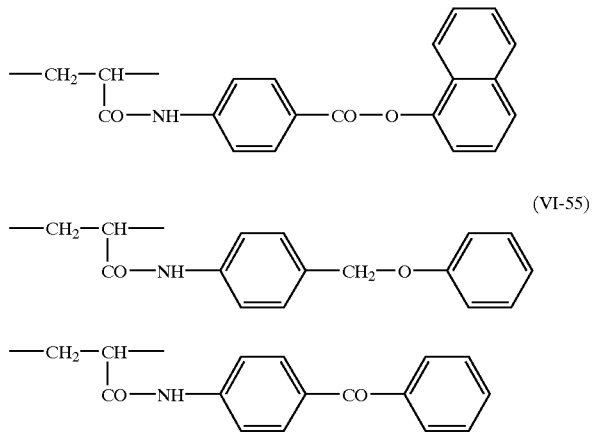

Examples of the (meth)acrylic copolymers having the repeating units represented by the formula (VI) (except that $L^2$, $L^3$ or $L^4$ is —C≡C—) are shown below. AA means a repeating unit derived from acrylic acid, and MA means a repeating unit derived from methacrylic acid. The ratio of the repeating unit means mol %.

| | |
|---|---|
| PA301: | -(AA)60-(VI-1)40- |
| PA302: | -(AA)70-(VI-2)30- |
| PA303: | -(AA)60-(VI-5)40- |
| PA304: | -(AA)65-(VI-9)55- |
| PA305: | -(AA)70-(VI-11)30- |
| PA306: | -(AA)80-(VI-15)20- |
| PA307: | -(AA)70-(VI-15)30- |
| PA308: | -(AA)60-(VI-15)40- |
| PA309: | -(AA)70-(VI-16)30- |
| PA310: | -(AA)60-(VI-16)40- |
| PA311: | -(AA)50-(VI-16)50- |
| PA312: | -(AA)70-(VI-18)30- |
| PA313: | -(AA)60-(VI-18)40- |
| PA314: | -(AA)50-(VI-18)50- |
| PA315: | -(AA)60-(VI-23)40- |
| PA316: | -(AA)60-(VI-25)40- |
| PA317: | -(AA)60-(VI-32)40- |
| PA318: | -(AA)60-(VI-35)40- |
| PA319: | -(AA)60-(VI-37)40- |
| PA320: | -(AA)60-(VI-45)40- |
| PA321: | -(AA)60-(VI-55)40- |
| PA322: | -(MA)60-(VI-1)40- |

-continued

| | |
|---|---|
| PA323: | -(MA)70-(VI-2)30- |
| PA324: | -(MA)60-(VI-5)40- |
| PA325: | -(MA)65-(VI-9)35- |
| PA326: | -(MA)70-(VI-11)30- |
| PA327: | -(MA)80-(VI-15)20- |
| PA328: | -(MA)70-(VI-15)30- |
| PA329: | -(MA)60-(VI-15)40- |
| PA330: | -(MA)70-(VI-16)30- |
| PA331: | -(MA)60-(VI-16)40- |
| PA332: | -(MA)50-(VI-16)50- |
| PA333: | -(MA)70-(VI-18)30- |
| PA334: | -(MA)60-(VI-18)40- |
| PA335: | -(MA)50-(VI-18)50- |
| PA336: | -(MA)60-(VI-23)40- |
| PA337: | -(MA)60-(VI-25)40- |
| PA338: | -(MA)60-(VI-32)40- |
| PA339: | -(MA)60-(VI-35)40- |
| PA340: | -(MA)60-(VI-37)40- |
| PA341: | -(MA)60-(VI-45)40- |
| PA342: | -(MA)60-(VI-55)40- |

The repeating units represented by the formula (VI) preferably has a tolan structure (wherein $L^2$, $L^3$ or $L^4$ is —C≡C—, and the rings attached to both sides of —C≡C— are aromatic hydrocarbon rings).

Examples of the repeating units represented by the formula (VI) having tolan structures are shown below.

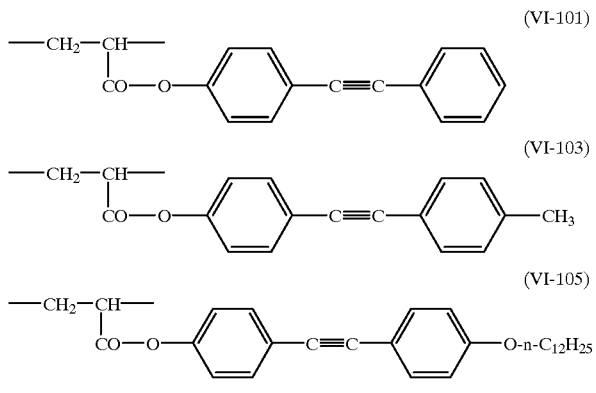
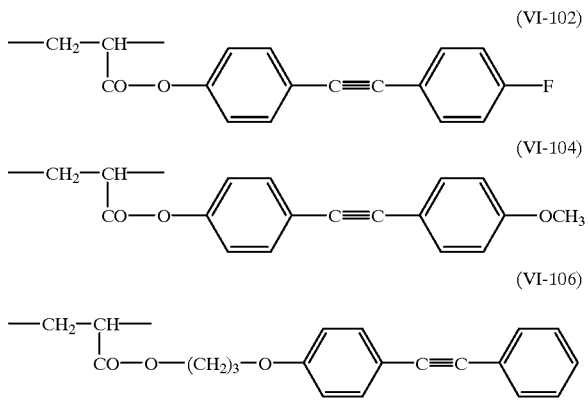

-continued
(VI-107)
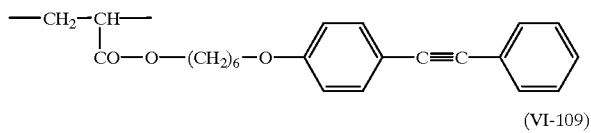
(VI-108)
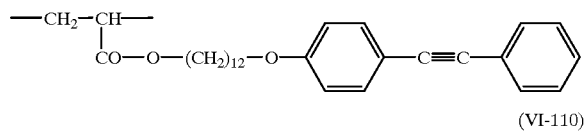
(VI-109)
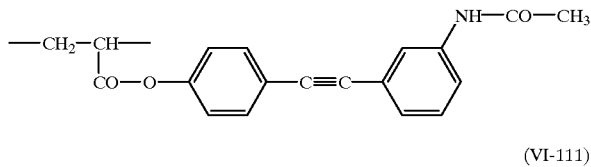
(VI-110)
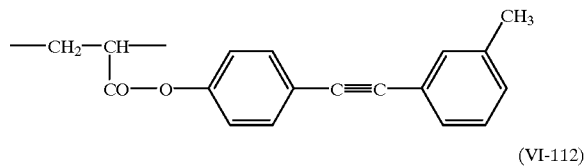
(VI-111)
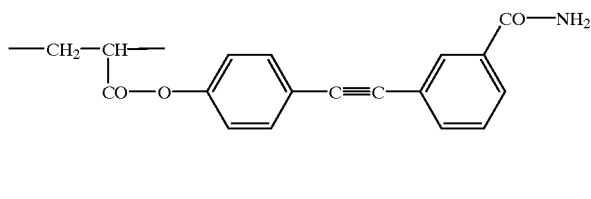
(VI-112)
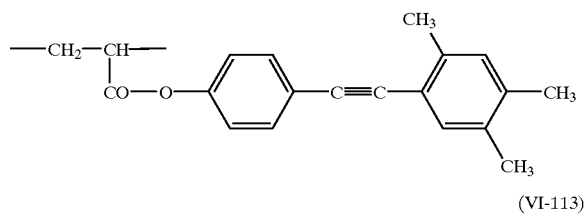
(VI-114)
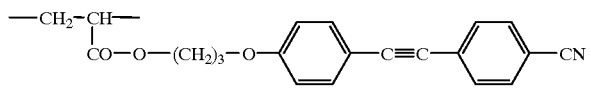
(VI-115)
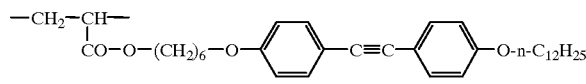
(VI-116)
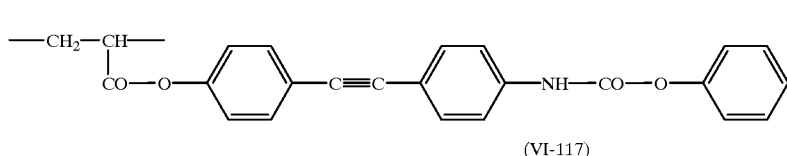
(VI-117)
(VI-118)
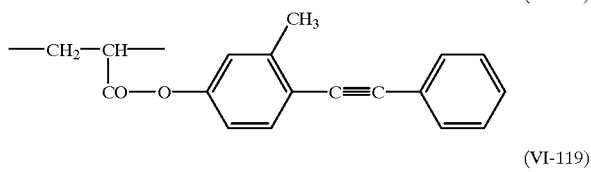
(VI-119)
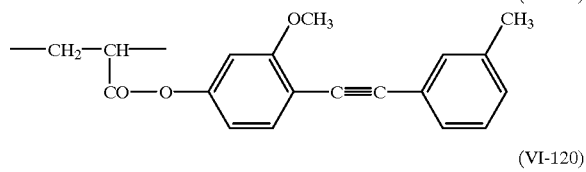
(VI-120)
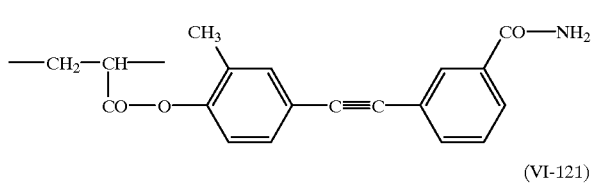
(VI-121)
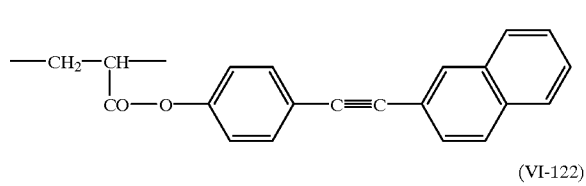
(VI-122)
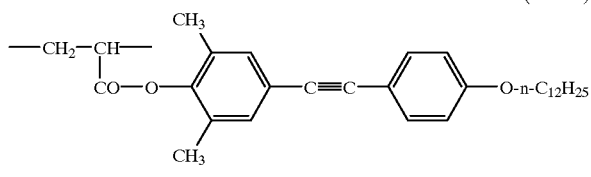
(VI-123)
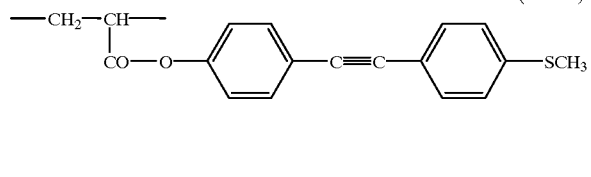
(VI-124)
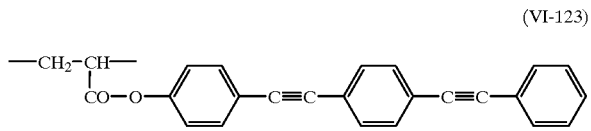
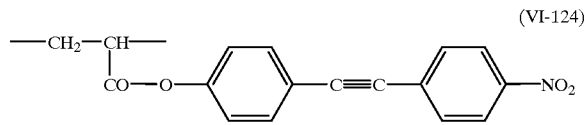

-continued
(VI-125) 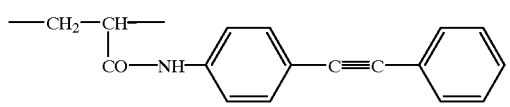
(VI-126) 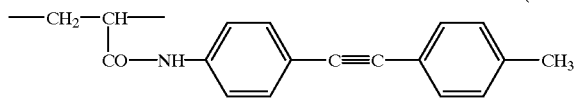
(VI-127) 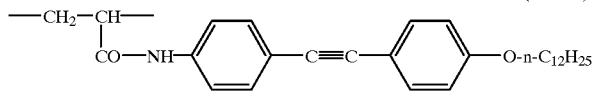
(VI-128) 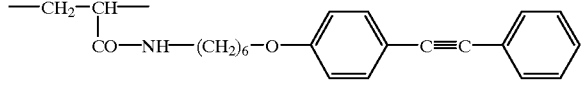
(VI-129) 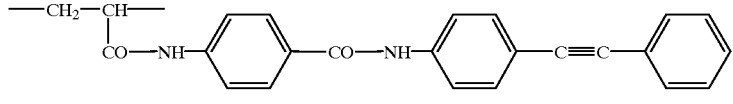
(VI-130) 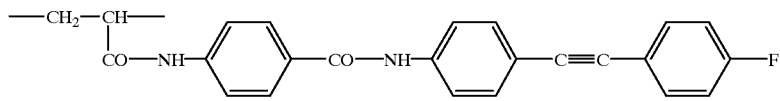
(VI-131) 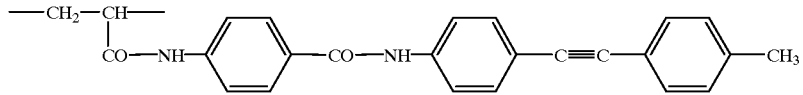
(VI-132) 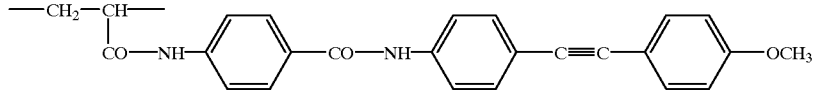
(VI-133) 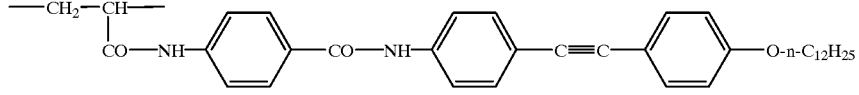
(VI-134) 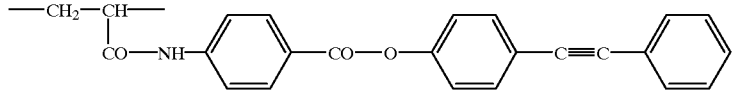
(VI-135) 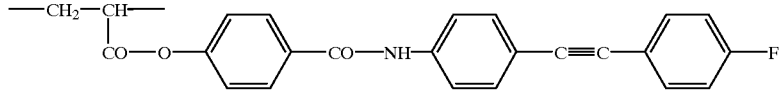
(VI-136) 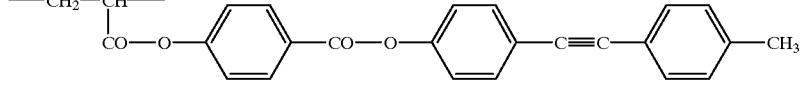
(VI-137)
(VI-138)
(VI-139)
(VI-140)
(VI-141) 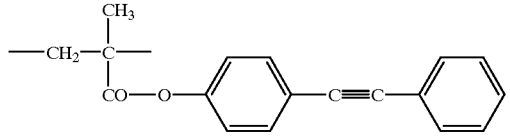
(VI-142) 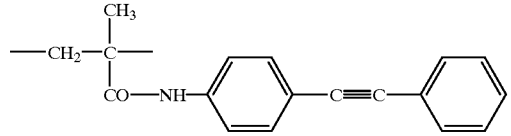

-continued

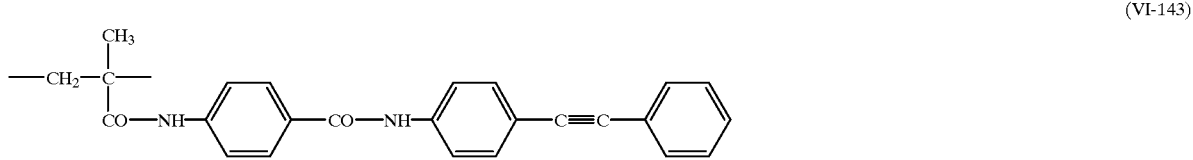
(VI-143)

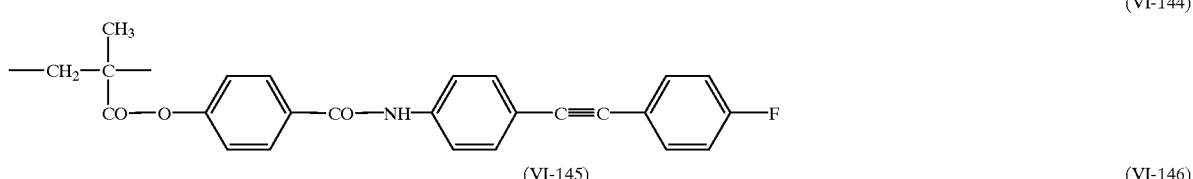
(VI-144)

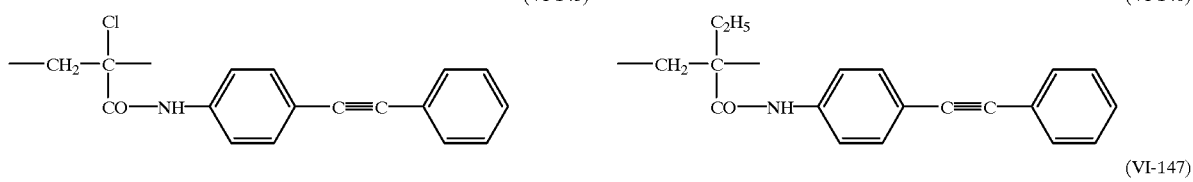
(VI-145)
(VI-146)

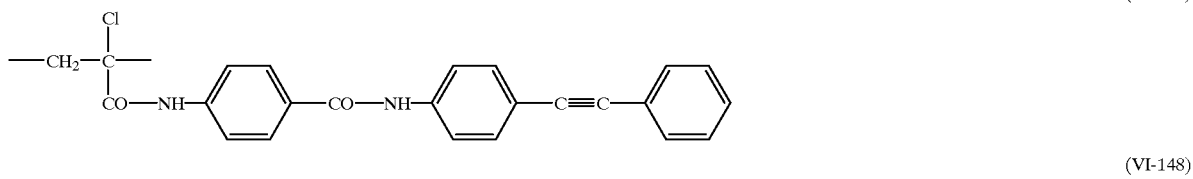
(VI-147)

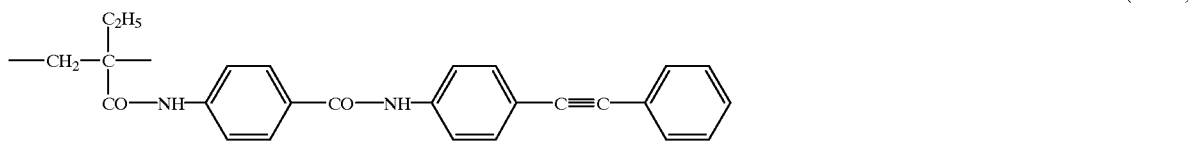
(VI-148)

Examples of the (meth)acrylic copolymers having the repeating units represented by the formula (VI) (wherein $L^2$, $L^3$ or $L^4$ is —C≡C—) having a tolan structure are shown below. AA means a repeating unit derived from acrylic acid, and MA means a repeating unit derived from methacrylic acid. Further, EA and Cl A mean the following repeating units (wherein M has the same meanings as M in the formula (I)). The ratio of the repeating unit means mol %.

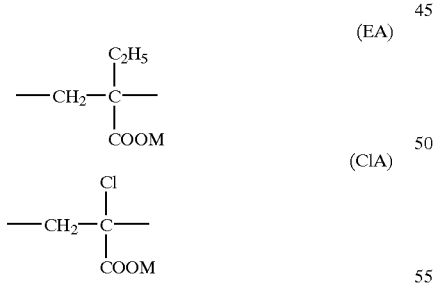
(EA)
(ClA)

| | |
|---|---|
| PA401: | -(AA)60-(VI-101)40- |
| PA402: | -(AA)70-(VI-101)30- |
| PA403: | -(AA)60-(VI-102)40- |
| PA404: | -(AA)65-(VI-107)35- |
| PA405: | -(AA)70-(VI-111)30- |
| PA406: | -(AA)80-(VI-114)20- |
| PA407: | -(AA)70-(VI-120)30- |
| PA408: | -(AA)60-(VI-123)40- |
| PA409: | -(AA)70-(VI-125)30- |

-continued

| | |
|---|---|
| PA410: | -(AA)60-(VI-125)40- |
| PA411: | -(AA)50-(VI-125)50- |
| PA412: | -(AA)70-(VI-126)30- |
| PA413: | -(AA)60-(VI-128)40- |
| PA414: | -(AA)50-(VI-132)50- |
| PA415: | -(AA)70-(VI-133)30- |
| PA416: | -(AA)60-(VI-133)40- |
| PA417: | -(AA)70-(VI-138)30- |
| PA418: | -(AA)60-(VI-138)40- |
| PA419: | -(AA)60-(VI-139)40- |
| PA420: | -(AA)60-(VI-141)40- |
| PA421: | -(AA)60-(VI-143)40- |
| PA422: | -(MA)60-(VI-101)40- |
| PA423: | -(MA)70-(VI-101)30- |
| PA424: | -(MA)60-(VI-102)40- |
| PA425: | -(MA)65-(VI-107)35- |
| PA426: | -(MA)70-(VI-111)30- |
| PA427: | -(MA)80-(VI-114)20- |
| PA428: | -(MA)70-(VI-120)30- |
| PA429: | -(MA)60-(VI-123)40- |
| PA430: | -(MA)70-(VI-125)30- |
| PA431: | -(MA)60-(VI-125)40- |
| PA432: | -(MA)50-(VI-125)50- |
| PA433: | -(MA)70-(VI-126)30- |
| PA434: | -(MA)60-(VI-128)40- |
| PA435: | -(MA)50-(VI-132)50- |
| PA436: | -(MA)70-(VI-133)30- |
| PA437: | -(MA)60-(VI-133)40- |
| PA438: | -(MA)70-(VI-138)30- |
| PA439: | -(MA)60-(VI-133)40- |
| PA440: | -(MA)60-(VI-139)40- |
| PA441: | -(MA)60-(VI-141)40- |
| PA442: | -(MA)60-(VI-142)40- |
| PA451: | -(ClA)60-(VI-145)40- |

-continued

| | |
|---|---|
| PA452: | -(EA)60-(VI-146)40- |
| PA453: | -(ClA)60-(VI-147)40- |
| PA454: | -(EA)60-(VI-148)40- |

The polymerizable group can be introduced into the repeating unit having a hydrocarbon group containing two or more aromatic rings at the side chain. The polymerizable group preferably is a substituent group of an aromatic ring, and more preferably is a substituent group of the aromatic ring positioned at the end of the side chain.

The polymerizable group is preferably not directly attached to the aromatic ring. In other words, a linking group preferably intervenes between the aromatic ring and the polymerizable group. Examples of the linking groups include —O—, —CO—, —O—CO—, —CO—O—, —O—CO—O—, —CO—NH, —SO$_2$—NH—, —NH—CO—, —NH—CO—O—, —NH—SO$_2$—, -alkylene-, -alkenylene, -alkynylene-, —O-alkylene- and -alkylene-O—, in which the left side is attached to the hydrocarbon group, and the right side is attached to the polymerizable group.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The alkenylene group can have a branched or cyclic structure. The alkenylene group contains preferably 2 to 30 carbon atoms, more preferably 2 to 20 carbon atoms, further preferably 2 to 15 carbon atoms, and most preferably 2 to 12 carbon atoms.

The alkynylene group can have a branched or cyclic structure. The alkynylene group contains preferably 2 to 30 carbon atoms, more preferably 2 to 20 carbon atoms, further preferably 2 to 15 carbon atoms, and most preferably 2 to 12 carbon atoms.

The aromatic ring can have two or more polymerizable groups.

The repeating unit having the polymerizable group and two or more aromatic rings at the side chain is preferably represented by the formula (VII).

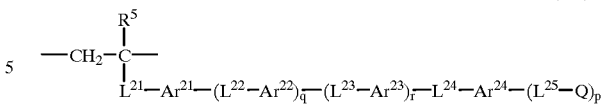

(VII)

In the formula (VII), $R^5$ is hydrogen or methyl.

In the formula (VII), $L^{21}$ is a divalent linking group selected from the group consisting of a single bond, —CO—, —CO—NH—, -alkylene-, —CO—NH-alkylene-, —CO—NH-alkylene-O—, —CO—NH-alkylene-CO—O— and —CO—NH-alkylene-CO—NH—, preferably is —CO—, —CO—NH— or -alkylene, and more preferably is —CO—NH—.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

In the formula (VII), each of $L^{22}$, $L^{23}$, $L^{24}$ and $L^{25}$ independently is a single bond, —O—, —CO—, —O—CO—, —CO—O—, —O—CO—O—, —CO—NH—, —SO$_2$—NH—, —NH—CO—, —NH—CO—O—, —NH—SO$_2$—, -alkylene-, -alkenylene-, -alkynylene-, —O-alkylene- or -alkylene-O—. At least one of $L^{22}$, $L^{23}$ and $L^{24}$ preferably is a single bond or -alkynylene-.

In the formula (VII), each of $Ar^{21}$, $Ar^{22}$, $Ar^{23}$ and $Ar^{24}$ independently is an aromatic ring (including an aromatic heterocyclic ring), and preferably is benzene ring. Each of $Ar^{21}$, $Ar^{22}$ and $Ar^{23}$ preferably is p-phenylene. The aromatic ring can have a substituent group. Examples of the substituent groups are the same as the examples of the substituent groups of the aromatic ring in the formula (VI).

In the formula (VII), each of q and r is 0 or 1. It is preferred that q be 0 or 1 and r be 0 (two or three aromatic rings). It is more preferred that each of q and r be 0 (two aromatic rings).

In the formula (VII), Q is a polymerizable group. The polymerizable group of the copolymer is preferably analogous to the polymerizable group (Q) of the liquid crystal molecule, as is described above.

In the formula (VII), p is 1, 2, or 3, preferably is 1 or 2, and more preferably is 1.

Examples of the repeating units having both the polymerizable group and two or more aromatic rings at the side chain are shown below.

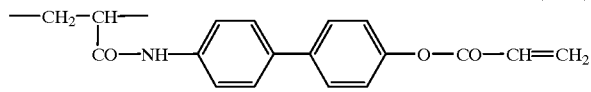

(VII-1)

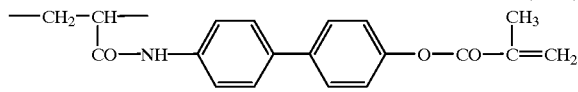

(VII-2)

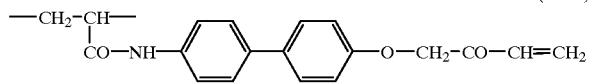

(VII-3)

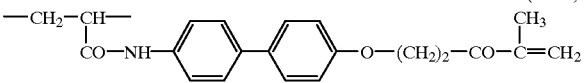

(VII-4)

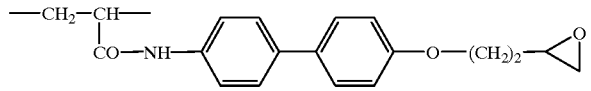

(VII-5)

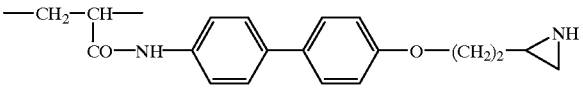

(VII-6)

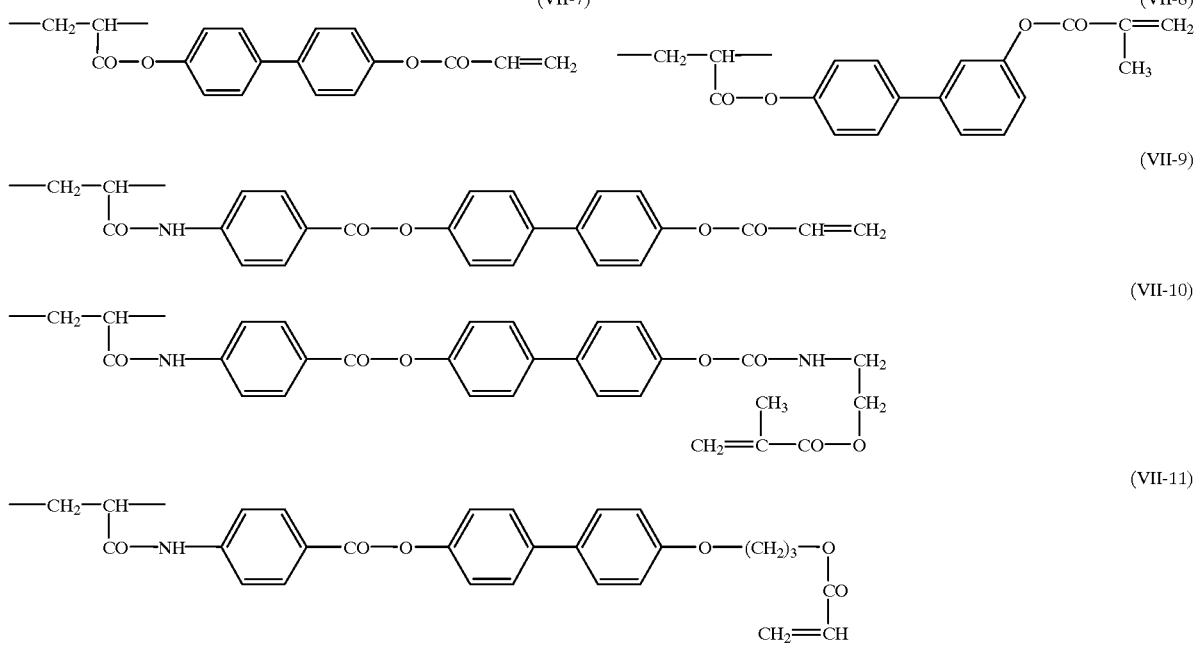

In the formula (III), $R^2$ is hydrogen, a halogen atom or an alkyl group having 1 to 6 carbon atoms. $R^2$ preferably is hydrogen or an alkyl group having 1 to 6 carbon atoms, more preferably is hydrogen, methyl or ethyl, and most preferably is hydrogen or methyl.

In the formula (III), Cy is an alicyclic group, an aromatic group or a heterocyclic group.

The aliphatic ring of the alicyclic group preferably is a five-membered, six-membered or seven-membered ring, more preferably is a five-membered or six-membered ring, and most preferably is a six-membered ring. Examples of the aliphatic rings include cyclohexane ring, cyclohexene ring and bicyclo[2.2.1]hepta-2-ene ring. The aliphatic ring can be condensed with another aliphatic ring, an aromatic ring or a heterocyclic ring.

Examples of the aromatic rings of the aromatic groups include benzene ring, naphthalene ring, anthracene ring, phenanthrene ring, pyrene ring and naphthacene ring. The aromatic ring can be condensed with an aliphatic ring or a heterocyclic ring.

The heterocyclic ring of the heterocyclic group preferably is a five-membered, six-membered or seven-membered ring, and more preferably is a five-membered or six-membered ring. The heterocyclic ring preferably is aromatic. The aromatic heterocyclic ring is usually unsaturated, and preferably has the maximum number of double bonds. Examples of the heterocyclic rings include furan ring, thiophene ring, pyrrole ring, oxazole ring, isoxazole ring, isothiazole ring, imidazole ring, pyrazole ring, furazan ring, pyran ring, pyridine ring, pyridazine ring, pyrimidine ring and pyrazine ring. The heterocyclic ring can be condensed with another heterocyclic ring, an aliphatic ring or an aromatic ring.

The alicyclic group, the aromatic group or the heterocyclic group can have a substituent group. Examples of the substituent groups include an alkyl group (e.g., methyl, ethyl, t-butyl), a substituted alkyl group (e.g., chloromethyl, hydroxymethyl, chlorinated trimethylammonio), an alkoxy group (e.g., methoxy), a halogen atom (F, Cl, Br), carboxyl, an acyl group (e.g., formyl), amino, sulfo, an aryl group (e.g., phenyl), an aryloxy group (e.g., phenoxy) and oxo.

In the formula (III), n is 1 to 90 mole %, preferably is 5 to 80 mole %, and most preferably is 10 to 70 mole %.

Examples of the repeating units represented by the formula (III) are shown below.

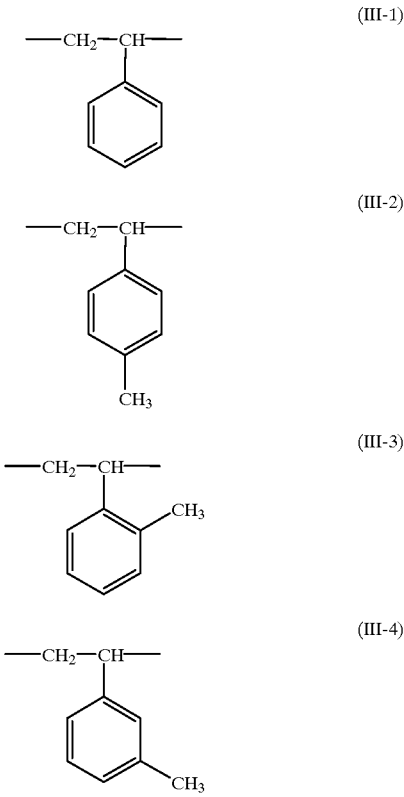

(III-5) 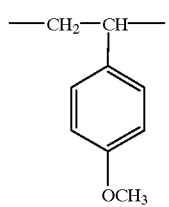
(III-6) 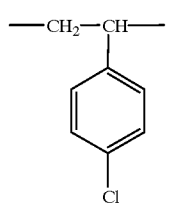
(III-7) 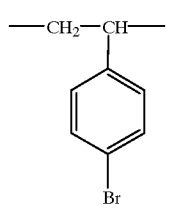
(III-8) 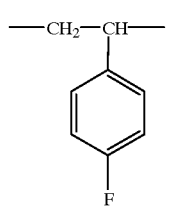
(III-9) 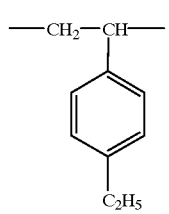
(III-10) 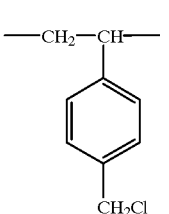
(III-11) 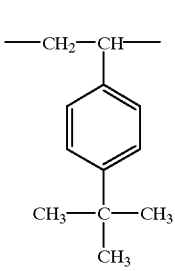
(III-12) 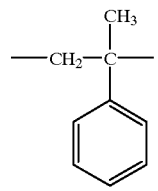
(III-13) 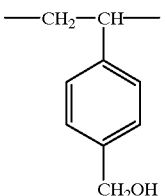
(III-14) 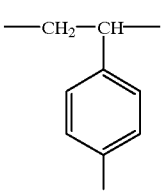
(III-15) 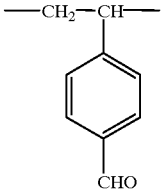
(III-16) 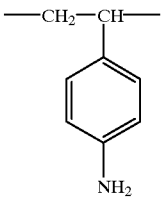
(III-17) 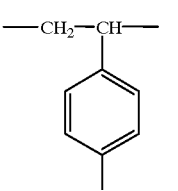
(III-18) 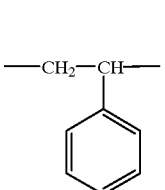

(III-19)
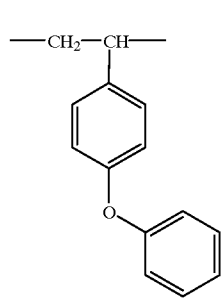
(III-20)
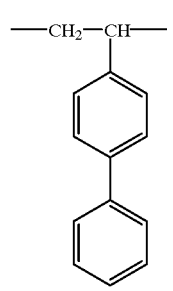
(III-21)
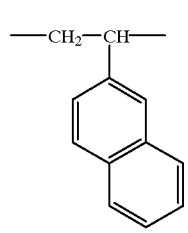
(III-22)
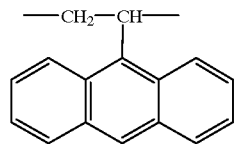
(III-23)
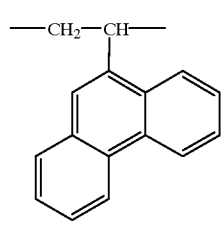
(III-24)
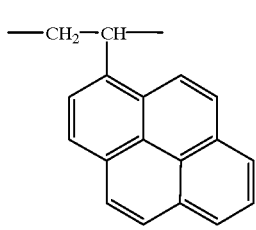
(III-25)
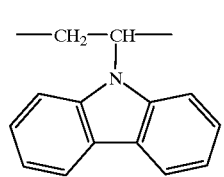
(III-26)
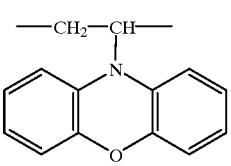
(III-27)
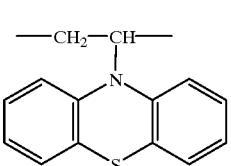
(III-28)
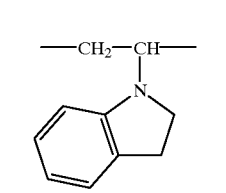
(III-29)
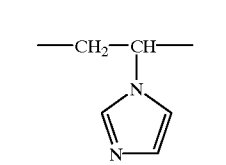
(III-30)
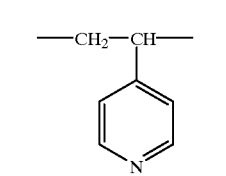
(III-31)
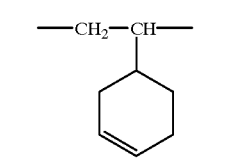
(III-32)
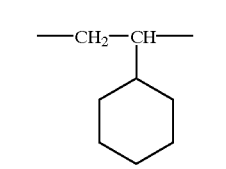
(III-33)
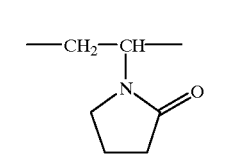
(III-34)
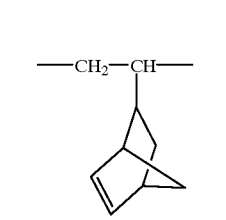

(III-35)

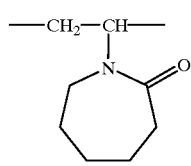

Examples of the (meth)acrylic copolymers having the repeating units represented by the formula (III) are shown below. AA means a repeating unit derived from acrylic acid, and MA means a repeating unit derived from methacrylic acid. The ratio of the repeating unit means mol %.

| | |
|---|---|
| PA501: | -(AA)70-(III-1)30- |
| PA502: | -(AA)60-(III-1)40- |
| PA503: | -(AA)50-(III-1)50- |
| PA504: | -(AA)40-(III-1)60- |
| PA505: | -(AA)60-(III-2)40- |
| PA506: | -(AA)60-(III-3)40- |
| PA507: | -(AA)60-(III-4)40- |
| PA508: | -(AA)60-(III-5)40- |
| PA509: | -(AA)40-(III-6)40- |
| PA510: | -(AA)50-(III-7)50- |
| PA511: | -(AA)70-(III-8)30- |
| PA512: | -(AA)60-(III-9)40- |
| PA513: | -(AA)60-(III-10)40- |
| PA514: | -(AA)60-(III-11)40- |
| PA515: | -(AA)50-(III-12)50- |
| PA516: | -(AA)50-(III-13)50- |
| PA517: | -(AA)70-(III-14)30- |
| PA518: | -(AA)50-(III-15)50- |
| PA519: | -(AA)60-(III-16)40- |
| PA520: | -(AA)60-(III-17)40- |
| PA521: | -(AA)60-(III-18)40- |
| PA522: | -(AA)60-(III-19)40- |
| PA523: | -(AA)75-(III-20)25- |
| PA524: | -(AA)60-(III-20)40- |
| PA525: | -(AA)70-(III-21)30- |
| PA526: | -(AA)80-(III-22)20- |
| PA527: | -(AA)70-(III-22)30- |
| PA528: | -(AA)60-(III-22)40- |
| PA529: | -(AA)70-(III-23)30- |
| PA530: | -(AA)70-(III-24)30- |
| PA531: | -(AA)80-(III-25)20- |
| PA532: | -(AA)70-(III-25)30- |
| PA533: | -(AA)60-(III-25)40- |
| PA534: | -(AA)60-(III-26)40- |
| PA535: | -(AA)70-(III-27)30- |
| PA536: | -(AA)80-(III-28)20- |
| PA537: | -(AA)70-(III-29)30- |
| PA538: | -(AA)60-(III-30)40- |
| PA539: | -(AA)70-(III-31)30- |
| PA540: | -(AA)70-(III-32)30- |
| PA541: | -(AA)60-(III-33)40- |
| PA542: | -(AA)70-(III-34)30- |
| PA543: | -(AA)70-(III-35)30- |
| PA601: | -(MA)70-(III-1)30- |
| PA602: | -(MA)60-(III-1)40- |
| PA603: | -(MA)50-(III-1)50- |
| PA604: | -(MA)40-(III-1)60- |
| PA605: | -(MA)60-(III-2)40- |
| PA606: | -(MA)60-(III-3)40- |
| PA607: | -(MA)60-(III-4)40- |
| PA608: | -(MA)60-(III-5)40- |
| PA609: | -(MA)40-(III-6)40- |
| PA610: | -(MA)50-(III-7)50- |
| PA611: | -(MA)70-(III-8)30- |
| PA612: | -(MA)60-(III-9)40- |
| PA613: | -(MA)60-(III-10)40- |
| PA614: | -(MA)60-(III-11)40- |
| PA615: | -(MA)50-(III-12)50- |
| PA616: | -(MA)50-(III-13)50- |
| PA617: | -(MA)70-(III-14)30- |
| PA618: | -(MA)50-(III-15)50- |
| PA619: | -(MA)60-(III-16)40- |
| PA620: | -(MA)60-(III-17)40- |
| PA621: | -(MA)60-(III-18)40- |
| PA622: | -(MA)60-(III-19)40- |
| PA623: | -(MA)75-(III-20)25- |
| PA624: | -(MA)60-(III-20)40- |
| PA625: | -(MA)70-(III-21)30- |
| PA626: | -(MA)80-(III-22)20- |
| PA627: | -(MA)70-(III-22)30- |
| PA628: | -(MA)60-(III-22)40- |
| PA629: | -(MA)70-(III-23)30- |
| PA630: | -(MA)70-(III-24)30- |
| PA631: | -(MA)80-(III-25)20- |
| PA632: | -(MA)70-(III-25)30- |
| PA633: | -(MA)60-(III-25)40- |
| PA634: | -(MA)60-(III-26)40- |
| PA635: | -(MA)70-(III-27)30- |
| PA636: | -(MA)80-(III-28)20- |
| PA637: | -(MA)70-(III-29)30- |
| PA638: | -(MA)60-(III-30)40- |
| PA639: | -(MA)70-(III-31)30- |
| PA640: | -(MA)70-(III-32)30- |
| PA641: | -(MA)60-(III-33)40- |
| PA642: | -(MA)70-(III-34)30- |
| PA643: | -(MA)70-(III-35)30- |

The copolymer having the repeating unit represented by the formula (III) can have polymerizable groups. The polymerizable group can be introduced into the side chain of the repeating unit or into the repeating unit represented by the formula (III) as a substituent. The repeating unit having the polymerizable group at the side chain is described above.

The polymerizable group is preferably not directly attached to the cyclic structure of the alicyclic, aromatic group or heterocyclic group. In other words, a linking group preferably intervenes between the cyclic structure and the polymerizable group. Examples of the linking groups are the same as the examples of $L^{25}$ in the formula (VII).

Examples of the repeating units (VIII) formed by introducing the polymerizable group into the repeating unit of the formula (III) are shown below.

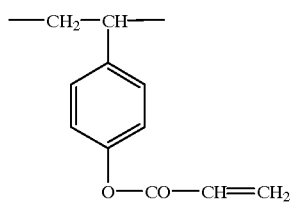
(VIII-1)

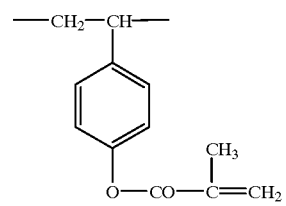
(VIII-2)

-continued
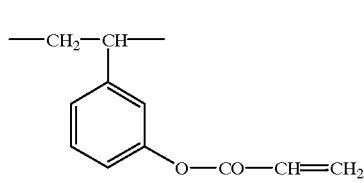 (VIII-3)
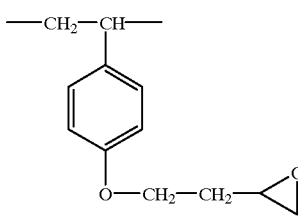 (VIII-4)
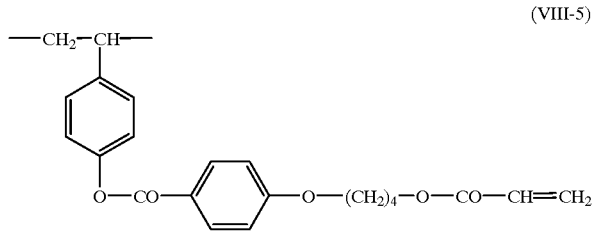 (VIII-5)
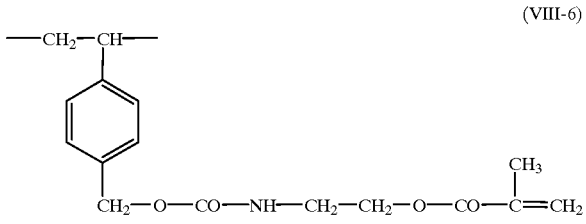 (VIII-6)
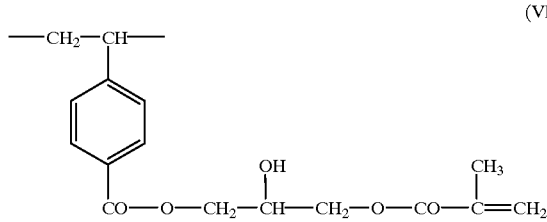 (VIII-7)
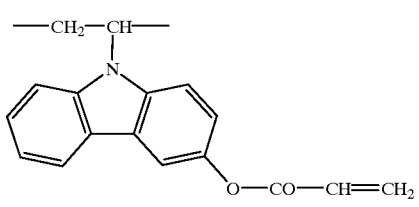 (VIII-8)
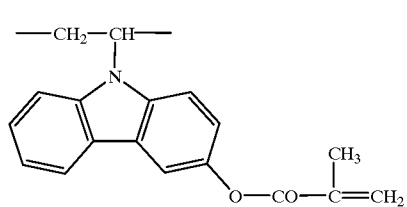 (VIII-9)
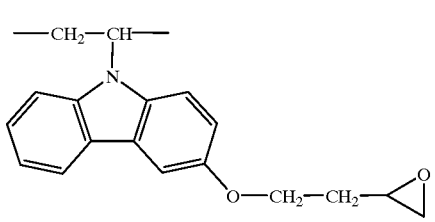 (VIII-10)
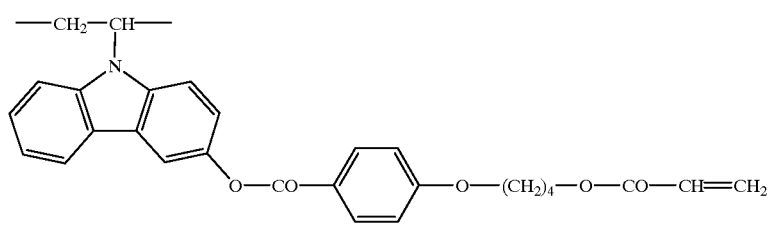 (VIII-11)
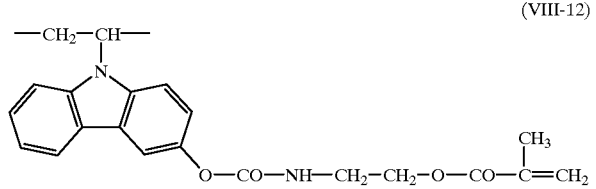 (VIII-12)
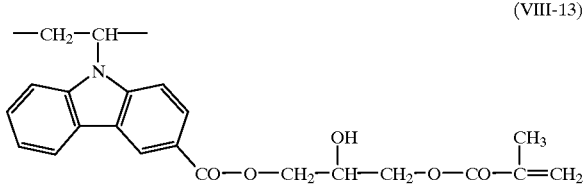 (VIII-13)

A polymerizable copolymer preferably comprises repeating units represented by the formula (I), repeating units represented by the formula (III) and repeating units represented by the formula (IX).

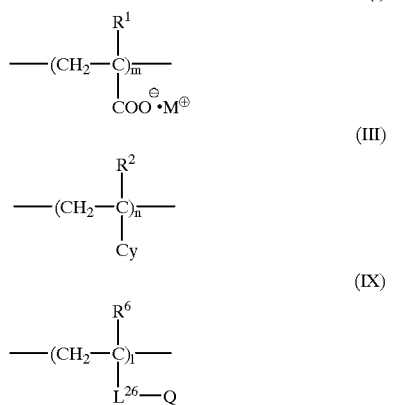

In the formulas (I), (III) and (IX), each of $R^1$, $R^2$ and $R^6$ is independently hydrogen, a halogen atom or an alkyl group having 1 to 6 carbon atoms; M is proton, an alkali metal ion or an ammonium ion; Cy is an alicyclic group, an aromatic group or a heterocyclic group; $L^{26}$ is a single bond or a divalent linking group; Q is a polymerizable group; m is 10 to 95 mole %; n is 5 to 90 mole %; and l is 1 to 20 mole %.

Examples of the divalent linking groups are the same as the examples of —CO—$L^{11}$— in the formula (IV).

Examples of the (meth)acrylic copolymers having both the repeating units represented by the formula (III) and a polymerizable group are shown below. AA means a repeating unit derived from acrylic acid, and MA means a repeating unit derived from methacrylic acid. The ratio of the repeating unit means mol %.

| | |
|---|---|
| PA701: | -(AA)70-(III-1)25-(IV-12)5- |
| PA702: | -(AA)70-(III-1)25-(IV-1)5- |
| PA703: | -(AA)50-(III-1)40-(IV-12)10- |
| PA704: | -(AA)40-(III-1)55-(IV-12)5- |
| PA705: | -(AA)60-(III-2)35-(IV-12)5- |
| PA706: | -(AA)60-(III-3)35-(IV-12)5- |
| PA707: | -(AA)60-(III-4)35-(IV-12)5- |
| PA708: | -(AA)60-(III-5)35-(IV-12)5- |
| PA709: | -(AA)60-(III-6)35-(IV-12)5- |
| PA710: | -(AA)50-(III-7)45-(IV-12)5- |
| PA711: | -(AA)70-(III-8)25-(IV-12)5- |
| PA712: | -(AA)60-(III-9)35-(IV-1)5- |
| PA713: | -(AA)60-(III-10)35-(IV-3)5- |
| PA714: | -(AA)60-(III-11)35-(IV-4)5- |
| PA715: | -(AA)50-(III-12)47-(IV-8)3- |
| PA716: | -(AA)50-(III-13)40-(VIII-6)10- |
| PA717: | -(AA)70-(III-14)25-(VIII-7)5- |
| PA718: | -(AA)50-(III-15)45-(IV-12)5- |
| PA719: | -(AA)60-(III-16)35-(IV-12)5- |
| PA720: | -(AA)60-(III-17)35-(IV-12)5- |
| PA721: | -(AA)60-(III-18)35-(IV-12)5- |
| PA722: | -(AA)60-(III-19)35-(IV-12)5- |
| PA723: | -(AA)70-(III-20)25-(IV-12)5- |
| PA724: | -(AA)50-(III-20)40-(IV-12)10- |
| PA725: | -(AA)70-(III-21)25-(IV-12)5- |
| PA726: | -(AA)75-(III-22)20-(IV-12)5- |
| PA727: | -(AA)70-(III-22)25-(IV-12)5- |
| PA728: | -(AA)60-(III-22)35-(IV-12)5- |
| PA729: | -(AA)70-(III-23)25-(IV-12)5- |
| PA730: | -(AA)70-(III-24)25-(IV-12)5- |
| PA731: | -(AA)70-(III-25)25-(IV-1)5- |
| PA732: | -(AA)70-(III-25)25-(IV-12)5- |
| PA733: | -(AA)60-(III-25)40-(IV-12)10- |
| PA734: | -(AA)60-(III-26)35-(IV-12)5- |
| PA735: | -(AA)70-(III-27)25-(IV-12)5- |
| PA736: | -(AA)75-(III-28)20-(IV-12)5- |
| PA737: | -(AA)70-(III-29)25-(IV-1)-5- |
| PA738: | -(AA)60-(III-30)35-(IV-2)5- |
| PA739: | -(AA)70-(III-31)25-(IV-3)5- |
| PA740: | -(AA)70-(III-32)25-(IV-4)5- |
| PA741: | -(AA)60-(III-33)35-(IV-7)5- |
| PA742: | -(AA)70-(III-34)25-(IV-8)5- |
| PA743: | -(AA)70-(III-35)25-(IV-9)5- |
| PA801: | -(MA)70-(III-1)25-(IV-12)5- |
| PA802: | -(MA)60-(III-1)35-(IV-1)5- |
| PA803: | -(MA)50-(III-1)40-(IV-12)10- |
| PA804: | -(MA)40-(III-1)55-(IV-12)5- |
| PA805: | -(MA)60-(III-2)35-(IV-12)5- |
| PA806: | -(MA)60-(III-3)35-(IV-12)5- |
| PA807: | -(MA)60-(III-4)35-(IV-12)5- |
| PA808: | -(MA)60-(III-5)35-(IV-12)5- |
| PA809: | -(MA)60-(III-6)35-(IV-12)5- |
| PA810: | -(MA)50-(III-7)45-(IV-12)5- |
| PA811: | -(MA)70-(III-8)25-(IV-12)5- |
| PA812: | -(MA)60-(III-9)35-(IV-1)5- |
| PA813: | -(MA)60-(III-10)35-(IV-3)5- |
| PA814: | -(MA)60-(III-11)35-(IV-4)5- |
| PA815: | -(MA)50-(III-12)47-(IV-8)3- |
| PA816: | -(MA)50-(III-13)40-(VIII-6)10- |
| PA817: | -(MA)70-(III-14)25-(VIII-7)5- |
| PA818: | -(MA)50-(III-15)45-(IV-12)5- |
| PA819: | -(MA)60-(III-16)35-(IV-12)5- |
| PA820: | -(MA)60-(III-17)35-(IV-12)5- |
| PA821: | -(MA)60-(III-18)35-(IV-12)5- |
| PA822: | -(MA)60-(III-19)35-(IV-1)5- |
| PA823: | -(MA)70-(III-20)25-(IV-12)5- |
| PA824: | -(MA)50-(III-20)40-(IV-12)10- |
| PA825: | -(MA)70-(III-21)25-(IV-12)5- |
| PA826: | -(MA)75-(III-22)20-(IV-12)5- |
| PA827: | -(MA)70-(III-22)25-(IV-12)5- |
| PA828: | -(MA)60-(III-22)35-(IV-12)5- |
| PA829: | -(MA)70-(III-23)25-(IV-12)5- |
| PA830: | -(MA)70-(III-24)25-(IV-12)5- |
| PA831: | -(MA)70-(III-25)25-(IV-1)5- |
| PA832: | -(MA)70-(III-25)25-(IV-12)5- |
| PA833: | -(MA)60-(III-25)30-(IV-12)10- |
| PA834: | -(MA)60-(III-26)35-(IV-12)5- |
| PA835: | -(MA)70-(III-27)25-(IV-12)5- |
| PA836: | -(MA)75-(III-28)20-(IV-12)5- |
| PA837: | -(MA)70-(III-29)25-(IV-1)5- |
| PA838: | -(MA)60-(III-30)35-(IV-2)5- |
| PA839: | -(MA)70-(III-31)25-(IV-3)5- |
| PA840: | -(MA)70-(III-32)25-(IV-4)5- |
| PA841: | -(MA)60-(III-33)35-(IV-7)5- |
| PA842: | -(MA)70-(III-34)25-(IV-8)5- |
| PA843: | -(MA)70-(III-35)25-(IV-9)5- |

Two or more (meth)acrylic copolymers can be used in combination.

The (meth)acrylic copolymer can have a cross-linked structure. A cross-linking reaction is preferably conducted simultaneously with or after coating a solution of the orientation layer on a support. The (meth)acrylic copolymer can be cross-linked by a cross-linking reaction of carboxyl group of a (meth)acrylic copolymer by using a cross-linking agent, which is described in "Cross-linking Agent Handbook, Shinzo Yamashita and Tosuke Kaneko, Taiseisha (written in Japanese) . Examples of the cross-linking agents include a methylol phenol resin, an amino resin (e.g., a resin of an addition reaction product of melamine, benzoquanamine or urea with formaldehyde or alcohol), an amine compound, a triazine compound, an isocyanate compound, an epoxy compound, a metal oxide, a metal halide compound, an organic metal halide compound, a metal salt of an organic acid, a metal alkoxide, and a compound having an oxazoline group.

The amount of the cross-linking agent is preferably in the range of 0.1 to 20 wt. %, and more preferably in the range of 0.5 to 15 wt. %, based on the total coating amount of the orientation layer. The amount of the remaining (not reacted) cross-linking agent is preferably not more than 1.0 wt. %, and more preferably not more than 0.5 wt. %, based on the coating amount of the orientation layer.

The orientation layer is preferably formed by rubbing the coated polymer. The rubbing treatment can be conducted by rubbing a layer containing the (meth)acrylic copolymer with a paper or cloth several times along a certain (usually longitudinal) direction.

A precursor of a (meth)acrylic copolymer can be coated, and then heated to cause a condensation reaction to form a copolymer before the rubbing treatment.

The orientation layer has a thickness preferably in the range of 0.01 to 10 μm, more preferably in the range of 0.05 to 5 μm, and most preferably in the range of 0.1 to 1 μm.

After aligning rod-like liquid crystal molecules in an optically anisotropic layer by the orientation layer, the formed layer can be transferred on a transparent support. Since the liquid crystal molecules are fixed, the alignment can be kept without the orientation layer.

The orientation layer is preferably formed by a process comprising the steps of: coating a solution of the (meth) acrylic copolymer on a support to form a coated layer, drying the coated layer, rubbing a surface of the coated layer, and heating the coated layer at 50 to 300° C. in this order.

The coated layer is heated preferably at 50 to 300° C., more preferably at 50 to 250° C., and most preferably at 100 to 250° C.

The coated layer can be heated by, for example, attaching the layer on a support to a surface of a heating medium, placing the layer on a support in a heated vessel, or splaying a hated air to the layer along a rubbing direction. The heating medium preferably is a plate. The heating time depends on the heating temperature. Where the heating temperature is 100° C., the heating time is preferably in the range of 1 to 30 minutes. Where the heating temperature is 130° C., the heating time is preferably in the range of 30 seconds to 10 minutes. Where the heating temperature is 160° C., the heating time is preferably in the range of 10 seconds to 3 minutes. The interval between the rubbing treatment and the heating treatment is preferably not longer than 1 week, more preferably not longer than 3 days, and most preferably not longer than 3 hours.

[Optically anisotropic layer]

The optically anisotropic layer comprises rod-like liquid crystal molecules, which are preferably aligned so that the average inclined angle between their long axes and the surface of the support may be less than 5°.

The total retardation of optical compensatory sheet is preferably adjusted by the optically anisotropic layer. A total retardation in plane (Re) of the compensatory sheet is in the range of preferably 20 to 200 nm, more preferably 20 to 100 nm, and most preferably 20 to 70 nm. A total retardation along the thickness direction (Rth) of the compensatory sheet is in the range of preferably 70 to 500 nm, more preferably 70 to 400 nm, and most preferably 70 to 300 nm. The Re and Rth retardation values are defined by the following formulas.

$$Re=(nx-ny)\times d$$

$$Rth=[\{(nx+ny)/2\}-nz]\times d$$

in which each of nx and ny is a refractive index in plane of the compensatory sheet; nz is a refractive index along the thickness direction of the compensatory sheet; and d is a thickness of the compensatory sheet.

The total retardation of optical compensatory sheet can be adjusted by combination of the optically anisotropic layer and an optically uniaxial or biaxial transparent support. The optically uniaxial or biaxial transparent support is described after.

The rod-like liquid crystal molecules in the optically anisotropic layer are preferably fixed with their alignment maintained. The alignment can be fixed with a polymer binder, but preferably is fixed by polymerization reaction.

According to the displaying mode of the liquid crystal cell, the rod-like liquid crystal molecules can be oriented in cholesteric alignment. In that case, the selective reflection wavelength region is preferably out of visible region.

Examples of the rod-like liquid crystal molecules include azomethines, azoxy molecules, cyanobiphenyls, cyanophenyl esters, benzoic esters, phenyl cyclohexanecarbonate esters, cycnophenylcyclohexanes, cyano-substituted phenylpyrimidines, alkoxy-substituted phenylpyrimidines, phenyldioxanes, tolans and alkenylcyclohexylbenzonitriles. Further, some metal complexes are included in the rod-like liquid crystal molecules. A liquid crystal polymer having repeating units containing rod-like liquid crystal molecules can be also used. In other wards, the rod-like liquid crystal molecule can be combined with a (liquid crystal) polymer.

Descriptions of the rod-like liquid crystal molecules are found in "Kagaku-Sosetsu, Ekisho no Kageku" (written in Japanese), vol. 22 (1994), Chapters 4, 7 and 11; and "Ekisho Devise Handbook" (written in Japanese), chapter 3.

The rod-like liquid crystal molecules preferably have a refractive index of birefringence in the range of 0.001 to 0.7. The rod-like liquid crystal molecule preferably has a polymerizable group. Examples of the polymerizable groups (Q) are shown below.

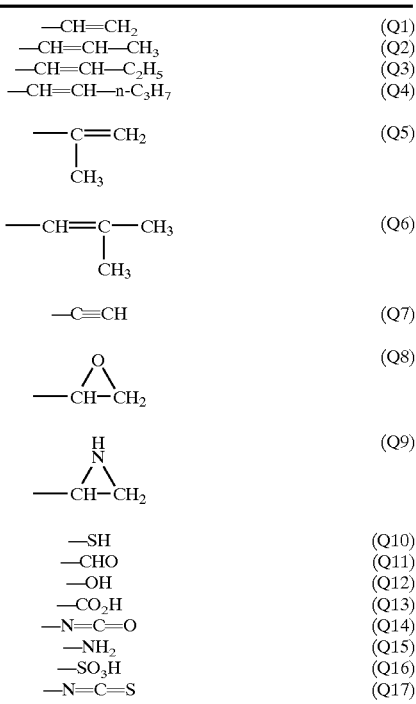

The polymerizable group (Q) preferably is an unsaturated polymerizable group (Q1 to Q7), an epoxy group (Q8), or an aziridinyl group (Q9), more preferably is an unsaturated polymerizable group, and most preferably is an ethylenically unsaturated group (Q1 to Q6).

The rod-like liquid crystal molecule preferably has a symmetrical structure about the short axis, and hence preferably has the polymerizable groups at the both ends of the structure.

Examples of the rod-like liquid crystal molecule are shown below.

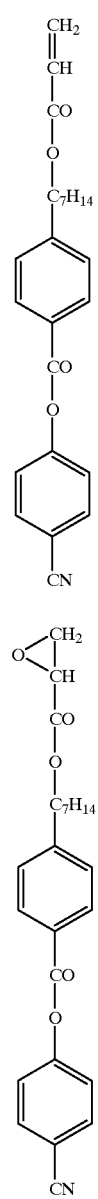

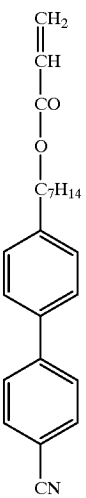

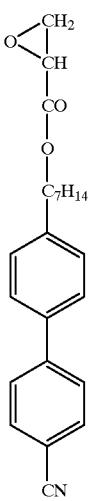

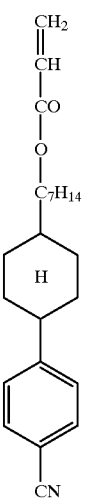

(N6) 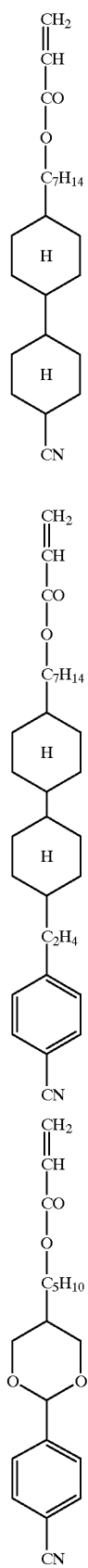
(N9) 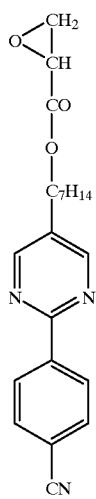
(N10) 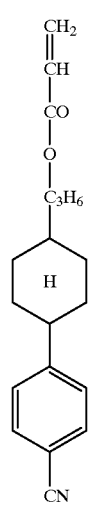
(N11) 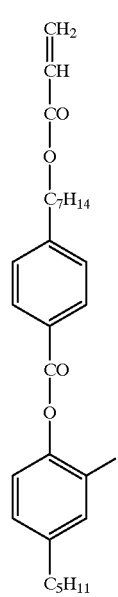

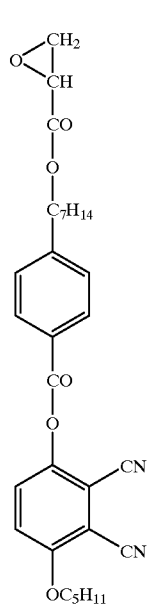 (N12)
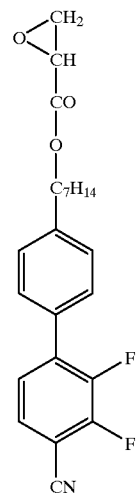 (N14)
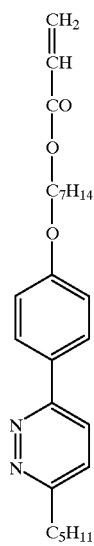 (N13)
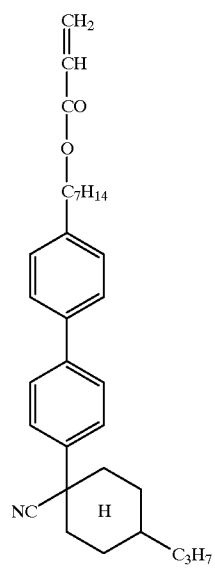 (N15)

-continued
(N16)
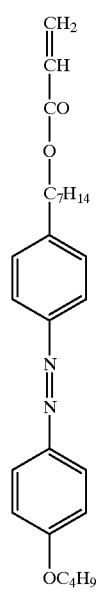
(N17)
(N18)
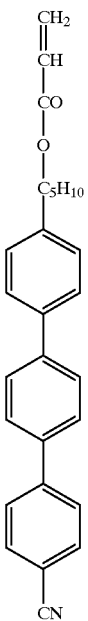
(N19)

-continued
(N20)
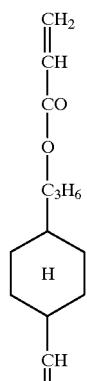
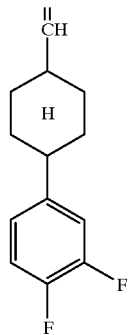
(N21)
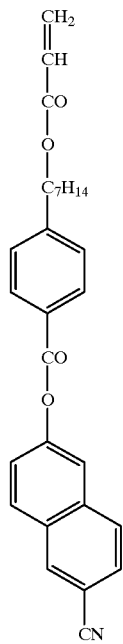
-continued
(N22)
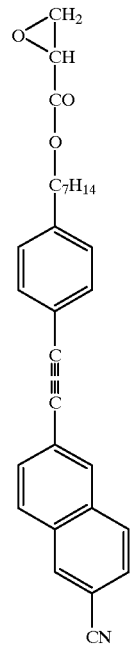
(N23)
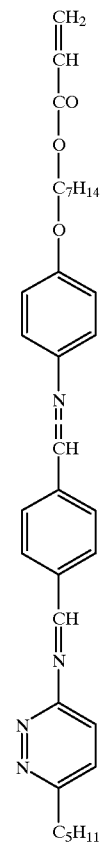

(N24)
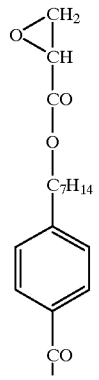
(N25)
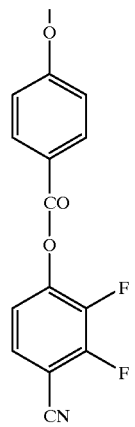
(N26)
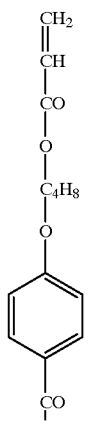
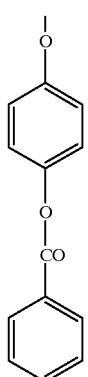
(N27)
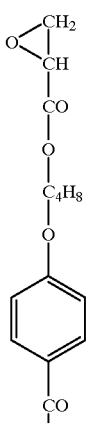

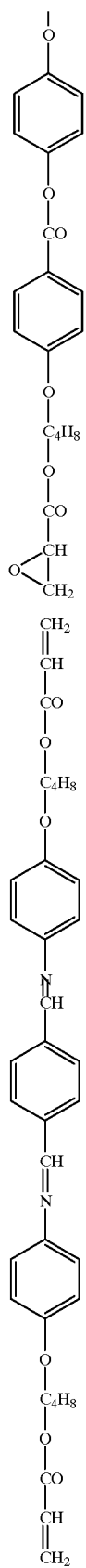
(N28)
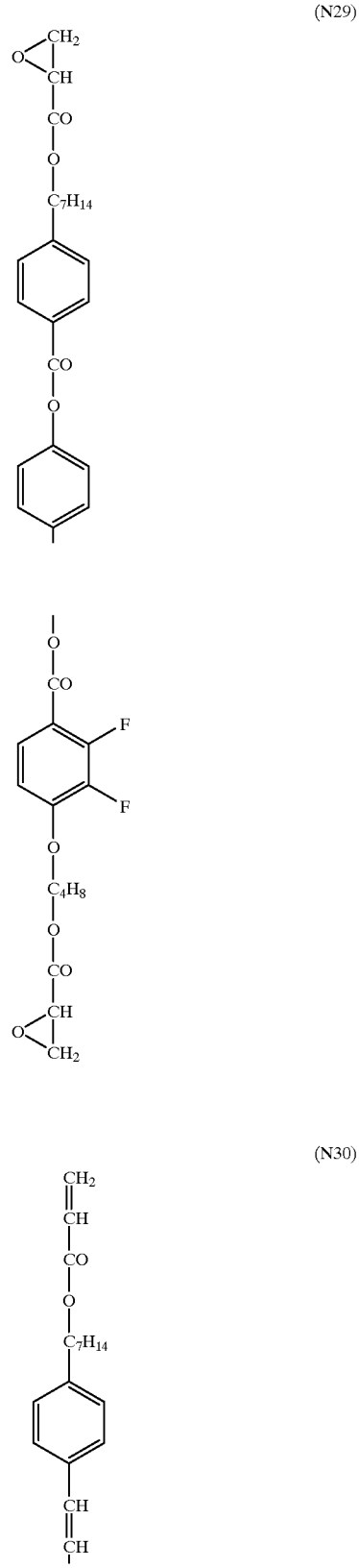

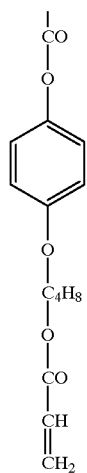
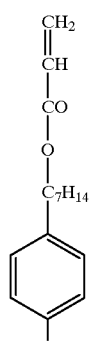
(N31)
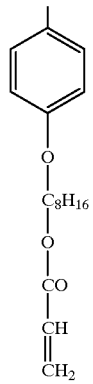
(N32)
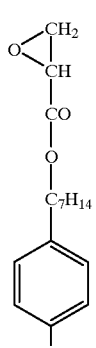
(N33)
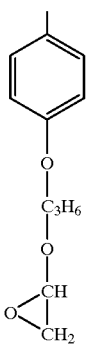
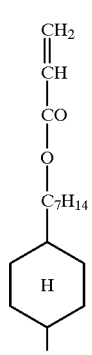
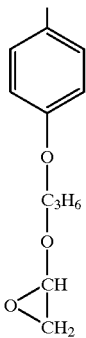
(N34)
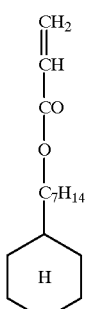

-continued
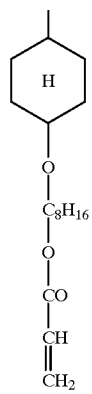
-continued
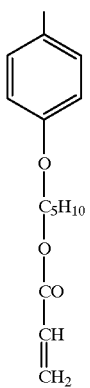
(N35)
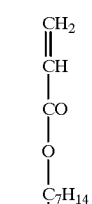
(N37)
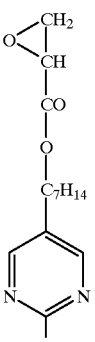
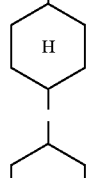
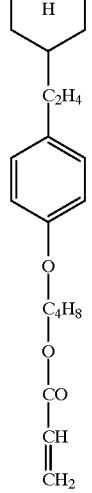
(N36)
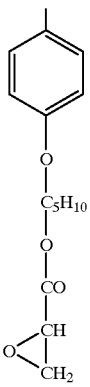
(N38)
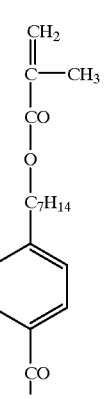
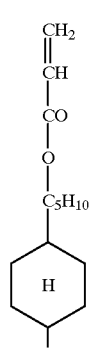

-continued
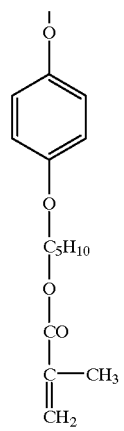
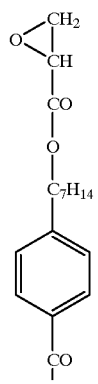
(N39)
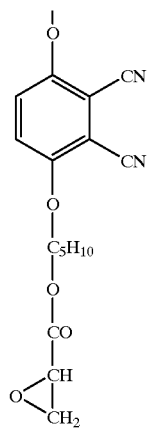
-continued
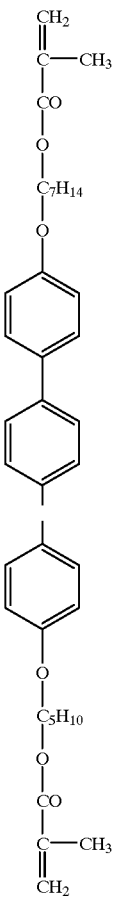
(N40)
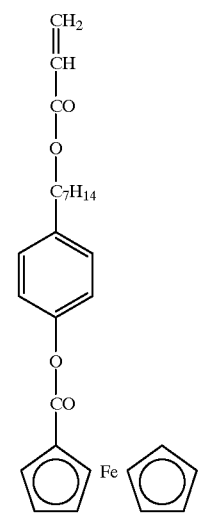
(N41)

(N42)
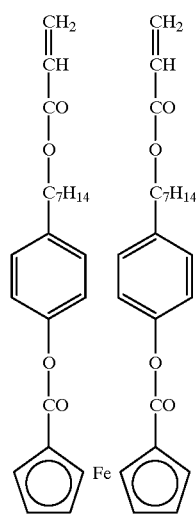
(N43)
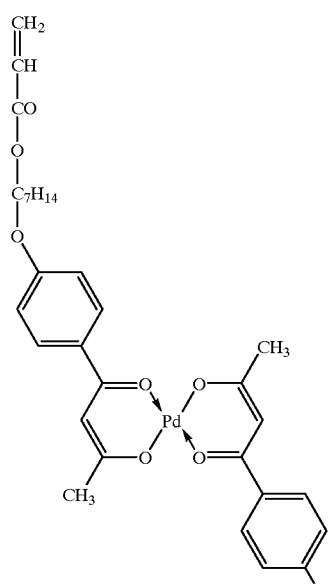
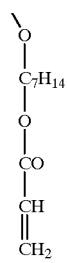
(N44)
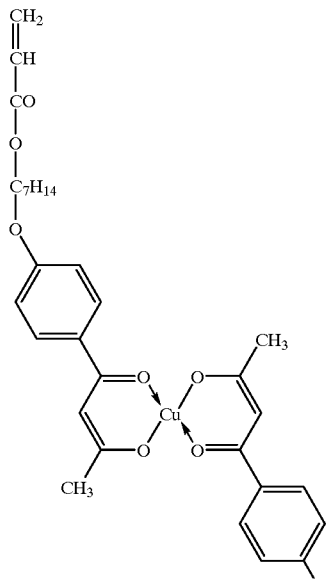
(N45)
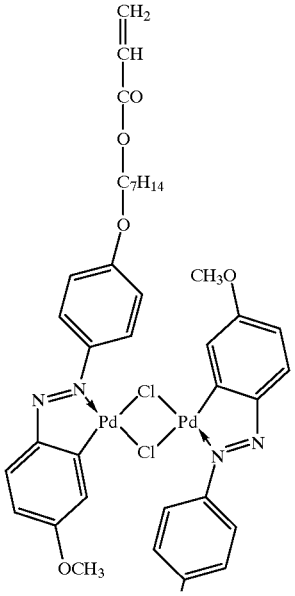

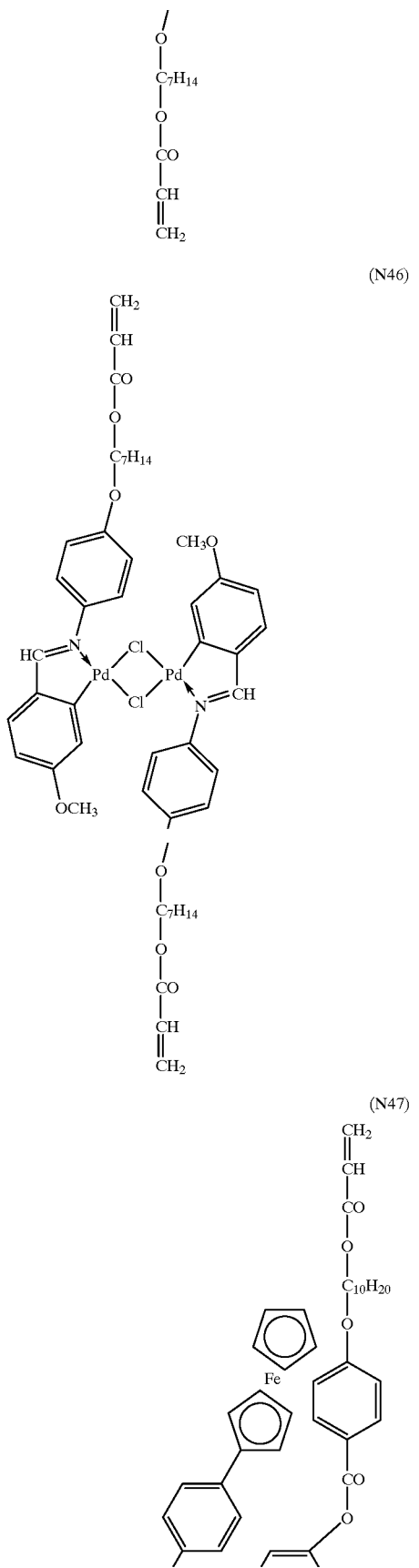
(N46)
(N47)
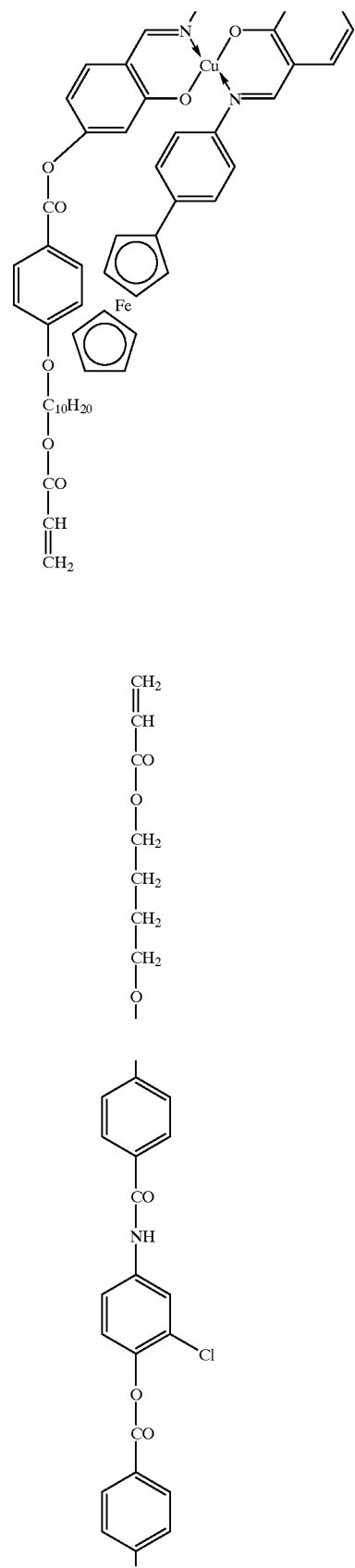
(N48)

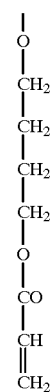
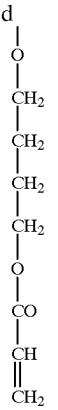
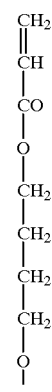
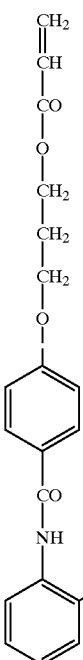
(N49)
(N50)
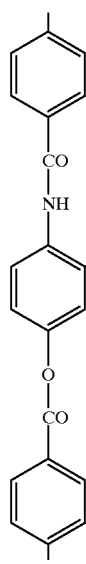
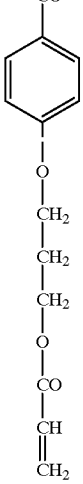

(N51)
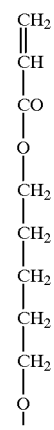
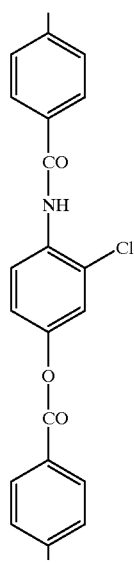
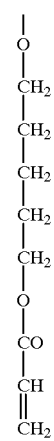
(N52)
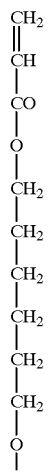
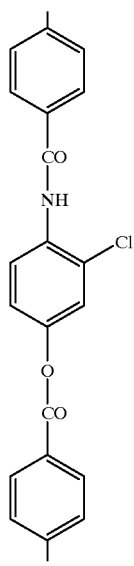
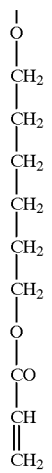

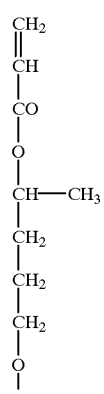 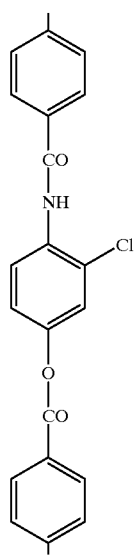 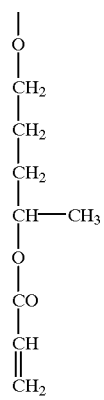
(N53)
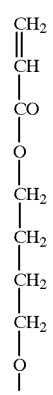 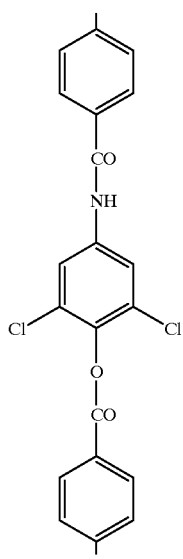 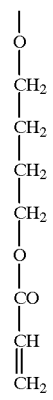
(N54)

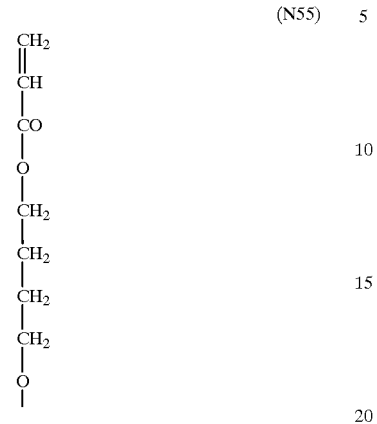
(N55)
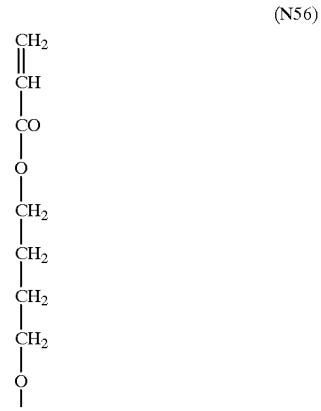
(N56)

(N57)
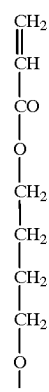
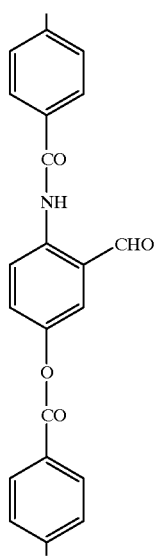
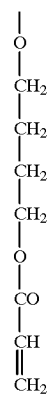
(N58)
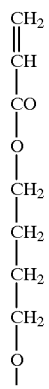
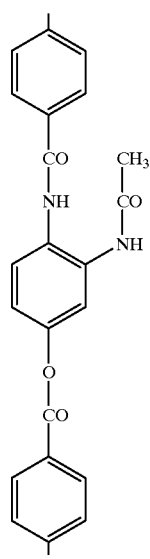
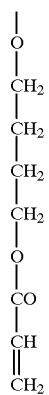

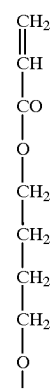
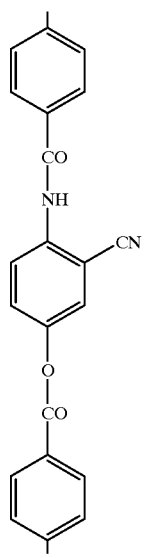
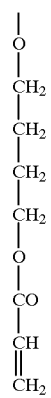
(N59)
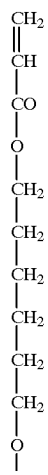
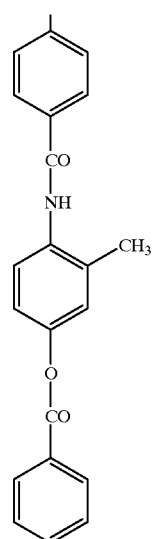
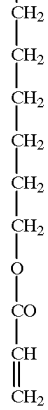
(N60)

(N61)
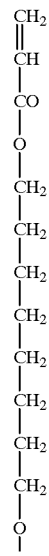
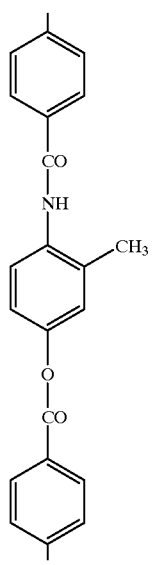
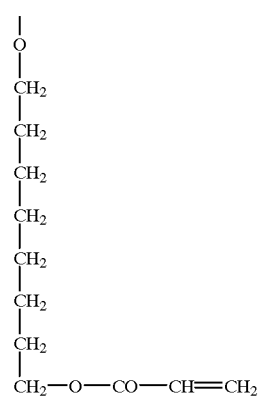
(N62)
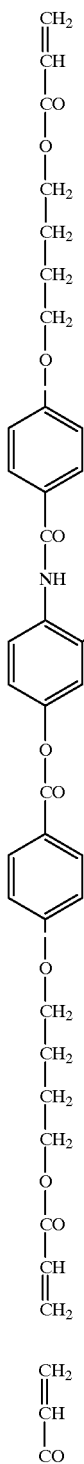
(N63)

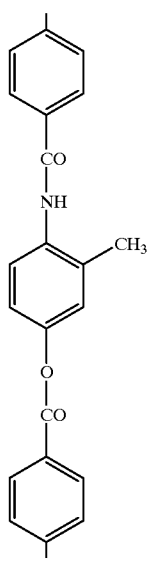
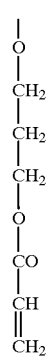
(N64)
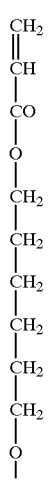
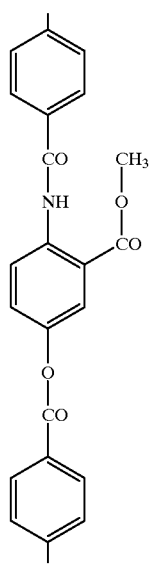
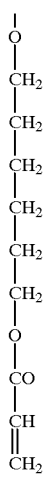
(N65)
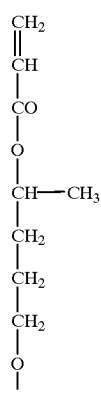

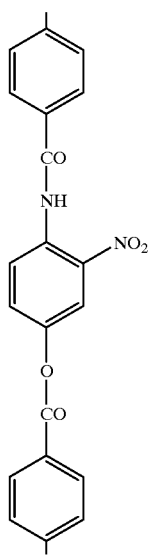
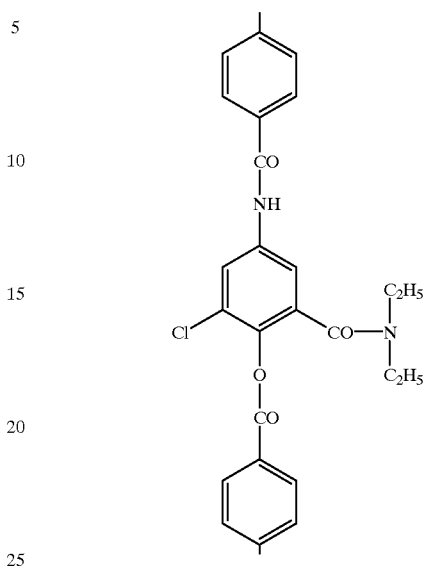
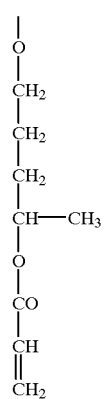
(N66)
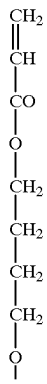
(N67)

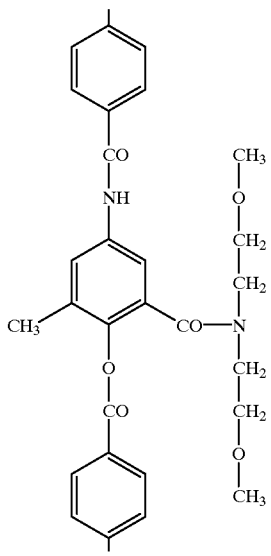
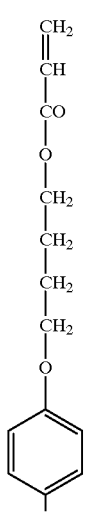
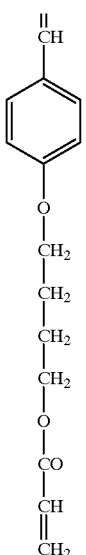
(N68)
(N69)
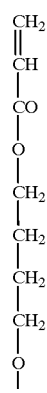

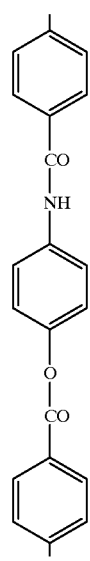
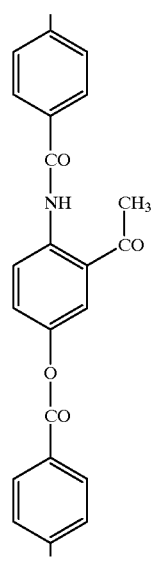
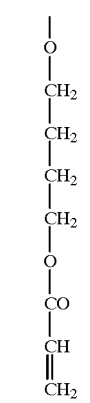
(N70)
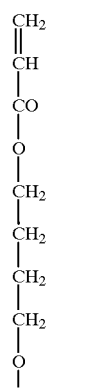
(N71)

-continued

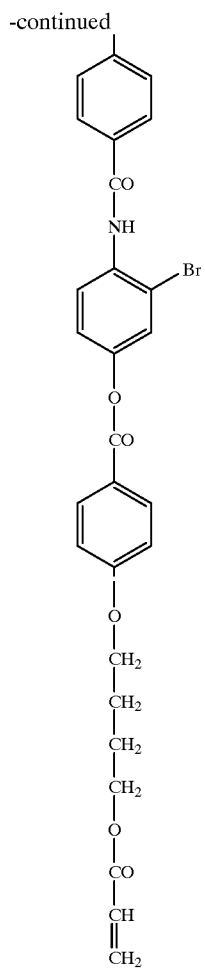

The optically anisotropic layer is formed by coating a liquid crystal composition (coating liquid) comprising the rod-like liquid crystal molecules, a polymerization initiator described below and other optional additives (e.g., plasticizer, monomer, surface active agent, cellulose ester, 1,3,5-triazine compound, chiral agent) onto an orientation layer.

Organic solvents are preferably used for preparing the liquid crystal composition. Examples of the organic solvents include an amide (e.g., N,N-dimethylformamide), a sulfoxide (e.g., dimethylsulfoxide), a heterocyclic compound (e.g., pyridine), a hydrocarbon (e.g., benzene, hexane), an alkyl halide (e.g., chloroform, dichloromethane), an ester (e.g., methyl acetate, butyl acetate), a ketone (e.g., acetone, methyl ethyl ketone) and an ether (e.g., tetrahydrofuran, 1,2-dimethoxyethane). Alkyl halide and ketone are preferred. Two or more organic solvents can be used in combination.

The composition can be coated according to a conventional coating method (e.g., wire bar coating method, extrusion coating method, direct gravure coating method, reverse gravure coating method, die coating method).

The polymerization reaction can be classified into a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating liquid.

The light irradiation for the photo polymerization is preferably conducted by an ultraviolet ray. The exposure energy is preferably in the range of 20 to 50,000 mJ, and more preferably in the range of 100 to 800 mJ. The light irradiation can be conducted while heating the layer to accelerate the photo polymerization reaction.

The optically anisotropic layer has a thickness preferably in the range of 0.1 to 20 μm, more preferably in the range of 0.2 to 15 μm, and most preferably in the range of 0.3 to 10 μm.

[Support]

The support is preferably transparent. As the transparent support of the optical compensatory sheet, a glass plate or a polymer film (preferably, a polymer film) is used. The term "transparent" here means that light transmittance is not less than 80%.

An optically isotropic polymer film is generally used as the transparent support. The retardation in plane (Re) of the support is preferably less than 10 nm, and more preferably less than 5 nm. The retardation along a thickness direction (Rth) of the film is also preferably less than 10 nm, and more preferably less than 5 nm. The Re and Rth retardation values are defined by the following formulas.

$$Re=(nx-ny)\times d$$

$$Rth=[\{(nx+ny)/2\}-nz]\times d$$

in which each of nx and ny is a refractive index in plane of the support; nz is a refractive index along the thickness direction of the support; and d is a thickness of the support.

According to the displaying mode of the liquid crystal cell, an optically anisotropic polymer film may be used as the transparent support. In that case, the optical anisotropy of the liquid crystal cell is compensated with a combination of the optically anisotropic layer and the optically anisotropic support, which is preferably optically uniaxial or biaxial. If the support is optically uniaxial, it may be either optically positive (i.e., the refractive index along the optical axis is larger than that perpendicular to the optical axis) or optically negative (i.e., the refractive index along the optical axis is smaller than that perpendicular to the optical axis). In an optically biaxial support, the refractive indexes of nx, ny and nz have different values.

The retardation in plane (Re) of the optically anisotropic transparent support is in the range of preferably 0 to 300 nm, more preferably 0 to 200 nm, and most preferably 0 to 100 nm. The retardation along the thickness direction (Rth) of the support is in the range of preferably 10 to 1,000 nm, more preferably 50 to 400 nm, and most preferably 100 to 300 nm.

The material of the support is determined according to whether it is optically isotropic or anisotropic. An optically isotropic transparent support is generally made of glass or cellulose esters, while an optically anisotropic support is made of synthetic polymers (e.g., polycarbonate, polysulfone, polyethersulfone, polyacrylate, polymethacrylate and norbornene resin). Further, a cellulose ester film having high retardation (i.e., an optically anisotropic cellulose ester film) can be obtained by the method described in European Patent No. 0911656 A2, in which the optically anisotropic cellulose ester film is prepared (1) with a retardation increasing agent (birefringence increasing agent), (2) by lowering the acetylation degree in the cellulose acetate film, or (3) through the cold dissolution process.

The transparent support of polymer film is preferably prepared according to a solvent casting method.

The polymer film is preferably stretched to prepare an optically anisotropic transparent support.

An optically uniaxial support can be obtained by normal uniaxial or biaxial stretching process.

An optically biaxial support is preferably produced through unbalance biaxial stretching process, in which the polymer film is stretched parallel to a certain direction to a predetermined extent (for example 3 to 100%, preferably 5 to 30%) and stretched perpendicularly to more extent (for example 6 to 200%, preferably 10 to 90%). The film may be stretched in the two directions at the same time.

It is preferred that the stretching direction (direction in which the film is stretched to the larger extent in unbalance biaxial stretching process) be essentially parallel to the slow axis in plane of the resulting film. The angle between them is preferably less than 10°, more preferably less than 5°, and most preferably less than 3°.

If the transparent support is optically uniaxial or biaxial, it is preferred that an average direction of lines obtained by projecting the long axes of the rod-like liquid crystal molecules onto the support be essentially parallel or perpendicular to the slow axis in plane of the support.

The transparent support has a thickness preferably in the range of 10 to 500 $\mu$m, and more preferably in the range of 50 to 200 $\mu$m.

The transparent support can be subjected to a surface treatment (e.g., glow discharge treatment, corona discharge treatment, ultraviolet (UV) treatment, flame treatment) to improve adhesion to a layer formed on the support (e.g., adhesive layer, orientation layer, optically anisotropic layer). An ultraviolet (UV) absorbing agent can be incorporated in the support.

An adhesive layer (undercoating layer) can be provided on the transparent support. Japanese Patent Provisional Publication No. 7(1995)-333433 describes an adhesive layer. The adhesive layer has a thickness of preferably 0.1 to 2 $\mu$m, and more preferably 0.2 to 1 $\mu$m.

[Polarizing film]

The polarizing film is an iodine polarizing film, a dye polarizing film comprising a dichromatic dye or a polyene polarizing film. The iodine polarizing film and the dye polarizing film are generally prepared from polyvinyl alcohol films. The transparent axis of the film is perpendicular to the stretched direction.

The polarizing film is placed so that the transparent axis may be essentially parallel to an average direction of lines obtained by projecting the long axes of the rod-like liquid crystal molecules onto the support (i.e., so that the transparent axis may be essentially parallel to the slow axis).

[Transparent protective film]

As the transparent protective film, a polymer film is used. Here, 'transparent' means that the film has an optical transmittance of not less than 80%.

The film is generally a cellulose ester film, preferably a triacetylcellulose film, which is preferably prepared according to the solvent casting method.

The thickness of the film is within preferably 20 to 500 $\mu$m, more preferably 50 to 200 $\mu$m.

[Liquid crystal display]

The present invention can be applied to liquid crystal displays of various modes. As described above, the optical compensatory sheets for liquid crystal cells of various modes have been proposed. Examples of the modes include TN (twisted nematic) mode, IPS (in-plane switching) mode, FLC (ferroelectric liquid crystal) mode, OCB (optically compensatory bend) mode, STN (super twisted nematic) mode, VA (vertically aligned) mode, ECB (electrically controlled birefringence) mode and HAN (hybrid aligned nematic) mode.

The optical compensatory sheet and the polarizing plate of the invention are preferably used in a liquid crystal display in which the slow axis of the compensatory sheet is preferably essentially parallel to the transparent axis of the polarizing film (e.g., liquid crystal display of TN or VA mode). The invention is particularly effective in a liquid crystal display of VA mode.

The liquid crystal cell of VA mode include:

(1) a liquid crystal cell of VA mode in a narrow sense (described in Japanese Patent Provisional Publication No. 2(1990)-176625), in which rod-like liquid crystal molecules are essentially vertically aligned while voltage is not applied, and the molecules are essentially horizontally aligned while voltage is applied;

(2) a liquid crystal cell of MVA mode (described in SID97, Digest of tech. Papers, 28(1997), 845), in which the VA mode is modified to be multi-domain type so as to enlarge the viewing angle;

(3) a liquid crystal cell of n-ASM mode (described in Nippon Ekisho Toronkai [Liquid crystal forum of Japan], Digest of tech. Papers (1998), 58–59), in which rod-like liquid crystal molecules are essentially vertically aligned while voltage is not applied, and the molecules are essentially oriented in twisted multi-domain alignment while voltage is applied; and (4) a liquid crystal cell of SURVAIVAL mode (published in LCD international 98).

EXAMPLE 1

The acrylic copolymer (PA410) and triethylamine (neutralizing agent) were dissolved in a mixture of methanol and water (volume ratio: 30/70) to prepare a 4 wt. % solution.

Acrylic copolymer (PA410)

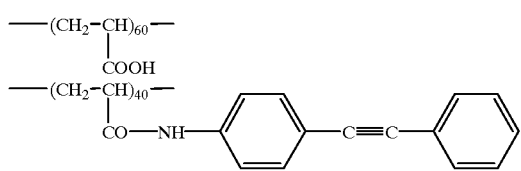

The solution was coated on the glass plate by means of a bar coater (thickness: 1 μm), and air-dried at 120° C. for 5 minutes. The surface was subjected to a rubbing treatment to form an orientation layer. The following coating solution was then coated on the orientation layer by means of a bar coater (thickness: 0.7 μm).

| Coating solution for optically anisotropic layer | |
|---|---|
| The rod-like liquid crystal compound (N26) | 100 weight parts |
| A photopolymerization initiator (Irgacure 907, Ciba-Geigy) | 3 weight parts |
| Photosensitizer (Calcure DEXT, Nippon Kayaku) | 1 weight part |
| Methyl ethyl ketone | 400 weight parts |

The coated layer was heated at 100° C. for 1 minute to align the rod-like liquid crystal molecules. The layer was irradiated with an ultraviolet ray for 4 seconds to polymerize the liquid crystal molecules and to fix the alignment.

The alignment and the director of the rod-like liquid crystal molecules in the thus-prepared layer were observed with a polarizing microscope. As a result, the rod-like liquid crystal molecules were aligned so that their long axes were oriented perpendicularly to the rubbing direction. The retardation along the thickness direction (Rth) was also measured with an ellipsometer, and found 110 nm.

EXAMPLE 2

The procedure of Example 1 was repeated except that the acrylic copolymer (PA421) was used, to prepare and evaluate a thin film. The alignment and the director of the rod-like liquid crystal molecules in the thus-prepared film were observed with a polarizing microscope. As a result, the rod-like liquid crystal molecules were aligned so that their long axes were oriented perpendicularly to the rubbing direction.

Acrylic copolymer (PA421)

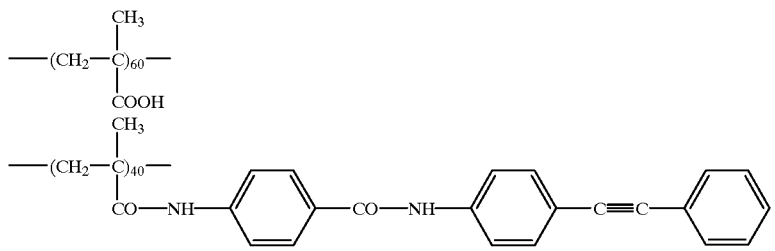

EXAMPLE 3

The procedure of Example 1 was repeated except that the acrylic copolymer (PA442) was used, to prepare and evaluate a thin film. The alignment and the director of the rod-like liquid crystal molecules in the thus-prepared film were observed with a polarizing microscope. As a result, the rod-like liquid crystal molecules were aligned so that their long axes were oriented perpendicularly to the rubbing direction.

Acrylic copolymer (PA442)

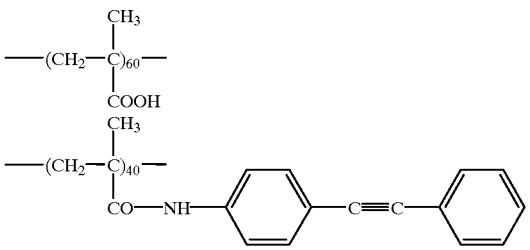

EXAMPLE 4

(1) Preparation of transparent support

The following birefringence increasing agent was incorporated in cellulose triacetate in 4.0 wt. %, to prepare a rolled cellulose triacetate film (thickness: 100 μm).

Birefringence increasing agent

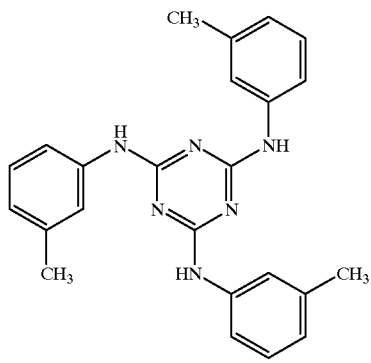

(2) Preparation of orientation layer

The acrylic copolymer (PA442) and triethiylamine (neutralizing agent) were dissolved in a mixture of methanol and water (volume ratio: 30/70) to prepare a 4 wt. % solution. The solution was continuously coated on the rolled film prepared in (1) by means of a bar coater while the film was running. The coated layer was air-dried at 120° C. for 5 minutes (thickness: 1 μm). While the rolled transparent support thus provided with the coated layer was running, a rubbing treatment was continuously performed along the longitudinal (running) direction to prepare an orientation layer.

(3) Preparation of optically anisotropic layer

The following coating solution was continuously coated on the orientation layer by means of a bar coater.

| Coating solution for optically anisotropic layer | |
|---|---|
| The rod-like liquid crystal compound (N26) | 100 weight parts |
| A photopolymerization initiator (Irgacure 907, Ciba-Geigy) | 3 weight parts |
| Photosensitizer (Calcure DEXT, Nippon Kayaku) | 1 weight part |
| Methyl ethyl ketone | 400 weight parts |

The coated layer was heated at 100° C. for 1 minute to align the rod-like liquid crystal molecules. At the heated temperature, the layer was irradiated with an ultraviolet ray in an amount of 600 mJ/cm² for 4 seconds to polymerize the liquid crystal molecules and to fix the alignment. Thus, an optically anisotropic layer was formed to prepare an optical compensatory sheet. The rod-like liquid crystal molecules were aligned so that their long axes were oriented perpendicularly to the longitudinal direction of the sheet. The retardation in plane (Re) and that along the thickness direction (Rth) were measured at 550 nm by means of an ellipsometer (M-150, JASCO), and found 30 nm and 110 nm, respectively.

(4) Preparation of polarizing plate

A rolled polyvinyl alcohol film (thickness: 80 μm) was continuously stretched to the extent of ×5 length in an aqueous solution of iodine, and dried to form a polarizing film. A rolled saponified cellulose triacetate film (Fuji Tac TD80UF, Fuji Photo Film Co., Ltd.) was laminated on one face of the polarizing film. On the other face, the saponified rolled optical compensatory sheet was laminated so that the optically anisotropic layer of the sheet might be in contact with the polarizing film. Thus, a polarizing plate was prepared. The slow axis of the compensatory sheet (direction of long axes of the rod-like liquid crystal molecules) was parallel to the transparent axis of the polarizing film.

(5) Preparation of liquid crystal display

Form a commercially available MVA liquid crystal display (VL-1530S, Fujitsu, Ltd.), polarizing plates and optical compensatory sheets on both sides were removed. In place of them, the above-prepared two polarizing plates were laminated.

The viewing angle of the thus-treated display was measured by means of a viewing angle measuring apparatus (EZ Contrast 160D, ELDIM). As a result, viewing angles along the transparent axis of polarizing film and at an angle of 45° to that axis were both more than 80°.

EXAMPLE 5

(Preparation of orientation layer)

The acrylic copolymer (PA505) and triethylamine (neutralizing agent) were dissolved in a mixture of methanol and water (volume ratio: 30/70) to prepare a 4 wt. % solution. The solution was coated on a glass plate by means of a bar coater, and air-dried at 120° C. for 5 minutes to form a coated layer (thickness: 1 μm). The surface of the layer was subjected to a rubbing treatment to form an orientation layer.

Acrylic copolymer (PA505)

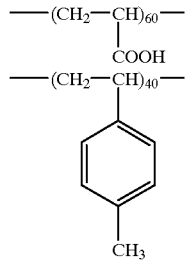

(Preparation of optically anisotropic layer)

The following coating solution was coated on the orientation layer by means of a bar coater to form a layer of 0.7 μm thickness.

| Coating solution for optically anisotropic layer | |
|---|---|
| The rod-like liquid crystal compound (N71) | 100 weight parts |
| A photopolymerization initiator (Irgacure 907, Ciba-Geigy) | 3 weight parts |
| Photosensitizer (Calcure DEXT, Nippon Kayaku) | 1 weight part |
| Methyl ethyl ketone | 400 weight parts |

The coated layer was heated at 100° C. for 1 minute to align the rod-like liquid crystal molecules. At the heated temperature, the layer was irradiated with an ultraviolet ray for 4 seconds to polymerize the liquid crystal molecules and to fix the alignment. Thus, an optically anisotropic layer was formed to prepare an optical compensatory sheet. The alignment and the director (direction of long axes) of the rod-like liquid crystal molecules were observed with a polarizing microscope. As a result, the rod-like liquid crystal molecules were aligned so that their long axes were oriented perpendicularly to the rubbing direction.

The retardation along the thickness direction (Rth) was also measured with an ellipsometer, and found 115 nm.

EXAMPLE 6

The procedure of Example 5 was repeated except that the acrylic copolymer (PA523) was used in place of the acrylic copolymer (PA505) in the same amount, to prepare and evaluate an optical compensatory sheet.

The alignment and the director (direction of long axes) of the rod-like liquid crystal molecules were observed with a polarizing microscope. As a result, the rod-like liquid crystal molecules were aligned so that their long axes were oriented perpendicularly to the rubbing direction.

The retardation along the thickness direction (Rth) was also measured with an ellipsometer, and found 115 nm.

Acrylic copolymer (PA523)

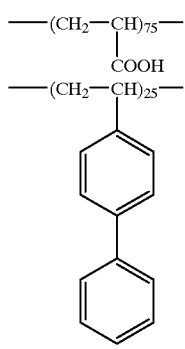

EXAMPLE 7

The procedure of Example 5 was repeated except that the acrylic copolymer (PA532) was used in place of the acrylic copolymer (PA505) in the same amount, to prepare and evaluate an optical compensatory sheet.

The alignment and the director (direction of long axes) of the rod-like liquid crystal molecules were observed with a polarizing microscope. As a result, the rod-like liquid crystal molecules were aligned so that their long axes were oriented perpendicularly to the rubbing direction.

The retardation along the thickness direction (Rth) was also measured with an ellipsometer, and found 115 nm.

Acrylic copolymer (PA532)

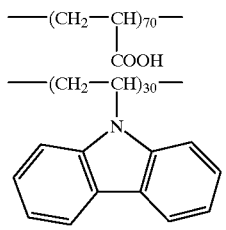

EXAMPLE 8

(1) Preparation of transparent support

The birefringence increasing agent used in Example 4 was incorporated in cellulose triacetate in 4.0 wt. %, to prepare a rolled cellulose triacetate film (thickness: 100 μm). The prepared film was used as a transparent support.

(2) Preparation of orientation layer

The acrylic copolymer (PA532) and triethylamine (neutralizing agent) were dissolved in a mixture of methanol and water (volume ratio: 30/70) to prepare a 4 wt. % solution. The solution was continuously coated on the rolled film prepared in (1) by means of a bar coater while the film was running. The coated layer was air-dried at 120° C. for 5 minutes (thickness: 1 μm). While the rolled transparent support thus provided with the coated layer was running, a rubbing treatment was continuously performed along the longitudinal (running) direction to prepare an orientation layer.

(3) Preparation of optically anisotropic layer

The following coating solution was continuously coated on the orientation layer by means of a bar coater.

| Coating solution for optically anisotropic layer | |
|---|---|
| The rod-like liquid crystal compound (N71) | 100 weight parts |
| A photopolymerization initiator (Irgacure 907, Ciba-Geigy) | 3 weight parts |
| Photosensitizer (Calcure DEXT, Nippon Kayaku) | 1 weight part |
| Methyl ethyl ketone | 400 weight parts |

The coated layer was heated at 100° C. for 1 minute to align the rod-like liquid crystal molecules. At the heated temperature, the layer was irradiated with an ultraviolet ray in an amount of 400 mJ/cm$^2$ for 4 seconds to polymerize the liquid crystal molecules and to fix the alignment. Thus, an optically anisotropic layer was formed to prepare an optical compensatory sheet. The rod-like liquid crystal molecules were aligned so that their long axes were oriented perpendicularly to the longitudinal direction of the sheet. The retardation in plane (Re) and that along the thickness direction (Rth) were measured at 550 nm by means of an ellipsometer (M-150, JASCO), and found 30 nm and 115 nm, respectively.

(4) Preparation of polarizing plate

A rolled polyvinyl alcohol film (thickness: 80 μm) was continuously stretched to the extent of ×5 length in an aqueous solution of iodine, and dried to form a polarizing film. A rolled saponified cellulose triacetate film (Fuji Tac TD80UF, Fuji Photo Film Co., Ltd.) was laminated on one face of the polarizing film. On the other face, the saponified rolled optical compensatory sheet was laminated so that the optically anisotropic layer of the sheet might be in contact with the polarizing film. Thus, a polarizing plate was prepared. The slow axis of the compensatory sheet (direction of long axes of the rod-like liquid crystal molecules) was parallel to the transparent axis of the polarizing film.

(5) Preparation of liquid crystal display

Form a commercially available MVA liquid crystal display (VL-1530S, Fujitsu, Ltd.), polarizing plates and optical compensatory sheets on both sides were removed. In place of them, the above-prepared two polarizing plates were laminated.

The viewing angle of the thus-treated display was measured by means of a viewing angle measuring apparatus (EZ Contrast 160D, ELDIM). As a result, viewing angles along the transparent axis of polarizing film and at an angle of 45° to that axis were both more than 80°.

EXAMPLE 9

(Preparation of orientation layer)

The acrylic copolymer (PA701) and triethylamine (neutralizing agent) were dissolved in a mixture of methanol and water (volume ratio: 30/70) to prepare a 4 wt. % solution. The solution was coated on a glass plate by means of a bar coater, and air-dried at 120° C. for 5 minutes to form a coated layer (thickness: 1 μm). The surface of the coated layer was subjected to a rubbing treatment to form an orientation layer.

Acrylic copolymer (PA701)

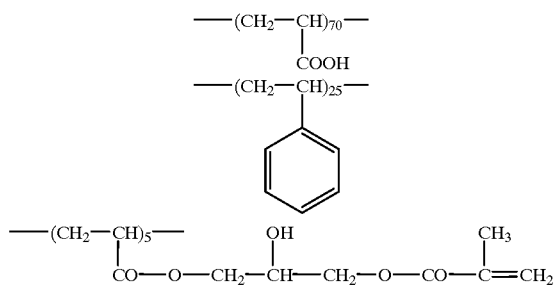

Acrylic copolymer (PA727)

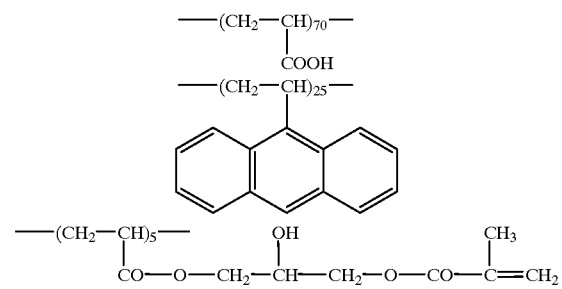

(Preparation of optically anisotropic layer)

The following coating solution was coated on the orientation layer by means of a bar coater to form a layer of 0.7 µm thickness.

| Coating solution for optically anisotropic layer | |
| --- | --- |
| The rod-like liquid crystal compound (N71) | 100 weight parts |
| A photopolymerization initiator (Irgacure 907, Ciba-Geigy) | 3 weight parts |
| Photosensitizer (Calcure DEXT, Nippon Kayaku) | 1 weight part |
| Methyl ethyl ketone | 400 weight parts |

The coated layer was heated at 100° C. for 1 minute to align the rod-like liquid crystal molecules. At the heated temperature, the layer was irradiated with an ultraviolet ray for 4 seconds to polymerize the liquid crystal molecules and to fix the alignment. Thus, an optically anisotropic layer was formed to prepare an optical compensatory sheet. The alignment and the director (direction of long axes) of the rod-like liquid crystal molecules were observed with a polarizing microscope. As a result, the rod-like liquid crystal molecules were aligned so that their long axes were oriented perpendicularly to the rubbing direction.

The retardation along the thickness direction (Rth) was also measured with an ellipsometer, and found 115 nm.

A scotch tape was attached onto the surface of the optically anisotropic layer, and then the tape was longitudinally pulled and peeled off. The adhesives surface of the thus-treated tape was observed, and it was confirmed that nothing remained on the adhesive surface.

EXAMPLE 10

The procedure of Example 9 was repeated except that the acrylic copolymer (PA727) was used in place of the acrylic copolymer (PA701) in the same amount, to prepare and evaluate an optical compensatory sheet.

The alignment and the director (direction of long axes) of the rod-like liquid crystal molecules were observed with a polarizing microscope. As a result, the rod-like liquid crystal molecules were aligned so that their long axes were oriented perpendicularly to the rubbing direction.

The retardation along the thickness direction (Rth) was also measured with an ellipsometer, and found 115 nm.

EXAMPLE 11

The procedure of Example 9 was repeated except that the acrylic copolymer (PA731) was used in place of the acrylic copolymer (PA701) in the same amount, to prepare and evaluate an optical compensatory sheet.

The alignment and the director (direction of long axes) of the rod-like liquid crystal molecules were observed with a polarizing microscope. As a result, the rod-like liquid crystal molecules were aligned so that their long axes were oriented perpendicularly to the rubbing direction.

The retardation along the thickness direction (Rth) was also measured with an ellipsometer, and found 115 nm.

Acrylic copolymer (PA731)

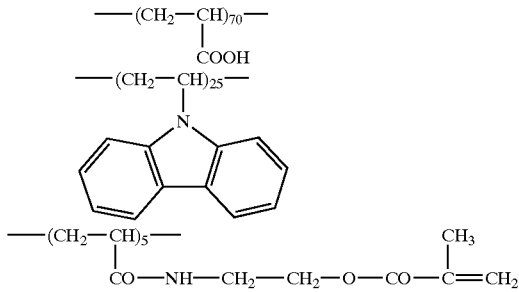

EXAMPLE 12

(1) Preparation of transparent support

The birefringence increasing agent used in Example 4 was incorporated in cellulose triacetate in 4.0 wt. %, to prepare a rolled cellulose triacetate film (thickness: 100 µm). The prepared film was used as a transparent support.

(2) Preparation of orientation layer

The acrylic copolymer (PA732) and triethylamine (neutralizing agent) were dissolved in a mixture of methanol and water (volume ratio: 30/70) to prepare a 4 wt. % solution. The solution was continuously coated on the rolled film prepared in (1) by means of a bar coater while the film was running. The coated layer was air-dried at 120° C. for 5 minutes (thickness: 1 µm). While the rolled transparent support thus provided with the coated layer was running, a rubbing treatment was continuously performed along the longitudinal (running) direction to prepare an orientation layer.

Acrylic copolymer (PA732)

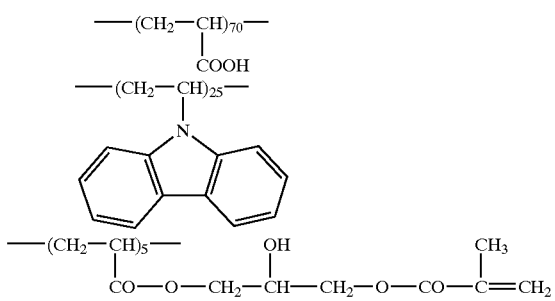

(3) Preparation of optically anisotropic layer

The following coating solution was continuously coated on the orientation layer by means of a bar coater.

| Coating solution for optically anisotropic layer | |
| --- | --- |
| The rod-like liquid crystal compound (N71) | 100 weight parts |
| A photopolyrnerization initiator (Irgacure 907, Ciba-Geigy) | 3 weight parts |
| Photosensitizer (Calcure DEXT, Nippon Kayaku) | 1 weight part |
| Methyl ethyl ketone | 400 weight parts |

The coated layer was heated at 100° C. for 1 minute to align the rod-like liquid crystal molecules. At the heated temperature, the layer was irradiated with an ultraviolet ray in an amount of 400 mJ/cm$^2$ for 4 seconds to polymerize the liquid crystal molecules and to fix the alignment. Thus, an optically anisotropic layer was formed to prepare an optical compensatory sheet. The rod-like liquid crystal molecules were aligned so that their long axes were oriented perpendicularly to the longitudinal direction of the sheet. The retardation in plane (Re) and that along the thickness direction (Rth) were measured at 550 nm by means of an ellipsometer (M-150, JASCO), and found 30 nm and 115 nm, respectively.

(4) Preparation of polarizing plate

A rolled polyvinyl alcohol film (thickness: 80 μm) was continuously stretched to the extent of ×5 length in an aqueous solution of iodine, and dried to form a polarizing film. A rolled saponified cellulose triacetate film (Fuji Tac TD80UF, Fuji Photo Film Co., Ltd.) was laminated on one face of the polarizing film. On the other face, the saponified rolled optical compensatory sheet was laminated so that the optically anisotropic layer of the sheet might be in contact with the polarizing film. Thus, a polarizing plate was prepared. The slow axis of the compensatory sheet (direction of long axes of the rod-like liquid crystal molecules) was parallel to the transparent axis of the polarizing film.

(5) Preparation of liquid crystal display

Form a commercially available MVA liquid crystal display (VL-1530S, Fujitsu, Ltd.), polarizing plates and optical compensatory sheets on both sides were removed. In place of them, the above-prepared two polarizing plates were laminated.

The viewing angle of the thus-treated display was measured by means of a viewing angle measuring apparatus (EZ Contrast 160D, ELDIM). As a result, viewing angles along the transparent axis of polarizing film and at an angle of 45° to that axis were both more than 80°.

We claim:

1. A process for orienting rod-like liquid crystal molecules, comprising the steps of: coating a solution of a copolymer comprising repeating units represented by the formula (I) and repeating units represented by the formula (II) or (III) on a support to form a coated layer; rubbing a surface of the coated layer to form an orientation layer; coating a solution containing rod-like liquid crystal molecules on the orientation layer; and then drying the solution to orient the rod-like liquid crystal molecules so that an average direction of lines obtained by projecting long axes of the liquid crystal molecules on the support is essentially perpendicular to a rubbing direction of the orientation layer:

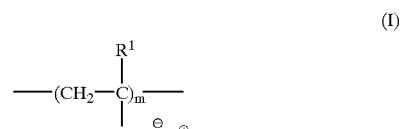

(I)

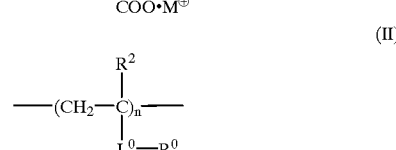

(II)

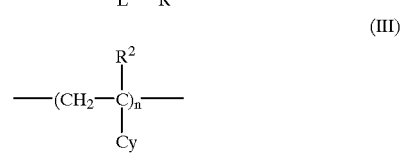

(III)

in which each of $R^1$ and $R^2$ independently is hydrogen, a halogen atom or an alkyl group having 1 to 6 carbon atoms; M is proton, an alkali metal ion or an ammonium ion; $L^0$ is a divalent linking group selected from the group consisting of —O—, —CO—, —NH—, —SO$_2$—, an alkylene group, an alkenylene group, an arylene group and a combination thereof; $R^0$ is a hydrocarbon group having 10 to 100 carbon atoms or a fluorine atom-substituted hydrocarbon group having 1 to 100 carbon atoms; Cy is an alicyclic group, an aromatic group or a heterocyclic group; m is 10 to 99 mole %; and n is 1 to 90 mole %.

2. The process as defined in claim 1, wherein the copolymer comprises the repeating units represented by the formula (I) and the repeating units represented by the formula (II), and $R^0$ in the formula (II) is a hydrocarbon group having 10 to 100 carbon atoms containing at least two aromatic rings.

3. The process as defined in claim 2, wherein the repeating units represented by the formula (II) is represented by the formula (VI):

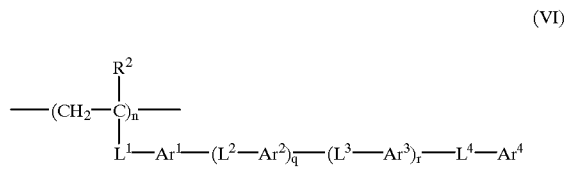

(VI)

in which $R^2$ is hydrogen, a halogen atom or an alkyl group having 1 to 6 carbon atoms; $L^1$ is a divalent linking group selected from the group consisting of —O—, —CO—, —NH—, an alkylene group and a combination thereof; each of $L^2$, $L^3$ and $L^4$ independently is a single bond, —C≡C—, —CO—, —O—CO—, —CO—O—, -alkylene-O—, —CO—NH—, —O—CO—O—, —NH—SO$_2$— or —NHCO—O—; each of $Ar^1$, $Ar^2$, $Ar^3$ and $Ar^4$ independently is an aromatic ring, which can have a substituent group; each of q and r is 0 or 1; and n is 1 to 90 mole %.

4. The process as defined in claim 3, wherein the at least one of L², L³ and L⁴ is a single bond or —C≡C—.

5. The process as defined in claim 1, wherein the rod-like liquid crystal molecules have polymerizable groups, and the alignment of the liquid crystal molecules is fixed by polymerization after the liquid crystal molecules are oriented.

6. The process as defined in claim 5, wherein the copolymer has polymerizable groups, and the alignment of the liquid crystal molecules is fixed by polymerization between the liquid crystal molecules and the copolymer after the liquid crystal molecules are oriented.

7. The process as defined in claim 1, wherein the copolymer further comprises repeating units represented by the formula (IV):

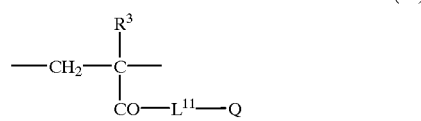

(IV)

in which R³ is hydrogen or methyl; L¹¹ is a divalent linking group selected from the group consisting of —NH-alkylene-O—CO—, -alkylene-O—CO—, —O-alkylene-O—CO—, —O-arylene-O-alkylene-O—CO—, —O-arylene-O-alkylene-, —O-arylene-O—NH-alkylene-O—CO—, —NH-alkylene-O— and —NH-alkylene; and Q is a polymerizable group.

8. The process as defined in claim 1, wherein the copolymer comprises repeating units represented by the formula (V):

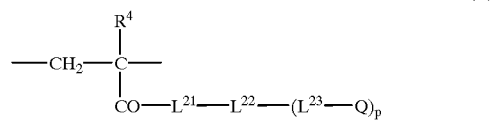

(V)

in which R⁴ is hydrogen or methyl; L²¹ is a divalent linking group selected from the group consisting of —CO—, —SO₂—, —NH—, -alkylene-, -alkenylene-, -arylene- and a combination thereof; L²² is a divalent hydrocarbon group containing 10 to 100 carbon atoms or a fluorine atom-substituted divalent hydrocarbon group containing 1 to 100 carbon atoms; L²³ is a single bond or a divalent linking group selected from the group consisting of —O—, —CO—, —OCO—, —CO—O—, —O—CO—O—, —CO—NH, —SO₂—NH—, —NH—CO—, —NH—CO—O, —NH—SO₂, -alkylene-, -alkenylene-, -alkynylene, —O-alkylene- and -alkylene-O—; Q is a polymerizable group; and p is 1, 2 or 3.

9. The process as defined in claim 1, wherein the copolymer comprises repeating units represented by the formula (VII):

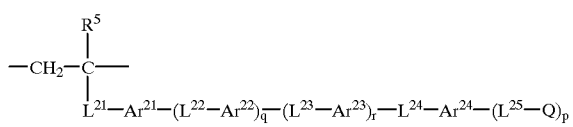

(VII)

in which R⁵ is hydrogen or methyl; L²¹ is a divalent linking group selected from the group consisting of a single bond, —CO—, —CO—NH—, -alkylene-, —CO—NH-alkylene-, —CO—NH-alkylene-O—, —CO—NH-alkylene-CO—O— and —CO—NH-alkylene-CO—NH—; each of L²², L²³, L²⁴ and L²⁵ independently is a single bond, —O—, —CO—, —O—CO—, —CO—O—, —O—CO—O—, —CO—NH—, —SO₂—NH—, —NH—CO—, —NH—CO—O—, —NH—SO₂—, -alkylene-, -alkenylene-, -alkynylene-, —O-alkylene- or -alkylene-O—; each of Ar²¹, Ar²², Ar²³ and Ar²⁴ independently is an aromatic ring, which can have a substituent group; each of q and r is 0 or 1; Q is a polymerizable group; and p is 1, 2, or 3.

10. The process as defined in claim 1, wherein the support has an oblong shape, and the average direction of lines obtained by projecting the long axes of the liquid crystal molecules on the support is essentially perpendicular to a longitudinal direction of the support.

11. The process as defined in claim 1, wherein the support has an oblong shape, and the rubbing direction of the orientation layer is essentially parallel to a longitudinal direction of the support.

12. The process as defined in claim 1, wherein the rod-like liquid crystal molecules are so aligned that an average inclined angle between the long axes of the liquid crystal molecules and the surface of the support is less than 5°.

13. A rolled optical compensatory sheet comprising a transparent support, an orientation layer and an optically anisotropic layer formed from rod-like liquid crystal molecules in this order, wherein the orientation layer is made of a copolymer having repeating units represented by the formula (I) and repeating units represented by the formula (II) or (III), and the rod-like liquid crystal molecules are so aligned that an average direction of lines obtained by projecting long axes of the liquid crystal molecules on the support is essentially perpendicular to a rubbing direction of the orientation layer:

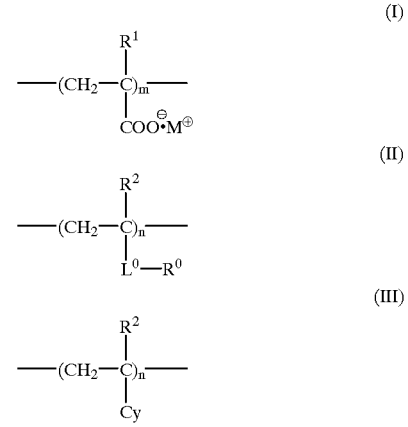

in which each of R¹ and R² is independently hydrogen, a halogen atom or an alkyl group having 1 to 6 carbon atoms; M is proton, an alkali metal ion or an ammonium ion; L⁰ is a divalent linking group selected from the group consisting of —O—, —CO—, —NH—, —SO₂—, an alkylene group, an alkenylene group, an arylene group and a combination thereof; R⁰ is a hydrocarbon group having 10 to 100 carbon atoms or a fluorine atom-substituted hydrocarbon group having 1 to 100 carbon atoms; Cy is an alicyclic group, an aromatic group or a heterocyclic group; m is 10 to 99 mole %; and n is 1 to 90 mole %.

14. A rolled polarizing plate comprising an optically anisotropic layer formed from rod-like liquid crystal molecules, an orientation layer, a transparent support, a polarizing film and a transparent protective film in this order, said orientation layer being made of a copolymer comprising repeating units represented by the formula (I) and repeating units represented by the formula (II) or (III), said rod-like liquid crystal molecules being so aligned that an average inclined angle between long axes of the liquid crystal molecules and a surface of the support is less than 5° and that an average direction of lines obtained by projecting long axes of the liquid crystal molecules on the support is essentially perpendicular to a rubbing direction of the orientation layer, and said average direction being essentially parallel to a transparent axis of the polarizing film:

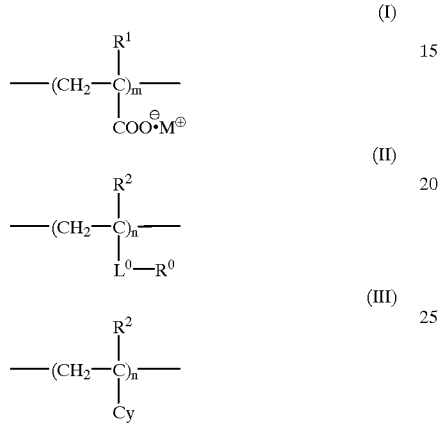

in which each of $R^1$ and $R^2$ is independently hydrogen, a halogen atom or an alkyl group having 1 to 6 carbon atoms; M is proton, an alkali metal ion or an ammonium ion; $L^0$ is a divalent linking group selected from the group consisting of —O—, —CO—, —NH—, —SO$_2$—, an alkylene group, an alkenylene group, an arylene group and a combination thereof; $R^0$ is a hydrocarbon group having 10 to 100 carbon atoms or a fluorine atom-substituted hydrocarbon group having 1 to 100 carbon atoms; Cy is an alicyclic group, an aromatic group or a heterocyclic group; m is 10 to 99 mole %; and n is 1 to 90 mole %.

15. A polymerizable copolymer comprising repeating units represented by the formula (I), repeating units represented by the formula (III) and repeating units represented by the formula (IX):

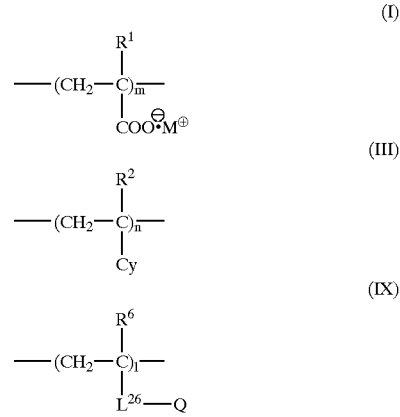

in which each of $R^1$, $R^2$ and $R^6$ is independently hydrogen, a halogen atom or an alkyl group having 1 to 6 carbon atoms; M is proton, an alkali metal ion or an ammonium ion; Cy is an alicyclic group, an aromatic group or a heterocyclic group; $L^{26}$ is a single bond or a divalent linking group; Q is a polymerizable group; m is 10 to 95 mole %; n is 5 to 90 mole %; and l is 1 to 20 mole %.

* * * * *